(12) United States Patent
Muscariello et al.

(10) Patent No.: US 10,805,825 B2
(45) Date of Patent: Oct. 13, 2020

(54) SYSTEM AND METHOD TO FACILITATE CROSS-LAYER OPTIMIZATION OF VIDEO OVER WIFI IN AN INFORMATION-CENTRIC NETWORKING ENVIRONMENT

(71) Applicant: CISCO TECHNOLOGY, INC., San Jose, CA (US)

(72) Inventors: Luca Muscariello, Paris (FR); Giovanna Carofiglio, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/658,638

(22) Filed: Jul. 25, 2017

(65) Prior Publication Data
US 2018/0242186 A1    Aug. 23, 2018

Related U.S. Application Data

(60) Provisional application No. 62/462,757, filed on Feb. 23, 2017.

(51) Int. Cl.
*H04W 28/02* (2009.01)
*H04W 72/12* (2009.01)
(Continued)

(52) U.S. Cl.
CPC ..... *H04W 28/0252* (2013.01); *H04L 67/2842* (2013.01); *H04L 67/327* (2013.01);
(Continued)

(58) Field of Classification Search
None
See application file for complete search history.

(56) References Cited

U.S. PATENT DOCUMENTS

| 5,751,812 A | 5/1998 | Anderson |
| 7,428,217 B2 | 9/2008 | Kobayashi et al. |

(Continued)

FOREIGN PATENT DOCUMENTS

| CN | 105577537 | 11/2016 |
| EP | 2211504 | 7/2010 |

(Continued)

OTHER PUBLICATIONS

International Search Report and Written Opinion in corresponding International Application No. PCT/US2018/018717, dated Apr. 23, 2018, 13 pages.

(Continued)

*Primary Examiner* — Ayaz R Sheikh
*Assistant Examiner* — Sori A Aga

(57) ABSTRACT

A method is provided in one example embodiment and may include determining each station of a plurality of stations connected to a WiFi access point that are to receive downlink video transmissions from the WiFi access point, wherein the WiFi access point is connected to an Information-Centric Networking-based (ICN-based) network; associating each station of the plurality of stations to each of a corresponding ICN face of a plurality of ICN faces maintained by the WiFi access point; and managing a downlink transmission buffer for each station of the plurality of stations based, at least in part, a modulation and coding scheme (MCS) associated with downlink video transmissions for each station of the plurality of stations, wherein each downlink transmission buffer is associated with the corresponding ICN face associated with each station.

20 Claims, 27 Drawing Sheets

(51) Int. Cl.
  *H04N 21/238* (2011.01)
  *H04L 29/08* (2006.01)
  *H04W 84/12* (2009.01)
(52) U.S. Cl.
  CPC ...... *H04N 21/238* (2013.01); *H04W 72/1252* (2013.01); *H04W 72/1273* (2013.01); *H04W 84/12* (2013.01)

(56) References Cited

U.S. PATENT DOCUMENTS

| | | |
|---|---|---|
| 7,600,255 B1 | 10/2009 | Baugher |
| 8,107,369 B2 | 1/2012 | Sagfurs |
| 8,854,992 B2 | 10/2014 | Xu et al. |
| 9,009,465 B2 | 4/2015 | Zhang et al. |
| 2010/0034089 A1 | 2/2010 | Kovvali et al. |
| 2013/0060962 A1 | 3/2013 | Wang et al. |
| 2013/0166668 A1 | 6/2013 | Byun et al. |
| 2013/0219081 A1 | 8/2013 | Qian et al. |
| 2013/0223240 A1 | 8/2013 | Hayes et al. |
| 2013/0227166 A1 | 8/2013 | Ravindran et al. |
| 2013/0282920 A1 | 10/2013 | Zhang et al. |
| 2014/0078969 A1 | 3/2014 | Guo et al. |
| 2014/0146819 A1 | 5/2014 | Bae et al. |
| 2014/0192717 A1 | 7/2014 | Liu et al. |
| 2014/0269634 A1 | 9/2014 | Shapira et al. |
| 2014/0341109 A1 | 11/2014 | Cartmell et al. |
| 2014/0344379 A1 | 11/2014 | Chakraborti et al. |
| 2014/0351929 A1 | 11/2014 | Mahadevan et al. |
| 2015/0139166 A1 | 5/2015 | Yao et al. |
| 2015/0248455 A1 | 9/2015 | Sevilla et al. |
| 2016/0021162 A1 | 1/2016 | Surcouf et al. |
| 2016/0029254 A1 | 1/2016 | D'Souza et al. |
| 2016/0036730 A1 | 2/2016 | Kutscher et al. |
| 2016/0050211 A1 | 2/2016 | Barshow et al. |
| 2016/0100350 A1 | 4/2016 | Laraqui et al. |
| 2016/0156737 A1 | 6/2016 | Perino et al. |
| 2016/0164792 A1 | 6/2016 | Oran |
| 2016/0182680 A1 | 6/2016 | Stapp et al. |
| 2016/0204951 A1 | 7/2016 | Walton et al. |
| 2016/0224799 A1 | 8/2016 | Uzun et al. |
| 2016/0241669 A1 | 8/2016 | Royon et al. |
| 2016/0380986 A1 | 12/2016 | Millar |
| 2017/0034041 A1 | 2/2017 | Carofiglio et al. |
| 2017/0034055 A1 | 2/2017 | Ravindran et al. |
| 2017/0048346 A1* | 2/2017 | Ravindran .......... H04L 67/2842 |
| 2017/0071008 A1* | 3/2017 | Sunay ................. H04W 72/121 |
| 2017/0105044 A1 | 4/2017 | Ravindran et al. |
| 2017/0142226 A1 | 5/2017 | De Foy et al. |
| 2017/0187629 A1 | 6/2017 | Shalev et al. |
| 2017/0332385 A1* | 11/2017 | Shirali .............. H04W 28/0268 |
| 2018/0227390 A1 | 8/2018 | Reznik et al. |
| 2018/0270300 A1* | 9/2018 | Reznik ................ H04L 61/1511 |

FOREIGN PATENT DOCUMENTS

| | | |
|---|---|---|
| EP | 2645785 A1 | 10/2013 |
| EP | 2824892 | 1/2015 |
| EP | 2938046 | 10/2015 |
| WO | 2013/126339 A1 | 8/2013 |
| WO | 2016/033487 A1 | 3/2016 |
| WO | 2016/053159 | 4/2016 |
| WO | 2016/119822 | 8/2016 |

OTHER PUBLICATIONS

International Search Report and Written Opinion in International Application No. PCT/US2017/054700, dated Dec. 20, 2017, 15 pages.
Detti, et al., "IP protocol suite extensions to support CONET Information Centric Networking," draft-detti-conet-ip-option-05, Network Working Group, Internet—Draft, Informational, Jun. 20, 2013, 21 pages.
International Search Report and Written Opinion in International Application No. PCT/US2018/018715, dated May 3, 2018, 12 pages.
International Search Report and Written Opinion in International Application No. PCT/US2018/018880, dated Apr. 23, 2018, 12 pages.
Partial International Search Report in International Application No. PCT/US2018/018721, dated May 14, 2018, 13 pages.
Byers J., et al., "A Digital Fountain Approach to Asynchronous Reliable Multicast," IEEE Journal on Selected areas in Communications, vol. 20, No. 8, Oct. 2002, 13 pages, http://www.cs.bu.edu/~byers/pubs/JSAC-DF.pdf.
"Alarm Management," DeltaV Distributed Control System, Emerson Process Management, White Paper, Aug. 2015, 32 pages.
Schneider, K., "A Practical Congestion Control Scheme for Named Data Networking," Conference Paper, ACM-ICN, Sep. 26, 2016, 11 pages.
Heath L., et al., "Content Labeling in IPv6, a Layer 3 Protocol for Information Centric Networking," IEEE International Conference, Jun. 9, 2013, 6 pages; https://pdfs.semanticscholar.org/5857/068122875e5a48233859f7d1817a1a9fe746.pdf.
Moiseenko, I., et al., "Consumer/Producer Communication with Application Level Framing in Named Data Networking," ICN-ACM, Sep. 30, 2015, 10 pages.
"Datagrams and Streams," Connected: An Internet Encyclopedia, retrieved and printed May 22, 2017, 1 page; http://www.freesoft.org/CIE/Course/Section3/5.htm.
Berg, J., "Linux Wireless," IEEE-802.11, Jan. 12, 2016, 7 pages; https://wireless.wiki.kernel.org/en/developers/documentation/mac80211/ratecontrol/minstrel.
Anonymous user, "Online DNS Record Viewer," OnlineDominTools, May 22, 2017, 3 pages; http://dns-record-viewer.online-domain-tools.com/.
Braz, J., et al., "Dynamic EDCF Parameters for QoS Control in IEEE 802.11 Hot Spots," Journal of the Brazilian Computer Society, vol. 9, No. 2, Nov. 2003, 15 pages; http://www.scielo.br/pdf/jbcos/v9n2/02.pdf.
Vahlenkamp M., et al., "Enabling Information Centric-Networking in IP Networks Using SDN," NEC, IEEE SDN, Nov. 11, 2013, 12 pages.
Papalini M., et al., "High Throughput Forwarding for ICN with Descriptors and Locators," ANCS, Symposium on Architectures for Networking and Communications Systems, Mar. 17, 2016, 12 pages; http://www.people.usi.ch/rogord/pkcr_ancs16.pdf.
Wikipedia contributors, "HTTP Live Streaming," Wikipedia, The Free Encyclopedia, Jul. 6, 2017, 16 pages; https://en.wikipedia.org/wiki/HTTP_Live_Streaming.
Reza Tourani, et al., "IC-MCN: An Architecture for an Information-Centric Mobile Converged Network", IEEE Communications Magazine, vol. 54, Issue: 9, Sep. 2016, 7 pages.
Giovanna Carofiglio, et al., "Pending Interest Table Sizing in Named Data Networking", ACM-ICN '15, Proceedings of the 2nd ACM Conference on Information-Centric Networking, San Francisco, CA, Sep. 30-Oct. 2, 2015, 10 pages.
Giovanna Carofiglio, et al., "Multipath Congestion Control in Content-Centric Networks", IEEE INFOCOM 2013 Workshop on Emerging Design Choices in Name-Oriented Networking, Apr. 14-19, 2013, Turin, Italy, 6 pages.
Wikipedia contributors, "POST (HTTP)," Wikipedia, The Free Encyclopedia, Jul. 28, 2017, 4 pages; https://en.wikipedia.org/wiki/POST_(HTTP).
Postel, J., "Darpa Internet Program Protocol Specification," Internet Protocol, RFC 791, Sep. 1981, 50 pages.
Mockapetris, P., et al., "Domain Names—Implementation and Specification," Network Working Group, RFC 1035, Nov. 1987, http://www.ietf.org/rfc/rfc1035.
Deering, S., "Internet Protocol, Version 6 (IPv6) Specification," Network Working Group, RFC 2460, Dec. 1998, 41 pages; https://tools.ietf.org/html/rfc2460.
Fielding, R., et al. "Hypertext Transfer Protocol—HTTP/1.1," Network Working Group, RFC 2616, Jun. 1999, 183 pages; http://www.rfc.net/rfc2616.

(56) References Cited

OTHER PUBLICATIONS

Thomson, S., et al, "DNS Extensions to Support IP Version 6," Network Working Group, RFC 3596, Oct. 2003, 8 pages; https://www.rfc-editor.org/rfc/pdfrfc/rfc3596.

Ken, S., "IP Authentication Header," Network Working Group, RFC 4302, Dec. 2005, 34 pages; https://tools.ietf.org/html/rfc4302.

Ken, S., "IP Encapsulating Security Payload (ESP)," Network Working Group, RFC 4303, Dec. 2005, 46 pages; https://tools.ietf.org/pdf/rfc4303.

Saint-Andre, P., et al., "Deprecating the "X-" Prefix and Similar Constructs in Application Protocols," Internet Engineering Task Force (IETF), RFC 6648, Jun. 2012, 13 pages; https://www.rfc-editor.org/rfc/rfc6648.

Index, Cisco Visual Networking, "The Zettabyte Era—Trends and Analysis," Cisco White Paper, © 2016 Cisco Systems, Inc., Jun. 2016, 31 pages.

Wikipedia contributors, "Transmission Control Protocol," Wikipedia, The Free Encyclopedia, Jul. 15, 2017, 18 pages; https://en.wikipedia.org/wiki/Transmission_Control_Protocol.

Srinivasan S., "Unveiling the Content-Centric Features of TCP," IEEE International Conference, Jun. 5, 2011, 5 pages; http://s3.amazonaws.com/academia.edu.documents/42504845/Unveiling_the_Content-Centric_Features_o20160209-11611-4bt9id.pdf?AWSAccessKeyId=AKIAIWOWYYGZ2Y53UL3A&Expires=1501265400&Signature=33ZuQSyqohOI60tiZiVBH2d1Q1w%3D&response-content-disposition=inline%3B%20filename%3DUnveiling_the_Content-Centric_Features_o.pdf.

Wikipedia Contributors, "User Datagram Protocol," Wikipedia, The Free Encyclopedia, Jul. 26, 2017, 6 pages; https://en.wikipedia.org/wiki/User_Datagram_Protocol.

"VPP/What is VPP?," AustinMacros, Jan. 9, 2016, 8 pages; https://wiki.fd.io/view/VPP/What_is_VPP%3F.

"What is 4K, UHD, QFHF, FHD, and HD?," Smart Gadgets Hub, Jun. 2, 2015, 16 pages; http://smartgadgetshub.com/what-is-4k-uhd-qfhd-fhd-and-hd/.

"WiFi Frequency, WiFi Channel Width, and Wireless Specturm," LearnTomato, May 6, 2014, 8 pages; https://learntomato.com/wifi-frequency-wifi-channel-width-wireless-spectrum/.

Gallo, M., et al., "Hybrid ICN (hICN) An Incremental Deployment Strategy for Information-Centric Networking," NaNET, ACM-ICN, 2014, 26 pages.

Carofiglio, G., et al., "ICP: Design and Evaluation of an Interest Control Protocol for Content-Centric Networking," IEEE Conference, Computer Communications Workshops (INFOCOM Wkshps), Mar. 25, 2015, 6 pages; https://pdfs.semanticscholar.org/f7d8/0a33fda595de0df5d2ba13e337a8b25089b6.pdf.

Choi, S., et al., "IEEE 802.11 e contention-based channel access (EDCF) performance evaluation," IEEE International Conference, vol. 2, pp. 1151-1156, May 11, 2003, 6 pages; http://ieeexplore.ieee.org/abstract/document/1204546/.

Detti, A., et al., "IP protocol suite extensions to support CONET Information Centric Networking," Network Working Group, Internet-Draft, Jun. 20, 2013, 21 pages; https://tools.ietf.org/pdf/draft-detti-conet-ip-option-05.pdf.

Srinivasan, S., et al., "IPv6 Addresses as Content Names in Information-Centric Networking," Columbia University, 2 pages; http://www.cs.columbia.edu/~hgs/papers/Srin1106_IPv6.pdf.

Carofiglio, G., et al., "Leveraging ICN In-network Control for Loss Detection and Recovery in Wireless Mobile networks," InICN, Sep. 26, 2016, 10 pages; http://conferences2.sigcomm.org/acm-icn/2016/proceedings/p50-carofiglio.pdf.

"LTE Quality of RF and Wireless Vendors and Resources," © RF Wireless World 2012, retrieved on Jul. 13, 2017, 5 pages.

Augé, J., et al., "MAP-Me: Managing Anchor-less Producer Mobility in Information-Centric Networks," arXiv:1611.06785, Nov. 21, 2016, 19 pages; https://arxiv.org/pdf/1611.06785.pdf.

Carofiglio, G., "Mobile Video Delivery with Hybrid ICN IP-integrated ICN solution for 5G," © 2017 Cisco Systems, Inc., 2017, 14 pages.

Kaspar, D., "Multipath Aggregation of Heterogeneous Access Networks," ACM SIGMultimedia Records 4.1, Sep. 2011, 138 pages; https://www.duo.uio.no/bitstream/handle/10852/9034/1155_Kaspar_materie.pdf?sequence=1.

Carofiglio, G., et al , "Multipath Congestion Control in Content-Centric Networks," IEEE Conference, Apr. 14, 2013, 6 pages; https://pdfs.semanticscholar.org/8714/3f1b4ed791796fe29944473d74a593921d21.pdf.

Gallo, M., et al., "NaNET: Socket API and Protocol Stack for Process-to-Content Network Communication," ACM, Sep. 24, 2014, 2 pages; https://pdfs.semanticscholar.org/d22c/6369a33c7b879a6df5a0967446372986a65b.pdf.

Carofiglio, G. et al., "Optimal Multipath Congestion Control and Request Forwarding in Information-Centric Networks," Computer Networks, Dec. 9, 2016, 10 pages; http://s3.amazonaws.com/academia.edu.documents/36600248/06733576.pdf?AWSAccessKeyId=AKIAIWOWYYGZ2Y53UL3A&Expires=1501123830&Signature=SLInJMailp7EO8ebXBeVX6dzOmw%3D&response-content-disposition=inline%3B%20filename%3DOptimal_Multipath_Congestion_Control_and.pdf.

"Accelerating Mobile Communications", Streambolico, https://web.archive.org/web/20170107212830/http://streambolico.com, downloaded from the Internet on Apr. 29, 2019, 12 pages.

Atsushi Ooka, et al., "A Deployment of Content-Centric Networking by Using OpenFlow Networks", Technical Report of The Institute of Electronics, Information and Communication Engineers (IN2013-19), May 2013 (Year: 2013), 10 pages.

A. Ooka et al., "OpenFlow-based content-centric networking architecture and router implementation," 2013 Future Network & Mobile Summit, Lisboa, 2013, pp. 1-10.

K. Pentikousis, Ed., "Information-Centric Networking: Baseline Scenarios", Internet Research Task Force (IRTF), Mar. 2015, 45 pages.

E. Paik et al., "Benefits and Research Challenges of Content-Centric Networking draft-paik-icn-challenges-00.txt", ICN Research Group, Jul. 5, 2012, 8 pages.

A. Mohammad Malik et al., "Experiences From a Field Test Using Icn for Live Video Streaming", 2015 IEEE International Conference on Multimedia & Expo Workshops (ICMEW). IEEE, 2015, 6 pages.

* cited by examiner

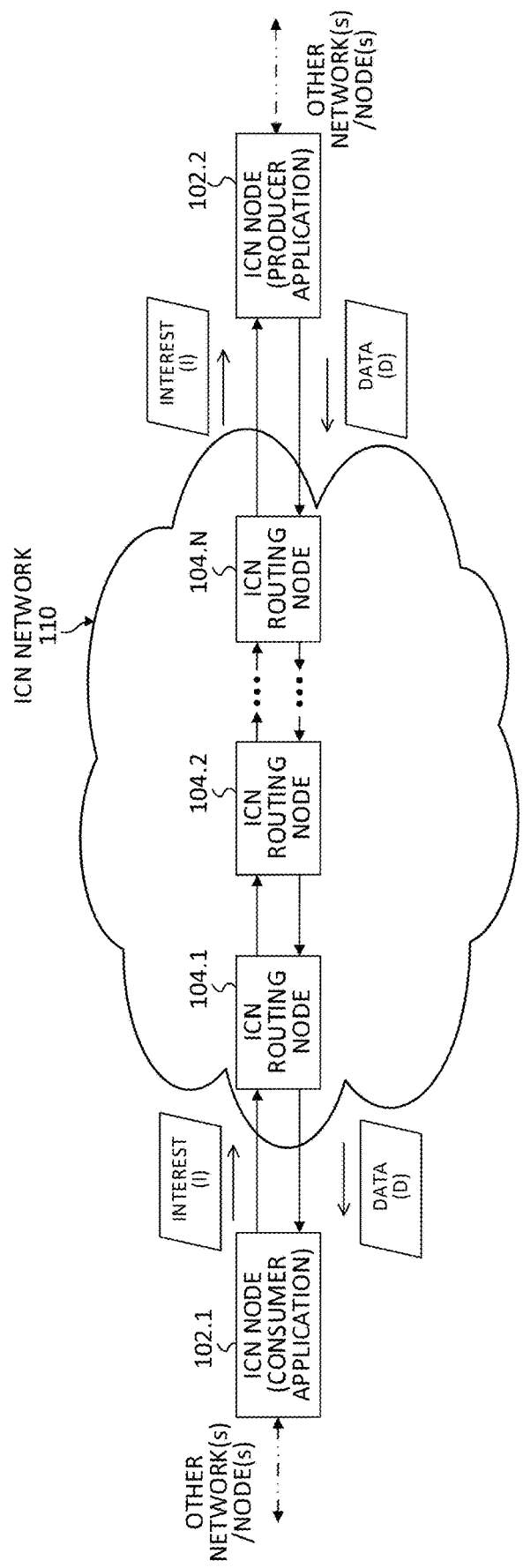

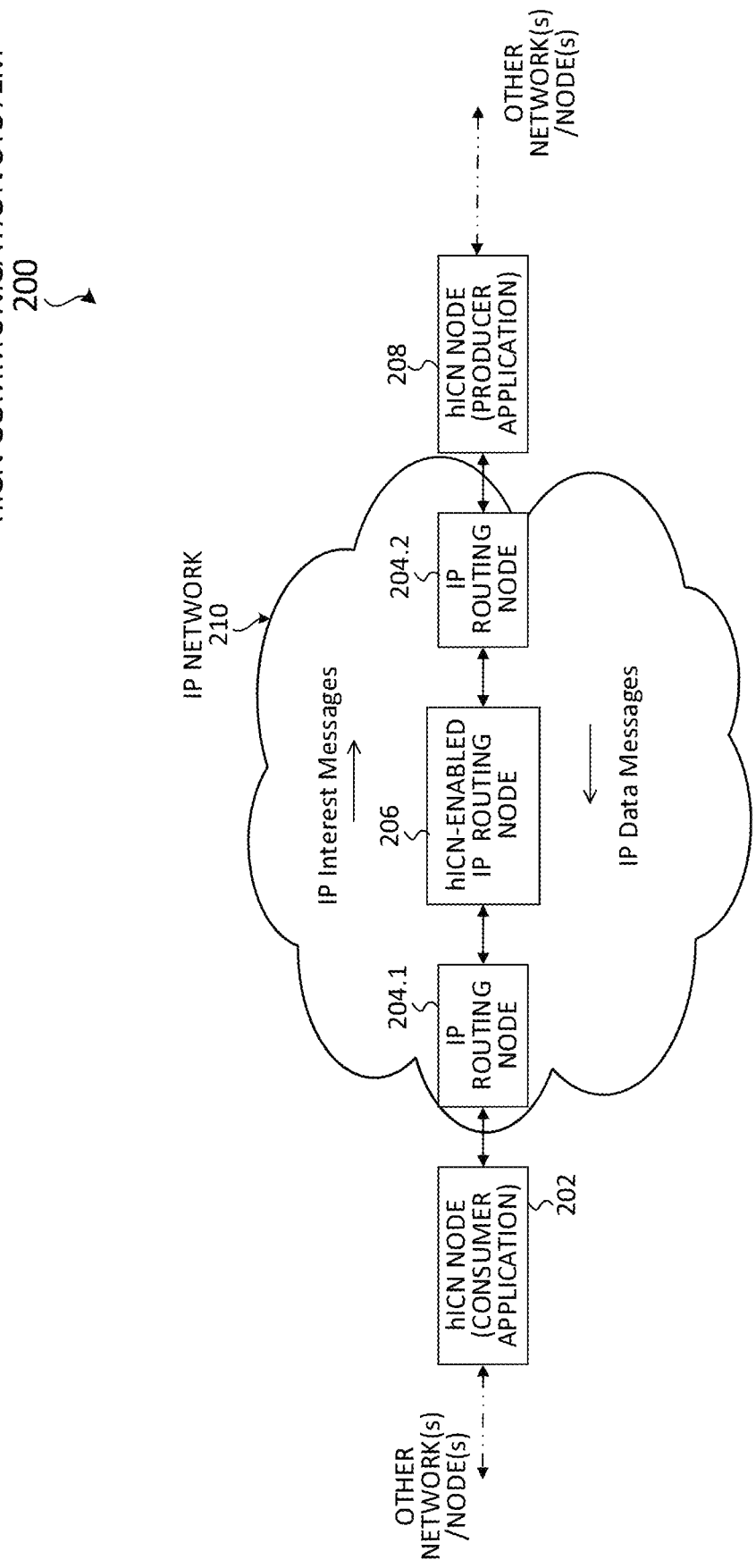

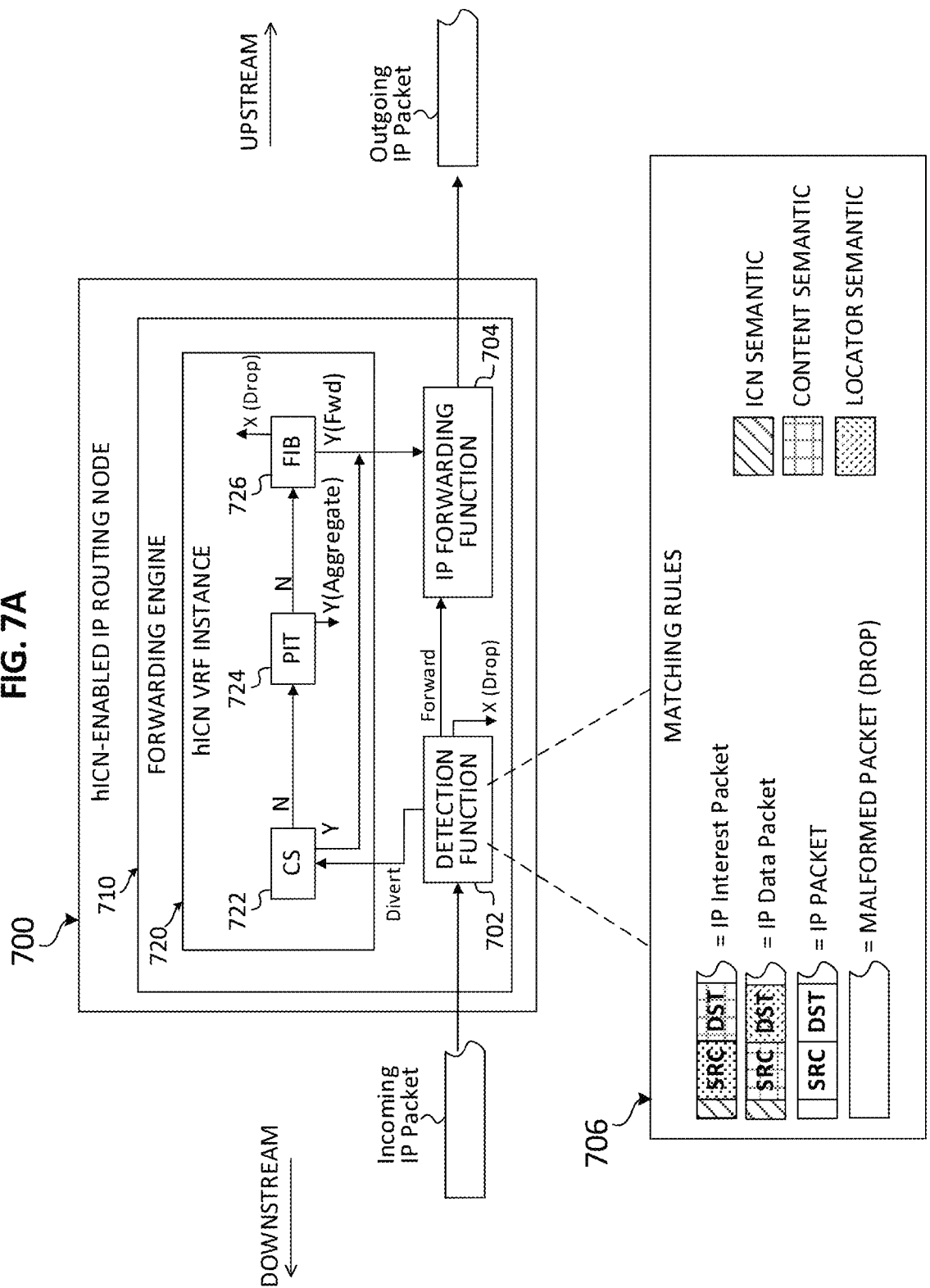

800

1000

1100

1300

1400

1600

1700

1900

2200

Client Implementation Comparison
2300A

Server Implementation Comparison 2300B

SYSTEM AND METHOD TO FACILITATE CROSS-LAYER OPTIMIZATION OF VIDEO OVER WIFI IN AN INFORMATION-CENTRIC NETWORKING ENVIRONMENT

PRIORITY CLAIM AND CROSS-REFERENCE TO RELATED APPLICATIONS

This application claims the benefit of priority under 35 U.S.C. § 119(e) to U.S. Provisional Application Ser. No. 62/462,757, entitled "CROSS-LAYER OPTIMIZATION OF ABR VIDEO OVER 802.11 USING INFORMATION-CENTRIC NETWORKING," filed Feb. 23, 2017, which is hereby incorporated by reference in its entirety into the disclosure of this Application.

This Application is related to co-pending U.S. patent application Ser. No. 15/658,576, filed Jul. 25, 2017, entitled "SYSTEM AND METHOD TO FACILITATE INTEGRATION OF INFORMATION-CENTRIC NETWORKING INTO INTERNET PROTOCOL NETWORKS," inventors Luca Muscariello, et al.; co-pending U.S. patent application Ser. No. 15/658,603, filed Jul. 25, 2017, entitled "SYSTEM AND METHOD TO FACILITATE AN INFORMATION-CENTRIC NETWORKING SOCKET AND FAST IN-NETWORK AUTHENTICATION," inventors Luca Muscariello, et al.; co-pending U.S. patent application Ser. No. 15/658,628, filed Jul. 25, 2017, entitled "SYSTEM AND METHOD TO FACILITATE ROBUST TRAFFIC LOAD BALANCING AND REMOTE ADAPTIVE ACTIVE QUEUE MANAGEMENT IN AN INFORMATION-CENTRIC NETWORKING ENVIRONMENT," inventors Luca Muscariello, et al.; and co-pending U.S. patent application Ser. No. 15/658,661, filed Jul. 25, 2017, entitled "HETEROGENEOUS ACCESS GATEWAY FOR AN INFORMATION-CENTRIC NETWORKING ENVIRONMENT," inventors Luca Muscariello, et al., which Applications are hereby incorporated by reference in their entirety into the disclosure of this Application.

TECHNICAL FIELD

This disclosure relates in general to the field of communications and, more particularly, to systems and methods to facilitate cross-layer optimization of video over WiFi in an Information-Centric Networking (ICN) environment.

BACKGROUND

Information-Centric Networking (ICN) refers to an approach to evolve the Internet infrastructure away from a host-centric paradigm based on perpetual connectivity and the end-to-end principle, to a network architecture in which the focal point is named information, content, data, or the like. In an ICN network paradigm, connectivity may well be intermittent such that end-host and in-network storage can be capitalized upon transparently. As named information in an ICN network and on storage devices can have exactly the same value, mobility and multi access are the norm. Data may become independent from location, application, storage, and means of transportation, enabling in-network caching and replication. The expected benefits can include improved efficiency, better scalability with respect to information and/or bandwidth demand, and better robustness in challenging communication scenarios.

Finding an incremental deployment solution for ICN into existing Internet Protocol (IP) networks is important for successful ICN introduction. On one hand, there have been proposals of overlay approaches for the deployment of ICN over IP such as Content Centric Networking (CCN) and Named Data Networking (NDN). One major disadvantage of such approaches is that they require the definition and standardization of a new packet format and of protocols to manage the correspondence between ICN faces and IP addresses in Forwarding Information Bases (FIBS) of ICN network elements. Thus, integration of ICN into IP networks presents a significant challenge to network developers and operators alike.

BRIEF DESCRIPTION OF THE DRAWINGS

To provide a more complete understanding of the disclosure and features and advantages thereof, reference is made to the following description, taken in conjunction with the accompanying FIGURES, wherein like reference numerals represent like parts, in which:

FIG. 1A is a simplified block diagram illustrating example details that can be associated with a conventional ICN environment;

FIG. 2 is a simplified block diagram illustrating example details that can be associated with an example hybrid ICN (hICN) communication system that can be used to facilitate integration of ICN into an IP network according to one embodiment of the present disclosure;

FIGS. 7A-7B are a simplified block diagrams illustrating example details that can be associated with IP packet processing operations that can be associated with an hICN-enabled IP routing node according to some embodiments of the present disclosure;

DETAILED DESCRIPTION OF EXAMPLE EMBODIMENTS

Overview

Figure 1B:
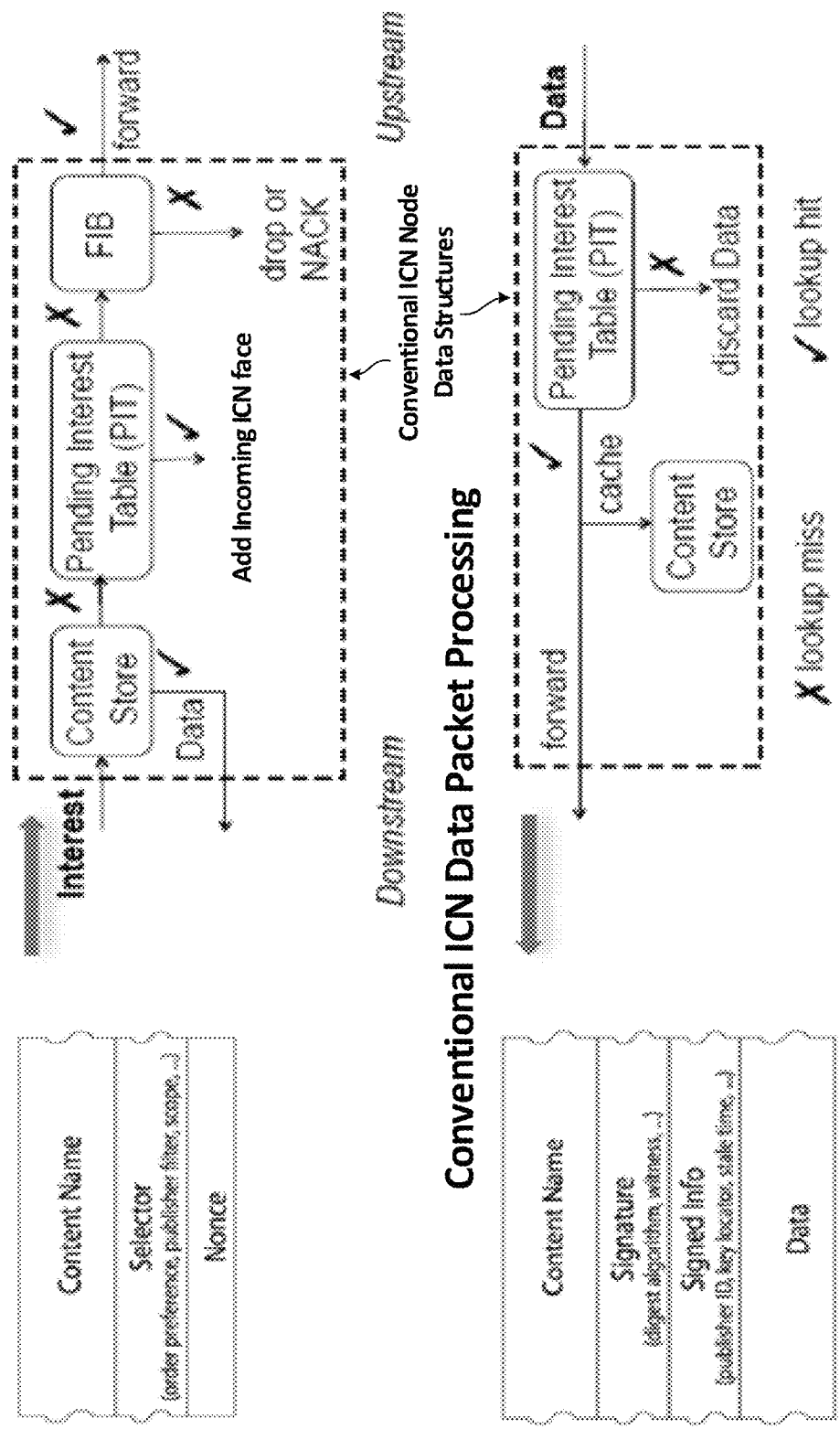
FIG. 1B is a simplified block diagram illustrating example details that can be associated with the conventional ICN environment of FIG. 1A.

A method is provided in one example embodiment and may include determining each station of a plurality of stations connected to a WiFi access point that are to receive downlink video transmissions from the WiFi access point, wherein the WiFi access point is connected to an Information-Centric Networking-based (ICN-based) network; associating each station of the plurality of stations to each of a corresponding ICN face of a plurality of ICN faces maintained by the WiFi access point; and managing a downlink transmission buffer for each station of the plurality of stations based, at least in part, a modulation and coding scheme (MCS) associated with downlink video transmissions for each station of the plurality of stations, wherein each downlink transmission buffer is associated with the corresponding ICN face associated with each station.

In some cases, the managing can include: (a) determining a total available bandwidth of a channel to provide downlink video transmissions to the plurality of stations; (b) identifying an optimized video rate for each station that maximizes utilization of the channel for the plurality of stations while providing fairness of downlink transmissions toward each station; (c) enqueuing downlink video packets to each downlink transmission buffer for each station of the plurality of stations; and (d) scheduling downlink transmissions from each downlink transmission buffer for each station of the plurality of stations based on the identified optimized video rate for each station. In some instances, the optimized video rate identified for each station can be less than or equal to a maximum physical data rate associated with the lowest MCS assigned to downlink transmissions for the station that maximizes utilization of the channel for the plurality of stations while providing a fair utilization of air time of the channel for the plurality of stations.

In still some cases, the method can further include at least one of evaluating the MCS associated with downlink transmissions for each station of the plurality of stations at periodic intervals; and determining that an interest message for a particular video content has not been received from a particular station within a threshold time period. In some instances, the method can include repeating (a), (b), and (c) at a period interval or upon determining that an interest message for a particular video content has not been received from a particular station within a threshold time period.

In still some cases, the ICN-based network can be one of: a content-centric network; a named data network; and an Internet Protocol (IP) network provisioned with at least one hybrid ICN-enabled routing node. In some instances, the at least one hybrid ICN-enabled routing node is capable of performing packet forwarding using both IP networking constructs and ICN constructs.

Example Embodiments

Understanding Conventional ICN

The following foundational information may be viewed as a basis from which the disclosure may be properly explained. Such information is offered for purposes of explanation only and, accordingly, should not be construed in any way to limit the broad applications and teachings of the present disclosure. Various embodiments and/or examples provided herein may reference layers for the Open Systems Interconnect (OSI) model including: Layer 1 (L1) physical (PHY) layer, Layer 2 (L2) data link layer, Layer 3 (L3) network layer, Layer 4 (L4) transport layer, Layer 5 (L5) session layer, Layer 6 (L6) presentation layer, and Layer 7 (L7) application layer.

FIG. 1A is a simplified block diagram illustrating example details that can be associated with a conventional ICN environment 100. FIG. 1B is a simplified block diagram illustrating example details that can be associated with the conventional ICN environment of FIG. 1A. The conventional ICN environment 100 shown in FIG. 1A includes at least one ICN node provisioned with a consumer application, such as ICN node 102.1, and at least one ICN node provisioned with a producer application, such as ICN node 102.2. ICN nodes 102.1-102.2 can communicate through Interest and Data packet exchanges via an ICN network, such as ICN network 110, which can include any number of ICN routing nodes 104.1-104.N. Path segments between adjacent ICN routing nodes 104.1-104.N can be referred to as 'path links' or simply 'links'. ICN nodes, which can include ICN routing nodes 104.1-104.N and ICN nodes 102.1-102.2 provisioned with any combination of consumer and/or producer application(s) can be network elements such as, for example, routers, switches, or the like.

Conventional ICN architectures, such as conventional ICN environment, use stateful (e.g., state-based) forwarding of Interest and Data packets within an ICN network (e.g., ICN network 110), as will be described in detail herein. While different architectural proposals exist for ICN such as CCN and NDN, the proposal all share a common set of principles. The set of principles enable ICN to enrich network layer functions with content awareness so that routing, forwarding, caching, and data transfer operations are performed on content names, rather than on locators such as IP addresses. As referred to herein in this Specification, content or data can also be referred to as a 'resource' or variations thereof.

Conventional ICN Interest and Data Packets in a Consumer-producer Model

There are two basic packets used in conventional ICN networks, an Interest (I) message, which can be used to request a piece of content by content name using a hierarchical tokenized name-prefix, and a Data (D) message, which returns the requested named piece of content. As referred to herein in this Specification, the terms 'message' and 'packet' and variations thereof can be used interchangeably. Further as referred to herein in this Specification, the terms 'Data', 'Content', 'Data packet', 'Data message', 'Content packet', 'Content Message', and variations thereof can be used interchangeably can be used interchangeably in reference to conventional ICN architectures. Further as referred to herein in this Specification, the terms 'Interest', 'Interest packet', and 'Interest message' can be used interchangeably in reference to conventional ICN architectures.

In a conventional ICN environment, data is split into packets, uniquely identified by a content name that can be signed by a data producer such as a producer application provisioned for a given ICN node. A namespace allows content to be referenced by content name using a name-prefix included in Interest and Data packets. The naming convention for conventional ICN architectures (e.g., how to name the content), is not specified by ICN, only a hierarchical structure. A name-prefix is a hierarchical tokenized name for content that contains a sequence of name components. For example, the name-prefix /com/youtube/<mediaID>/audio/<frameID>/<segment#> contains six name components with each name component being delineated by a slash '/'. As illustrated by the <segment#> name component, content can span multiple segments or 'chunks'.

For a content item to be globally accessible, the content item is assigned a globally unique name-prefix. When a consumer application desires particular content, the client can generate an Interest packet that includes the name-prefix of the desired content. In at least some instances, the name-prefix of the requested content may be provided by a user or a consumer application that intends to consume the data.

Communication in a conventional ICN network, such as ICN network 110, is typically driven by consumer(s), also sometimes referred to as requestors, which can initiate requests for information using Interest packets. For example, ICN node 102.1 provisioned with a consumer application can represent a consumer, which can request a piece of content by generating and sending an Interest packet into ICN network 110. The Interest can include, at least in part, the content name (e.g., the name-prefix) identifying the content desired by the consumer.

An ICN routing node (e.g., ICN routing node 104.1) receiving an Interest packet can perform matching operations to determine whether the content is stored thereat or whether the Interest needs to be forwarded to another network element. The Interest packet can be forwarded along one or more path(s) for a number of ICN face(s) associated with matching operations performed on the content name (e.g., the name-prefix) included in the Interest packet. ICN face(s) are discussed in further detail herein.

Using the content name, ICN routing nodes can forward the Interest packet toward the desired content. The desired content may be found at a particular source that produced the content or at another ICN routing node along a path to the source. Content carried packets can be stored, permanently or temporarily, in one or more nodes in a conventional ICN environment. A source that produces content can be referred to herein interchangeably as a 'content source', 'producer application', 'content producer', 'producer node', a 'producer', a data or content 'responder', or variations thereof. For example, in some instances an ICN routing node between a content source and a consumer may have content stored thereat if the content passed through the network element one or more times (e.g., via one or more Data packets) on its path toward one or more other consumer(s). A recipient of content that has been requested by the recipient can be referred to herein interchangeably as a 'consumer', 'consumer application', 'consumer node', 'receiver', 'requestor' or variations thereof If no ICN routing node has the requested content to satisfy the Interest, the Interest will be forwarded all the way to a producer of the content, such as ICN node 102.2 provisioned with the producer application. When an Interest packet reaches a network element that contains the desired content (e.g., either a producer or an ICN forwarder along a path toward the producer), the network element can generate a Data packet that includes the content name (e.g., the name-prefix) and the desired content to satisfy the Interest. To reach the consumer that requested the content (e.g., ICN node 102.1), the Data packet follows the reverse path taken by the Interest packet. In some instances, the Data packet can includes a signature by the producer's key that binds the content name to the content. The path of the Data packet can be referred to as the 'Data path', the 'reverse path' or the 'inverse path' of the Interest or forwarding path of the Interest packet. The forwarding of the Interest along the Interest path and of the Data packet along the reverse path by each ICN routing node is based on the content name included in the Interest and Data packet and not source and destination addresses as is used, for example, with IP routing.

Accordingly, via one or more consumer applications, users can retrieve named data using a pull flow control protocol based on subsequent packet queries (e.g., Interests), triggering corresponding Data packet delivery. Name based routing and forwarding can be used to guarantee that queries are properly routed towards a repository that may follow one or multiple paths.

ICN Data Structures

Conventional ICN nodes, which can include ICN routing nodes and ICN nodes provisioned with consumer and/or producer applications, typically maintain three data structures: a Content Store (CS), a Pending Interest Table (PIT), and a Forwarding Information Base (FIB), as illustrated in FIG. 1B. A CS is a buffer and/or cache contained within one or more memory element(s) and/or other storage that stores content associated with previously processed Data packets. The CS can be potentially useful to satisfy future Interest packets that may be received from downstream ICN nodes. A PIT is a table that stores the state associated with unsatisfied Interests (e.g., an entry is added into the PIT when a new Interest packet arrives and the entry is removed when it is satisfied by reception of a corresponding Data packet). A FIB fills an analogous role as with IP architectures in that it is used to ascertain next hop information for forwarding Interest packets based on an exact match or a Longest Prefix Match (LPM) of a name-prefix contained in an Interest packet. A strategy module can define the policy for output interface(s) selection at each entry for an ICN FIB.

In some embodiments, upon receipt of an Interest packet via an input ICN face for a given ICN node, the ICN node can perform one or more of the following operations: a CS lookup, a PIT lookup, and a FIB lookup. CS lookups can be used to determine using the content name (e.g., the name-prefix) included in a received Interest whether a requested data chunk is locally stored at the ICN node. In a case of a CS cache hit, the data can be sent back towards a downstream ICN node through the ICN face from which the Interest was received by the given ICN node. Otherwise, based on a determination that there is no hit on the CS, the ICN node can proceed to perform a PIT lookup. A PIT lookup can be used to verify whether there exists one or more other pending Interest(s) for the same content name. If the given ICN node determines that one more other Interest(s) are pending for the same content, the received Interest can discarded since a pending query is already outstanding. An identifier for the ICN face upon which the Interest was received (and possibly the timestamp at which the Interest was received) can be appended to an existing entry in the PIT for the content name. The process of updating an existing entry in the PIT and discarding an Interest is sometimes referred to as Interest aggregation.

If the given ICN node determines that there is no existing entry in the PIT for the content name, a new entry is created in the PIT that includes, at least in part, the content name included in the received Interest and an identifier for the ICN face upon which the Interest was received and the ICN node can then perform a FIB lookup using the content name included in the received Interest. FIB entries as associated with name-prefixes. The ICN node can perform a FIB lookup using the content name included in the Interest and, based on an exact match or a Longest Prefix Match (LPM), the FIB lookup can be used to determine an ICN face through which to forward the Interest to an upstream ICN node. The Interest can be satisfied by an upstream ICN routing node having a copy of the content or a content producer (e.g., an ICN node being provisioned with a producer application).

For each arriving Data packet, the given ICN routing node can perform a PIT lookup to determine whether an entry in the PIT that matches the content name (e.g., the name-prefix) included in the Data packet and, based on a determination that an entry in the PIT does match the content name included in the Data packet, can forward the Data packet downstream using all ICN face(s) identified in the PIT entry upon caching the content in the CS. The PIT entry can then be removed from the PIT. Based on a determination that a content name included in a received Data packet is not contained in the PIT, the Data packet can be discarded. As noted, content may come from a repository (e.g., a producer) or from any intermediate cache along the path with a temporary copy of the content. Data packets of the same content can therefore be retrieved in a multi-path fashion.

The following outlines the purpose and functions of the three major data structures:
FIB
    Name based routing
    No early binding between location and data
    Multi-point communication
PIT
    Mobility
    In-network flow/congestion control
    Request aggregation
CS
    Asynchronous multicast
    Data sharing/repair (caching/loss recovery)
Conventional ICN Data Delivery Process The conventional ICN data delivery process is driven by three basic communication mechanisms: name-based routing and forwarding, pull-based connectionless transport, and in-network caching/buffering.

Name-based routing and forwarding guarantee that queries are properly routed towards a repository, following one or multiple paths. IP routing protocols may be used on content names as they are on IP addresses, with the only difference of avoiding paths pruning, in order to leave to the underlying name-based forwarding a richer set of paths to exploit according to a selected forwarding strategy. ICN routing nodes (e.g., ICN routing nodes 104.1-104.N of FIG. 1A) are in charge of forwarding user requests by name in a hop-by-hop fashion towards a permanent copy of the requested piece of content. To this goal, every node has a name-based routing table storing one or more potential next hops towards a set of content items. The set of forwarding strategies implemented in a distributed fashion by each ICN routing node is referred to as strategy layer. An ICN strategy layer can include a family of dynamic per-application forwarding algorithms in charge of selecting a given next hop according to specific metrics (e.g. time-monitored delay, etc.). ICN routing nodes can also keep track of pending requests (Interests) in order to multicast corresponding Data packets to the requesting user(s) following reverse request path(s) (e.g., breadcrumb routing).

As opposed to current sender-based transport models typically found in IP networks, ICN data transfer processes are triggered by user requests addressed to chunks of a requested content item (e.g., a pull-based model). Rate and congestion control can be performed at the end user by means of a connectionless yet stateful transport protocol with the following characteristics:
    no connection instantiation, support for user/content mobility;
    support for retrieval from multiple sources, a priori unknown at the user (e.g. intermediate caches); and
    support for multipath communication (e.g., to improve user performance and traffic load balancing).

Network nodes (e.g., ICN routing nodes 104.1-104.N) can temporarily store content items/chunks in order to serve future requests for the same content (referred herein as in-network caching or buffering). Whenever a request is received at an ICN node (e.g., any one of ICN routing nodes 104.1-104.N of FIG. 1A), it first checks if the requested chunk is present in the local cache. If this is the case, the content is returned back to the user. Otherwise, the request is forwarded to the next hop by the ICN request routing. In-network caching or buffering allows for the exploitation of current buffers typically used in routers (possibly enhanced by additional memory blocks). The content-awareness provided by names to network nodes enables a different use of buffers, not only to absorb input and/or output rate unbalance but also for temporary caching of in-transit Data packets. Even without additional storage capabilities in routers, the information access by name of ICN allows two new uses of in-network wire speed storage. The first new use can include reuse: subsequent requests for the same Data can be served locally with no need to fetch data from the original server and/or repository. The second new use can include repair: packet losses can be recovered in the network, with no need for the sender to identify and retransmit the lost packet.

Conventional ICN Data-centric Security

Current Internet security is made available by means of ad-hoc protocol extensions like Domain Name System (DNS) Security Extensions (DNSsec), Internet Protocol Security (IPsec) and Transport Layer Security (TLS). TLS provides web security by encrypting a Layer 4 (L4) connection between two hosts. Authenticity is provided by the web of trust (certification authorities and a public key infrastructure) to authenticate the web server and symmetric cypher on the two end points based on a negotiated key. In presence of TLS, many networking operations become unfeasible such as filtering, caching, acceleration, and/or transcoding. The security model of ICN is radically different. Instead of securing the connections, the conventional ICN model is based on content encryption based on asymmetric keys. A web of trust based on certification authorities and a public key infrastructure are typically assumed. Encryption can be performed at the network layer and content identification can be provided in content names. Authenticity can be obtained by including a producer signature of the content plus its content name. The atomic security service provided by ICN guarantees that the producer has published a piece of content with the content name available in the packet. This service enables location-independent secured content access. Denial of service attacks based on cache poisoning can be blocked using signature verification techniques, however, the cost is not negligible and some recent work has started to build network layer trust management that does not required in-network signature verification by using the concept of interest-key binding. While the ICN security framework enables content networking, several services may need to be redesigned. Access control, for instance, requires managing and distributing keys to a group of users with granted access to controlled content. Also content revocation requires content version management and policy enforcement to delete obsolete content from the network when needed.

Thus, conventional ICN networks are typically presented as clean-slate approaches, and the use of an existing IP infrastructure to streamline their deployment has surprisingly received little attention. Some previous approaches of integrating ICN and IP include overlap approaches, where a new ICN protocol is transported on top of IP between pre-identified adjacent ICN routes. Other previous approaches include named data and name-based forwarding, integrating ICN stateful forwarding and symmetric routing into IP, and using the IPSec protocol suite for securing the content. However, all of these approaches require introduction and standardization of IP header extensions or introduction of a new L4 protocol to be deployed as an overlay on top of IP.

It would be desirable to find other ways of integrating ICN into IP networks in a manner that can improve on at least some of the disadvantages described herein. As noted, ICN is a network architecture that has several notable differences from conventional IP networks. Thus, integrating ICN into existing IP networks is not trivial.

Hybrid ICN (hICN): Integrating ICN into IP Networks

Referring to FIG. 2, FIG. 2 is a simplified block diagram illustrating example details that can be associated with an example hybrid ICN (hICN) communication system 200 that can be used to facilitate integration of ICN into an IP network 210 according to at least one embodiment of the present disclosure. Example hICN communication system 200 can include one or more hICN node(s) being provisioned with a consumer application, such as hICN node 202.1, one or more hICN node(s) being provisioned with a producer application, such as hICN node 202.2, and an IP network 210 provisioned one or more IP routing node(s), such as IP routing nodes 204.1-204.2, and one or more hICN-enabled IP routing node(s), such as hICN-enabled IP routing node 206. As referred to herein in this Specification, a hICN or ICN node provisioned with a consumer application requesting content (e.g., hICN node 202.1 as shown in FIG. 2) can be referred to as a 'hICN consumer' or 'ICN consumer' and a hICN or ICN node provisioned with a producer application providing the requested content (e.g., hICN node 202.2 as shown in FIG. 2) can be referred to as a 'hICN producer' or 'ICN producer'.

In accordance with at least one embodiment, an hICN communication system, such as hICN communication system 200, can provide a solution for deployment of ICN inside an IP network (e.g., IP network 210), rather than over IP that preserves all features of ICN communications with at least one difference including mapping content names into IP addresses. In accordance with various embodiments, hICN communication system 200 can: i) use IP version 4 (IPv4) and/or IP version 6 (IPv6) Internet Engineering Task Force (IETF) Request For Comment (RFC) compliant packet formats; ii) guarantee transparent interconnection of (a) a standard IPv4 or IPv6 router and a (b) hICN-enabled IP router that is capable of processing and forwarding both regular IP packets according to IETF standards and also IP packets enhanced with ICN semantics that are typically used in an ICN forwarding pipeline; iii) preserve pure ICN behavior at Layer 3 (L3) and above, such as, for example, providing name-based forwarding, routing, connectionless transport, and object-based security by guaranteeing end-to-end service delivery between data producers and data consumers using ICN communication principles; and iv) require no modification of Layer 7 (L7) applications, but rather user-space modifications of the protocol stack at end-devices and insertion of additional software logic in existing IP routers (whereas conventional ICN integration would require to re-think and re-design router architecture currently optimized for IP).

Two differences between conventional ICN architectures and hICN architectures can include: (1) naming due to mapping introduced by hICN of content names into IP addresses; and (2) forwarding and routing in which hICN architectures can enable any combination of name-based (e.g., conventional ICN forwarding and routing) and standard location-based (e.g., IP forwarding and routing) over a same IP infrastructure in accordance with various embodiments. Accordingly, hICN communication system 200 provides for the ability to preserve ICN features and advantages, while, at the same time, benefiting from exploiting an existing IP infrastructure. Furthermore, the integration of ICN within an existing IP network as can be provided via hICN communication system 200 advantageously does not require predefining adjacencies at an ICN level in at least one embodiment. In addition, since not all applications can benefit from using ICN, hICN communication system 200 can, in at least one embodiment, enable a selective choice of using IP and/or ICN semantics to perform routing and forwarding, as needed. Thus, in various embodiments, hICN communication system 200 can be used to integrate portions of ICN into existing IP networks while addressing various shortcomings, as discussed previously. As referred to herein in this Specification, the terms 'semantic' and 'construct' can be used interchangeably.

hICN Design Principles

In at least one embodiment, the design of hICN communication system 200 can provide an ICN solution that can be readily deployable using the existing IP networks and equipment with minimal modifications to the hosts (e.g., hICN-enabled IP routing node 206) that a network operator may desire to provision with ICN-awareness, while ensuring backwards compatibility for other IP routing nodes (e.g., IP routing nodes 204.1-204.2) and/or third-party IP networks that might be crossed by ICN traffic. Several design principles can be considered for hICN communication system 200 including, but not limited to:

providing a hICN protocol stack and applications to be deployable on unmodified and/or unprivileged user devices (e.g. stock Android® devices, etc.);

providing that hICN operations can be run (e.g., executed) on existing router equipment (e.g., using software and/or hardware enhancements), leveraging to the best extent any existing hardware offloading and/or optimization;

providing that hICN traffic can transparently traverse entire IP networks that may be otherwise unaware of such hICN traffic; and/or providing hICN semantics to be compatible with any content naming that may be performed by a content provider (e.g., for Over-the-top (OTT) traffic).

Based on these design principles, hICN communication system 200, in at least one embodiment, provides for the ability to embed content names in IP addresses and overload IP packets including, in some instances, higher layers such as transport, with ICN and/or hICN semantics, while the changes may remain unnoticed by any equipment not 'in the know'.

Thus, an hICN communication system can include a regular IP network in which a subset of IP routers have been enriched by an ICN module to offer ICN functionalities, as shown in FIG. 2, according to some embodiments of the disclosure. Therefore, an hICN communication system can transports regular IP packets, some of which carry ICN semantics that hICN-enabled routing nodes are able to recognize, while non-hICN-enabled routing nodes are not able to distinguish them and the packets are processed in a traditional IP routing and forwarding manner.

hICN Naming and Mapping to IP Addresses

In some embodiments, hICN design principles can be used to map or encode ICN content names into network layer (e.g., IP) addresses while preserving the name-prefix hierarchy. As such, hICN design principles can be used to implicitly transform regular IP routing and forwarding into their name-based counterpart, leveraging the IP FIB available in standard IP-based equipment, while not preventing the addition of an ICN FIB on top of an IP FIB as part of hICN logic provisioned for such equipment.

In at least one embodiment, several name components can be distinguished in a content name including: a routable prefix, a resource identifier, a resource name, and segmentation identifier. These name components can provide a hierarchy for identifying content from a highest level (e.g., the routable prefix) to a lowest level (e.g., the segmentation identifier). A segmentation identifier can be related to the segmentation of content items into Data packets and enforcing the unicity of content names at Data packet granularity.

Consider one illustrative example content name /ABCDE/ctao/wp/hicn/5. In practice, the content name can be encoded in a number of bits, which may be encoded, at least in part, in an IPv4 address (e.g., 32-bits) or IPv6 address (e.g., 128-bits). In this particular example: the routable prefix is /ABCDE, the resource identifier is /ctao/wp, the resource name is /hicn, and the segment identifier is /5. In various embodiments, the hierarchical naming scheme can vary depending on applications, needs, implementations, or the like.

In general, a routable prefix can represent a routable identifier that can be used to find one or multiple resources. The resource identifier can represent the path within which a set of resources are grouped (e.g., a folder name, a directory, etc.). The resource name can represent an identifier of a particular resource within a set (e.g., a specific file in a folder or directory). The segment identifier can be used to identify the resource or parts of the resource. Segmentation of a resource can vary, for example, based on how a producer segments its resources. In some embodiments, the segment identifier can be a sequence number, a time pointer, or a byte offset. In general, components of the content name together can identify the content of interest. The ICN content name can be mapped to IP addresses in different ways.

In various embodiments, two possible name mapping schemes for hICN content names can include:

a) Pure IP mapping in which name components of a content name (e.g., prefix, resource identifier, resource name, and segment identifiers) can be encoded in the L3 network (e.g., IP) header. For instance, /ABCDE/ctao/wp/hicn/5 could be encoded in the IP header alone, not extending into a L4 transport (e.g., TCP/UDP) header; or b) Optimized mapping in which a subset of name components of a content name (e.g., only the prefix and resource identifier) can be encoded in the L3 network header while the remainder of the name components of the content name (e.g., the resource name and segment identifier) can be encoded in the L4 transport header. For instance, /ABCDE/ctao/wp could be encoded in the IP header, and /hicn/5 could be encoded in the transport header.

In some embodiments, optimized mapping can be used to exploit correlations in resource location to push part of a content name in the transport header, thereby saving IP address space.

In some embodiments, in order to expose a content catalog such as, for example, a hierarchical collection of content objects, such as a Dynamic Adaptive Streaming over Hypertext Transfer Protocol (HTTP) (DASH) Video on Demand (VoD) catalog, a content provider (CP) can allocate one (or several) subnets among its allocated name-prefixes, which can be given ICN semantics. In such embodiments, components of the content name can be encoded into the IP packet in one of the two ways described above, which can be detected by checking the presence of name components in the network and/or transport header.

The mapping between ICN content name and IP address can be performed by the CP based on the content catalog. In some embodiments, this process might be fully automated by assigning a resource identifier to every unit of a particular resource (e.g., content) using pure IP mapping, where a resource corresponds, for instance, to a file (e.g., a DASH segment or manifest) while preserving the existing hierarchy, or the process might be fine-tuned considering various parameters about the catalog or the network topology using, for example, an optimized mapping where the routable prefix and resource identifier can be encoded to reflect the topological structure of the network in order to achieve more compression in routing tables and resource name and segment identifier can be delegated the transport level.

For various embodiments as described herein, content names can be mapped or encoded into an address space (network layer and/or transport layer) that can be utilized to distinguish name-prefixes from other addresses that may be used to identify nodes within an IP network.

In at least one embodiment, hICN functions, logic, etc. provisioned for hICN-enabled IP routing nodes (e.g., hICN-enabled IP routing node 206) can be made aware of the mapping scheme between network and transport layers within a given hICN communication system (e.g., hICN communication system 200) in order to correctly identify content names (e.g., for hashing purposes, routing and forwarding purposes, etc.). In addition to the naming (e.g., mapping content names into IP and/or TCP/UDP addresses), a data signature can, in some embodiments, be inserted in IP packets carrying data to satisfy Interests. In some embodiments, an Authentication Header (AH) packet header from the IPSec protocol suite can be reused, which can be added just after the IP header, to carry a data signature.

It might happen that an internet service provider (ISP) using hICN does not have full control on the content that transits on the network. For example, the content may come from other ISPs that do not implement hICN specifications. The packets may use other IP content addressing specifications (e.g., plain IP, where the address is related to the host machine). In such a case, the ISP that implements hICN can translate the incoming packets to hICN compliant packets using a proxy. More precisely, the translated packet can reuse the same content name (e.g., the IPv6 address in the packet), while additionally carrying segment identifier and packet signature. This solution can ensure interoperability with non-cooperative content providers, while still allowing the ISP to benefit from hICN advantages such as mobility, security, caching, or other transport-related benefits.

hICN: ICN Semantics Carried in IP Packets

Similar to conventional ICN, two different messages or packets are used in a hICN communication system (e.g., hICN communication system 200) according to embodiments of the disclosure: IP Interest messages and IP Data messages. As referred to herein in this Specification, the terms 'IP Interest' message and 'IP Data' message can refer to IP-based messages (e.g., having IP headers, transport headers, etc. according to IPv4, IPv6, or other IETF formats) that have been augmented to carry ICN semantics to enable ICN-based operations to be performed by an hICN-enabled IP routing nodes within an hICN communication system. An IP Interest message can be distinguished from a conventional Interest message used in conventional ICN architectures in that conventional ICN Interest message is not formatted according to traditional IP constructs and packet formats. Similarly, an IP Data message can be distinguished from a conventional Data message used in conventional ICN architectures in that a conventional ICN Data message is not formatted according to traditional IP and packet formats.

In some embodiments, a tag or other bit, field, or the like can be set in a header of IP Interest and IP Data packets to enable a hICN-enabled routing node to distinguish such packets as carrying an ICN semantic. In still some embodiments a specific IP address prefix can be set to enable a hICN-enabled routing node to distinguish IP Interest and IP Data packets as carrying an ICN semantic. IP Interest and IP Data packets or messages can implement the mapping of content names into network and/or transport layer fields as discussed for various embodiments described herein.

In at least one embodiment, an IP Interest packet can be generated (e.g., via a consumer application) by encoding or mapping a content name, at least in part, in the destination (DST) IP address field of the packet. A data payload may or may not be included in an IP Interest packet. In at least one embodiment for a generated IP Interest packet, the source (SRC) IP address field may not be populated to correspond to an IP address of an interface of the consumer's host, as is typically performed for legacy IP applications.

In at least one embodiment, an IP Data packet can be generated (e.g., via a producer application or via an hICN-enabled IP routing node in response to an IP Interest message) by encoding or mapping a content name, at least in part, in the source (SRC) IP address field of the packet and including requested content in a payload portion with the packet. In some embodiments, a signature for the content can be included in an Authentication Header (AH) for an IP Data packet. A content signature can be computed using a cryptographic key of the producer of the content.

As discussed for various embodiments described herein, portion(s) of a content name can be carried in a transport layer header of an IP Interest or Data packet in addition to a network layer header.

Figure 3A:
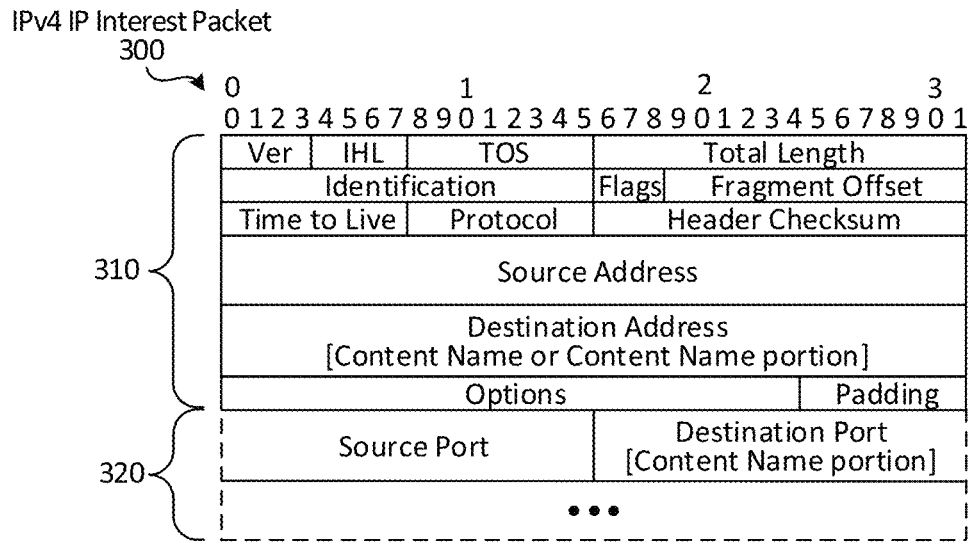
FIGS. 3A-3B are simplified schematic diagrams illustrating example details that can be associated with example IP version 4 (IPv4) packet formats according to some embodiments of the present disclosure.
Figure 3B:
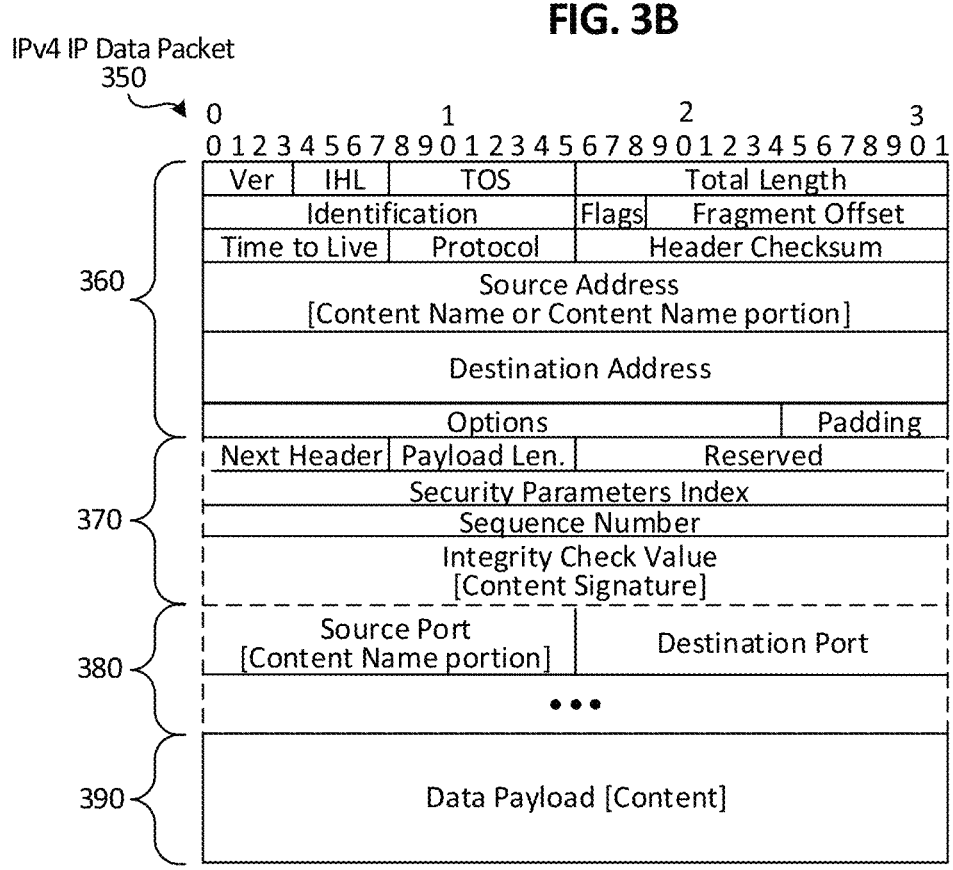

Referring to FIGS. 3A-3B, FIGS. 3A-3B are simplified schematic diagrams illustrating example details that can be associated with an example IPv4 IP Interest packet 300 and example IPv4 Data Packet 350 that can be enhanced to carry ICN semantics in accordance with various embodiments described herein. As illustrated in FIG. 3A, example IPv4 IP Interest packet 300 can include a network layer (e.g., IP) header portion 310. In some embodiments, example IPv4 IP Interest packet 300 can include a transport layer (e.g., TCP/UDP) header portion 320. In various embodiments, an ICN semantic can be set in one or more bit(s) or the like for any combination of fields for the network layer header portion 310.

In at least one embodiment, the destination address field of the network layer header portion 310 can include a full content name for a resource (e.g., content) desired by a consumer. In another embodiment, the destination address field of the network layer header portion 310 can include a first portion of a content name for a resource desired by a consumer and the destination port field of the transport layer header portion 320 can include a remaining portion of the content name for the resource desired by the consumer.

In some embodiments, the source address field of the network layer header portion 310 and/or the source port field of the transport layer header portion 320, if used, can be set to zero such as, for example, for an initial IP Interest packet that might be generated by a consumer (e.g., hICN node 202.1 provisioned with a consumer application) and transmitted to an IP network (e.g., IP network 210). In other embodiments, as discussed in further detail herein, the source address field of the network layer header 310 can be updated by hICN-enabled routing nodes as an IP Interest packet is forwarded toward a content source. Other fields can be populated for the transport layer header portion 320 depending on whether packets are augmented to carry TCP or UDP headers.

As illustrated in FIG. 3B, example IPv4 IP Data packet 350 can include a network layer header portion 360 and a data payload portion 390. In some embodiments, example IPv4 IP Data packet 350 can include a transport layer (e.g., TCP/UDP) header portion 380. In still some embodiments, example IPv4 Data packet can include an Authentication Header (AH) header portion 370. In various embodiments, an ICN semantic can be set in one or more bit(s) or the like for any combination of fields for the network layer header portion 360.

In at least one embodiment, the source address field of the network layer header portion 360 can include a full content name for a resource (e.g., content) desired by a consumer. In another embodiment, the source address field of the network layer header portion 360 can include a first portion of a content name for a resource desired by a consumer and the source port field of the transport layer header portion 380 can include a remaining portion of the content name for the resource desired by the consumer.

In some embodiments, the destination address field of the network layer header portion 360 and/or the destination port field of the transport layer header portion 380, if used, can be set to zero such as, for example, for an initial IP Data packet that might be generated by a producer (e.g., hICN node 208 provisioned with a producer application) and transmitted to an IP network (e.g., IP network 210). In other embodiments, as discussed in further detail herein, the destination address field of the network layer header 360 can be updated by hICN-enabled routing nodes as an IP Data packet is forwarded toward a content requestor. Other fields can be populated for the transport layer header portion 380 depending on whether packets are augmented to carry TCP or UDP headers.

In at least one embodiment, an Authentication Data field of AH header portion 370 can carry a content signature for content carried in the data payload portion of the IPv4 IP Data packet 350. In at least one embodiment, the content signature can written in the Integrity Check Value (ICV) field of the AH by the data producer. In at least one embodiment, the ICV can be computed as described in RFC 4302. Thus, hICN communication system 200 can provide producer authenticity and content integrity through use of the AH (e.g., according to RFC 4302). Signature computation, key exchange and signature verification mechanisms may be implemented in accordance with the IPSec protocol suite. Optionally, confidentiality can also be implemented, for example, using IPSec Encapsulating Security Payload (ESP) as defined in RFC 4303. In some embodiments, at least one packet such as, for example, a content packet carrying a manifest for a flow packets corresponding to a particular content may include an AH header portion carrying a signature for the particular content.

Figure 4A:
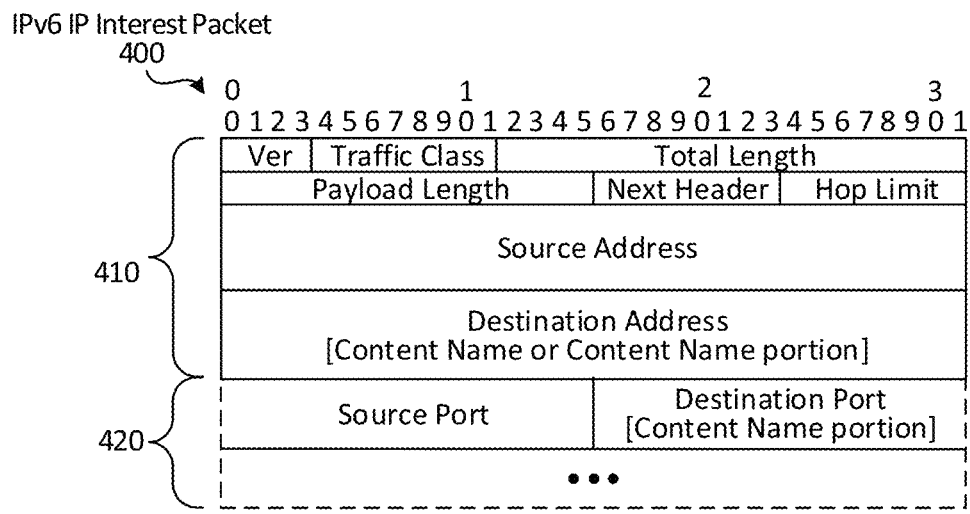
FIGS. 4A-4B are simplified schematic diagrams illustrating example details that can be associated with example IP version 6 (IPv6) packet formats according to some embodiments of the present disclosure.
Figure 4B:
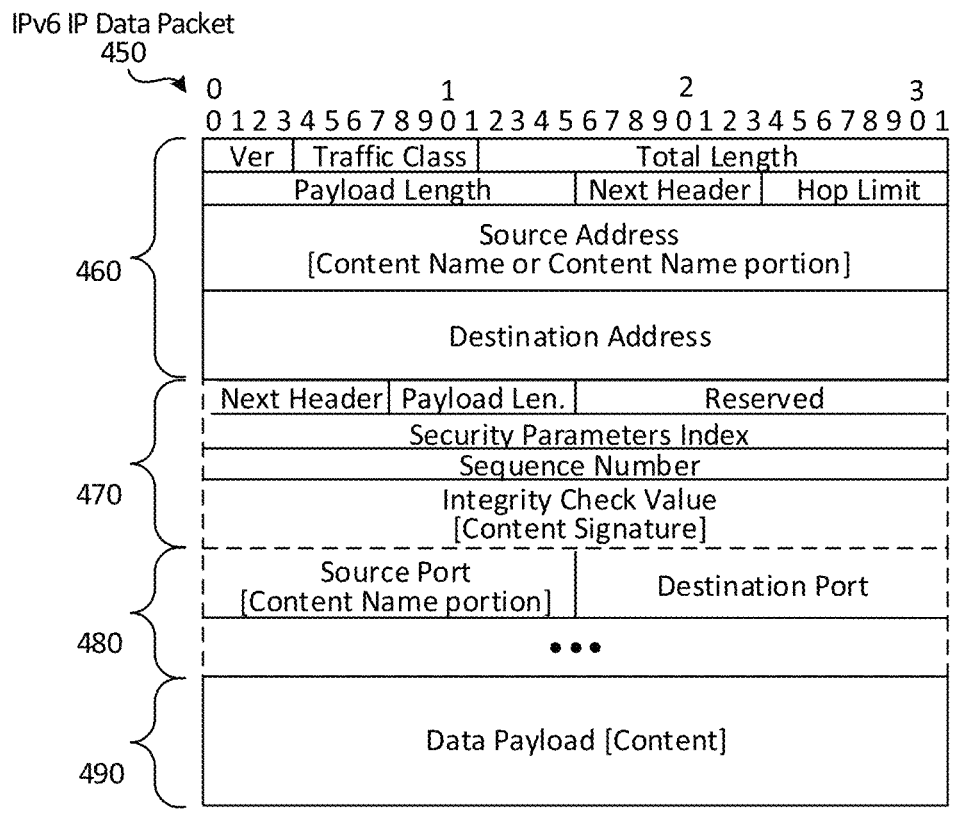

Referring to FIGS. 4A-4B, FIGS. 4A-4B are simplified schematic diagrams illustrating example details that can be associated with an example IPv6 IP Interest packet 400 and example IPv6 Data Packet 450 that can be enhanced to carry ICN semantics in accordance with various embodiments described herein. As illustrated in FIG. 4A, example IPv6 IP Interest packet 400 can include a network layer (e.g., IP) header portion 410. In some embodiments, example IPv6 IP Interest packet 400 can include a transport layer (e.g., TCP/UDP) header portion 420. In various embodiments, an ICN semantic can be set in one or more bit(s) or the like for any combination of fields for the network layer header portion 410.

In at least one embodiment, the destination address field of the network layer header portion 410 can include a full content name for a resource (e.g., content) desired by a consumer. In another embodiment, the destination address field of the network layer header portion 410 can include a first portion of a content name for a resource desired by a consumer and the destination port field of the transport layer header portion 420 can include a remaining portion of the content name for the resource desired by the consumer.

In some embodiments, the source address field of the network layer header portion 410 and/or the source port field of the transport layer header portion 420, if used, can be set to zero such as, for example, for an initial IP Interest packet that might be generated by a consumer (e.g., hICN node 202.1 provisioned with a consumer application) and transmitted to an IP network (e.g., IP network 210). In other embodiments, as discussed in further detail herein, the source address field of the network layer header 410 can be updated by hICN-enabled routing nodes as an IP Interest packet is forwarded toward a content source. Other fields can be populated for the transport layer header portion 420 depending on whether packets are augmented to carry TCP or UDP headers.

As illustrated in FIG. 4B, example IPv6 IP Data packet 450 can include a network layer (e.g., IP) header portion 460 and a data payload portion 490. In some embodiments, example IPv6 IP Data packet 450 can include a transport layer (e.g., TCP/UDP) header portion 480. In still some embodiments, example IPv4 Data packet can include an Authentication Header (AH) header portion 470.

In various embodiments, an ICN semantic can be set in one or more bit(s) or the like for any combination of the Version (Ver) field, the Traffic Class (IHL) field, and/or the Flow Label field of the network layer header portion 460.

In at least one embodiment, the source address field of the network layer header portion 460 can include a full content name for a resource (e.g., content) desired by a consumer. In another embodiment, the source address field of the network layer header portion 460 can include a first portion of a content name for a resource desired by a consumer and the source port field of the transport layer header portion 480 can include a remaining portion of the content name for the resource desired by the consumer.

In some embodiments, the destination address field of the network layer header portion 460 and/or the destination port field of the transport layer header portion 480, if used, can be set to zero such as, for example, for an initial IP Data packet that might be generated by a producer (e.g., hICN node 208 provisioned with a producer application) and transmitted to an IP network (e.g., IP network 210). In other embodiments, as discussed in further detail herein, the destination address field of the network layer header 460 can be updated by hICN-enabled routing nodes as an IP Data packet is forwarded toward a content requestor. Other fields can be populated for the transport layer header portion 480 depending on whether packets are augmented to carry TCP or UDP headers.

In at least one embodiment, an Authentication Data field of AH header portion 470 can carry a content signature for content carried in the data payload portion of the IPv6 IP Data packet 450. In at least one embodiment, the content signature can written in the ICV field of the AH by the data producer. In at least one embodiment, the ICV can be computed as described in RFC 4302. Signature computation, key exchange and signature verification mechanisms may be implemented in accordance with the IPSec protocol suite. Optionally, confidentiality can also be implemented, for example, using IPSec ESP as defined in RFC 4303.

Accordingly, a hICN architecture can be designed to accommodate IPv6 and/or IPv4 packet formats, even if restrictions in address space make IPv4 packet formats less optimal. In some embodiments, hICN communication system can be provisioned to use extensions such as Segment Routing (SR, SR6), etc., to encode or provide mapping of content names and insertion of signatures into network layer and/or transport layer packet header(s).

hICN: Routing and Forwarding

Figure 5:
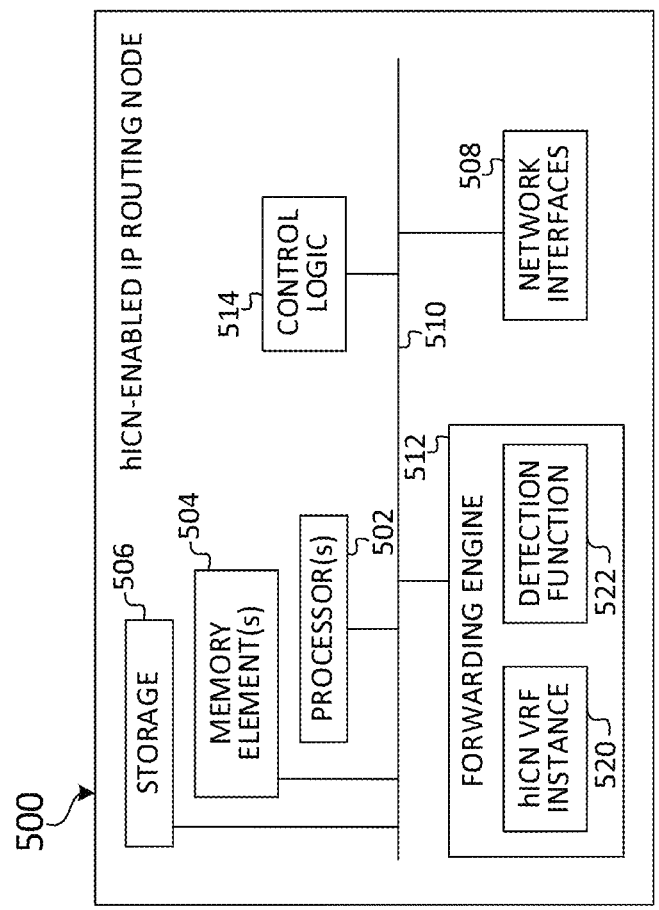
FIG. 5 is a simplified block diagram illustrating example details that can be associated with an example hICN-enabled IP routing node according to some embodiments of the present disclosure.

Referring to FIG. 5, FIG. 5 is a simplified block diagram illustrating example details associated with example hICN-enabled IP routing node 500 according to some embodiments of the present disclosure. The hICN-enabled IP routing node 500 can represent any IP routing node provisioned with ICN-awareness such as, for example, hICN-enabled IP routing node 206 as shown for the embodiment of FIG. 2 or any other IP routing node provisioned with ICN-awareness that may be deployed, depending on implementation, to facilitate integration of ICN into an IP network in accordance with various embodiments described herein.

In at least one embodiment, hICN-enabled IP routing node 500 can include can include one or more processor(s) 502, one or more memory element(s) 504, storage 506, network interfaces 508, a bus 510, a forwarding engine 512, and control logic 516. Forwarding engine 512 can be enhanced with at least one hICN Virtual Routing and Forwarding (VRF) instance 520 and detection function 522.

In at least one embodiment, processor(s) 502 is/are at least one hardware processor configured to execute various tasks, operations and/or functions for hICN-enabled IP routing node 500 as described herein according to software, instructions, or other program code configured for the node. In at least one embodiment, memory element(s) 504 and/or storage 506 is/are configured to store data, information, software, instructions and/or logic associated with hICN-enabled IP routing node 500 (e.g., data structures, logic, etc. can, in various embodiments, be stored using any combination of memory element(s) 504 and/or storage 506). In various embodiments memory element(s) 504 may include one or more physical memory devices such as, for example, local memory and/or one or more bulk storage devices. A local memory may refer to random access memory or other non-persistent memory device(s) generally used during actual execution of the program code. A bulk storage device may be implemented as a hard drive or other persistent data storage device. In some embodiments, hICN-enabled IP routing node 500 may also include one or more cache memories (not shown) that provide temporary storage of at least some program code in order to reduce the number of times program code must be retrieved from a bulk storage device during execution.

In various embodiments, network interfaces 508 can enable communication between hICN-enabled IP routing node 500 and other network elements that may be present in an hICN communication system to facilitate operations as discussed for various embodiments described herein. In various embodiments, network interfaces 508 can be provisioned to support one or more communication protocols, routing protocols, etc., one or more Ethernet driver(s) and/or controller(s), Fibre Channel driver(s) and/or controller(s), Institute of Electrical and Electronics Engineers (IEEE) Standard 802.11 (e.g., WiFi), or other similar protocols, network interface driver(s), and/or controller(s) to enable communications for hICN-enabled IP routing node 500 within an hICN communication system. In some embodiments, the network interfaces can include a Radio Frequency (RF) receiver for receiving RF transmissions that may be transmitted over-the-air (OTA) by other network elements to the hICN-enabled IP routing node 500, a RF transmitter for RF transmissions from the hICN-enabled IP routing node 500 to other network elements, and one or more antenna(s). Modems, cable modems, Ethernet cards, WiFi radios, 3GPP radios, or the like are examples of different types of network interfaces that may be used with the hICN-enabled IP routing node 500.

In at least one embodiment, bus 510 can be configured as an interface that enables one or more elements of hICN-enabled IP routing node 500 (e.g., processor(s) 502, memory element(s) 504, logic, faces, interfaces, etc.) to communicate in order to exchange information and/or data. In at least one embodiment, bus 510 may be implemented as a fast kernel-hosted interconnect, potentially using shared memory between processes (e.g., logic, etc.), which can enable efficient communication paths between the processes.

In some embodiments, Input/output (I/O) devices (not shown) can optionally be coupled to the hICN-enabled IP routing node. Examples of input devices may include, but are not limited to, a keyboard, a pointing device such as a mouse, or the like. Examples of output devices may include, but are not limited to, a monitor or a display, speakers, or the like. Input and/or output devices may be coupled to the node either directly or through intervening I/O controllers.

In an embodiment, input and the output devices may be implemented as a combined input/output device. An example of such a combined device is a touch sensitive display, also sometimes referred to as a "touch screen display" or simply "touch screen". In such an embodiment, input to the device may be provided by a movement of a physical object, such as, for example, a stylus or a finger of a user, on or near the touch screen display.

In at least one embodiment, hICN-enabled IP routing node 500 may be implemented as a conventional IP router modified by the inclusion of hICN VRF instance 520, which can be instantiated via control logic 514 during operation for forwarding engine 512. Detection function 522 can include instructions that when executed (e.g., via forwarding engine 512 and/or processor(s) 502) can provide for the ability to recognize IP packets carrying an ICN semantic and divert them from the regular forwarding pipeline for forwarding engine 512 to be processed through an ICN stack provided by the hICN VRF instance 520. Details related to an hICN VRF instance are discussed in further detail As part of the forwarding pipeline provided by forwarding engine 512, detection function 522 has the ability to detect IP packets carrying an ICN semantic (e.g., IP Interest packets and IP Data packets), and divert them to a separate forwarding pipeline (e.g., hICN VRF instance 520) for processing via an ICN stack. As discussed for various embodiments described herein, this distinction can for example be performed based on, but not limited to, the use of a specific IP prefix, a tag in a packet header, or even IP header options such as Segment Routing if needed, etc.

In at least one embodiment, forwarding engine 512 can represent a hardware and/or software routing function capable of processing (e.g., receiving, transmitting, updating, decapsulation, encapsulation, etc.) IP packets according to IP processing constructs and/or other network layer level, transport layer level, or other layer constructs as may be performed by traditional IP routers or the like. As discussed for various embodiments described herein, forwarding engine 512 can be enhanced with ICN-awareness via one or more hICN VRF instance(s) that can be instantiated for the forwarding engine.

In at least one embodiment, control logic 514 can include instructions that, when executed (e.g., by one or more processor(s) 502 and/or forwarding engine 512), cause hICN-enabled IP routing node 500 to perform operations, which can include, but not be limited to: providing overall control operations of hICN-enabled IP routing node 500; cooperating with other logic, applications, etc. provisioned for hICN-enabled IP routing node 500; maintaining and/or interacting with stored data, information, parameters, etc. (e.g., memory element(s), storage, data structures, databases, tables, etc.); combinations thereof; and/or the like to facilitate various operations as discussed for various embodiments described herein.

Figure 6A:
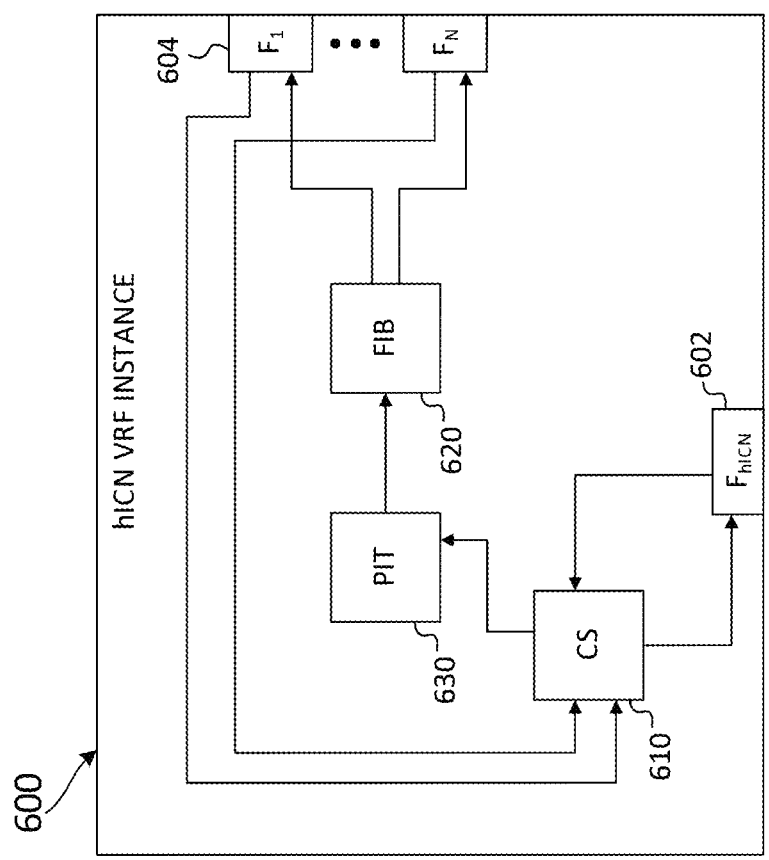
FIG. 6A is a simplified block diagram illustrating example details that can be associated with an example hICN VRF instance according to some embodiments of the present disclosure.

Referring to FIG. 6A, FIG. 6A is a simplified block diagram illustrating example details that can be associated with an example hICN VRF instance 600 in accordance with some embodiments of the present disclosure. The hICN VRF instance 600 can represent any hICN VRF instance that may be instantiated or otherwise provisioned for any hICN-enabled IP routing node (e.g., hICN VRF instance 520 as shown for hICN-enabled IP routing node 500 for the embodiment of FIG. 5) that may be deployed, depending on implementation, to facilitate integration of ICN into an IP network in accordance with various embodiments described herein.

The hICN VRF instance 600 can perform operations using various ICN-based data structures such as a Content Store (CS) 610 that provides a named-data (e.g., content) cache, a Forwarding Information Base (FIB) 620 that includes, at least in part, name-prefixes and output face associations, and a Pending Interest Table (PIT) 630 that includes, at least in part, a cache of pending interests. The hICN VRF instance can also be provisioned with an hICN face ($F_{hICN}$) 602 and an N number of ICN faces ($F_1$-$F_N$) 604.

As referred to herein in this Specification, the term 'interface' is used to describe a functional unit (e.g., a physical network interface) configured for a network element through which packets can enter and leave the network element and the term 'ICN face' is used to describe or identify an adjacency to another network element via a logical connection with the other network element. An ICN face can be distinguished from an hICN face in that an hICN face does not implement an adjacency with a specified next hop router known in advance where packet transmissions are unicast. Rather an hICN face can be used to maintain an adjacency between two hICN-enabled IP routing nodes, which may or may not be next hop neighbors with each other (e.g., one or more non-hICN-enabled IP routing nodes may lie on the path between the two hICN-enabled IP routing nodes). In at least one embodiment, an hICN face can be implemented similar to an Address Resolution Protocol (ARP) table to register a local IP interface (e.g., identified by the IP address of the hICN face) and source IP address(es) identified in IP Interest(s) received on the interface. An IP routing node can have several local IP interfaces.

As referred to herein in this Specification, the general term 'face' can be used to refer to both hICN faces and ICN faces. In various embodiments, faces can be configured to facilitate connectivity using various applications and/or protocols including, but not limited to, ICN protocols, IP, Hypertext Transfer Protocol (HTTP), UDP, TCP, Multiprotocol Label Switching (MPLS), SR, tunneling protocols such as Generic Routing Encapsulation (GRE), Point-to-Point Tunneling Protocol (PPTP), Layer 2 Tunneling Protocol (L2TP), or the like.

Flow connectivity between the various data structures and faces is also illustrated for the embodiment of FIG. 6A.

Figure 6B:
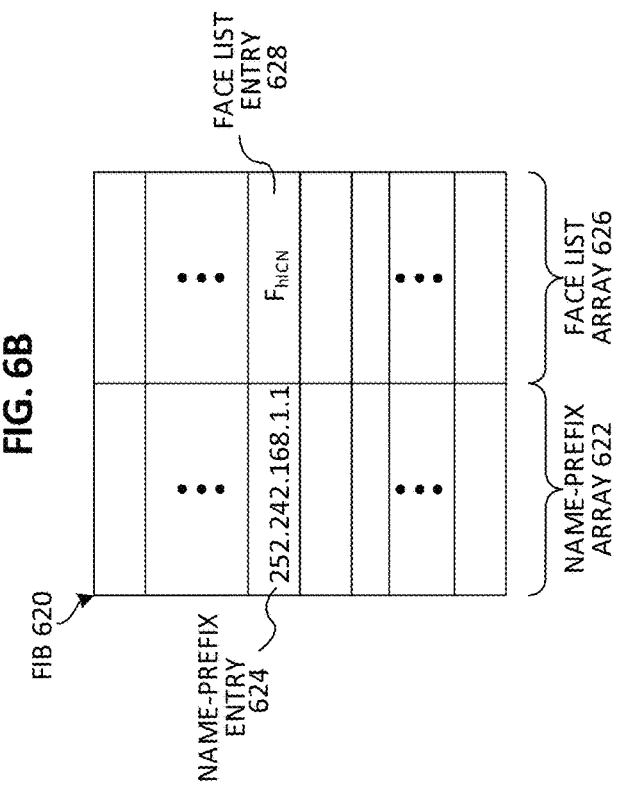
FIGS. 6B-6C are simplified schematic diagrams illustrating example details that can be associated with example data structures that can be associated with the example hICN VRF instance of FIG. 6A according to some embodiments of the present disclosure.
Figure 6C:
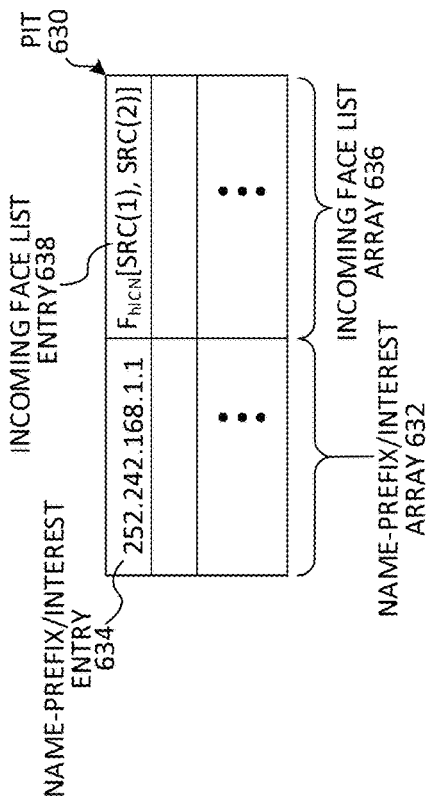

Referring to FIG. 6B-6C, FIGS. 6B-6C are simplified schematic diagrams illustrating example details that can be associated with example data structures that can be associated with the example hICN VRF instance of FIG. 6A according to some embodiments of the present disclosure.

Turning to FIG. 6B, FIG. 6B illustrates example details that can be associated with example FIB 620 according to some embodiments of the present disclosure. As illustrated for the embodiment of FIG. 6B, example FIB 620 can include a number of name-prefix entries 624 for a Name-Prefix array 622 and a corresponding number of face list entries 628 for a Face List array 626. Each of a corresponding name-prefix entry 624 is associated or otherwise linked to a corresponding face list entry 628 that identifies one or more face(s), which can include hICN face 602 and/or that can be used for forwarding IP Interest packets associated with the corresponding name-prefix entry. In various embodiments, name-prefix entries 624 can be stored as IP addresses corresponding to mapped or encoded content names in order to perform look-ups for received IP Interest messages.

Consider an example in which FIB 620 includes a name-prefix entry 252.242.168.1.1 is the encoded or mapped IP address for a particular content name identified by a name-prefix '/com/companyX/doc1.doc' that can be associated with face entry $F_{hICN}$ can be stored in FIB 620 for forwarding IP Interest packets carrying an ICN semantic and including the IP address 252.242.168.1.1 carried, at least in part, in the destination IP address field.

Turning to FIG. 6C, FIG. 6C illustrates example details that can be associated with example PIT 630 that may be maintained by hICN VRF instance 600 in accordance with at least one embodiment. As illustrated for the embodiment of FIG. 6C, PIT 630 can include a number of IP Interest name-prefix or ICN Interest entries 634 for a name-prefix/Interest array 632 and a corresponding number of incoming face list entries 638 for an incoming face list array 636. Each of a corresponding name-prefix/Interest entry 634 is associated or otherwise linked to a corresponding incoming face list entry 638.

Name-prefix/Interest entries 634 can be used to identify pending interests (IP and ICN) that have been received but not yet satisfied by the hICN VRF instance 600. Incoming face list entries 638 can be used to identify a source IP address contained in each received IP Interest for a particular name-prefix. For example, name-prefix 252.242.168.1.1 can be associated with source IP addresses SRC(1) and SRC(2) for an hICN face $F_{hICN}$. A particular source IP address for a particular name-prefix can be used to safely forward an IP Data packet containing content for the name-prefix back downstream toward an adjacent hICN routing node (from which an IP Interest for the content was received) in order to reach an original consumer that requested the content.

In some embodiments, a particular face list entry for a particular name-prefix can include a hICN face identifier identifying the hICN face upon which IP Interest(s) have been received for the particular name-prefix and source IP address(es) that identify adjacent hICN-enabled routing node(s) from which the IP Interest(s) for the particular name-prefix have been received. In still some embodiments, a particular face list entry for a particular name-prefix can include an hICN face identifier identifying the hICN face upon which IP Interest(s) have been received for the particular name-prefix and the hICN face identifier can be linked or otherwise associated (e.g., using another table, database, etc.) with source IP address(es) that that identify adjacent hICN-enabled routing node(s) from which the IP Interest(s) for the particular name-prefix have been received. Other techniques can be envisioned to link or associate hICN face identifiers with source IP addresses and name-prefixes in accordance with various embodiments of the solutions described herein.

In various embodiments, as discussed in further detail herein, PIT and FIB data structures can be enhanced to include other information that can be used to determine forwarding decisions.

Figure 7B:
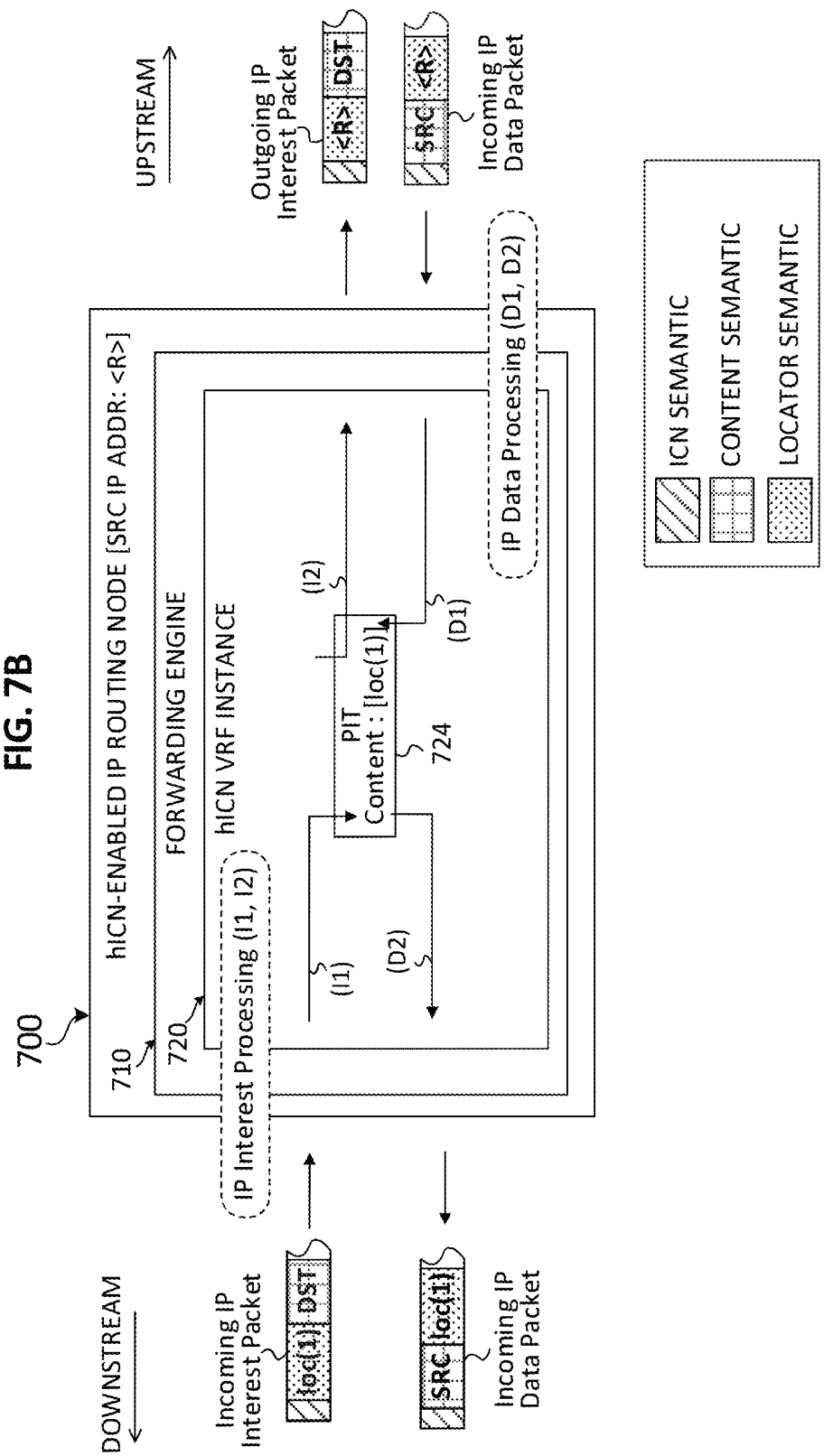

Referring to FIGS. 7A-7B, FIGS. 7A-7B are a simplified block diagrams illustrating example details that can be associated with IP packet processing operations that can be associated with an hICN-enabled IP routing node 700 according to some embodiments of the present disclosure. The hICN-enabled IP routing node 700 illustrated for the embodiment of FIG. 7A can represent any IP routing node provisioned with ICN-awareness such as, for example hICN-enabled IP routing node 206 as shown for the embodiment of FIG. 2 or any other IP routing node provisioned with ICN-awareness that may be deployed, depending on implementation, to facilitate integration of ICN into an IP network in accordance with various embodiments described herein.

Turning to FIG. 7A, example details illustrated for the embodiment of FIG. 7A can be associated with operations that can be performed via an hICN VRF instance 720, a detection function 702, and an IP forwarding function 704 that can be provisioned for a forwarding engine 710 for the hICN-enabled IP routing node 700 in accordance with some embodiments of the present disclosure. The hICN VRF instance 720 can include a CS 722, a PIT 724, and a FIB 726. Other elements that may be provisioned for the hICN-enabled IP routing node 700 and/or the hICN VRF instance 720 (e.g., network interfaces, ICN faces, hICN face, processor(s), memory element(s), etc.) are not illustrated for the embodiment of FIG. 7A in order to illustrate other features of the node.

Consider an operational example in which an incoming IP packet is received (1) by the hICN-enabled IP routing node 700. In at least one embodiment, detection function 702 can be provisioned with matching rules 706 as illustrated for the embodiment of FIG. 7A in which detection function can determine whether an incoming IP packet is an IP Interest packet, an IP Data packet, a regular IP packet, or a malformed packet based, at least in part, on a determination of whether an ICN semantic is present in the incoming packet.

For the embodiment of FIG. 7A, consider that an ICN semantic is to be recognized in one or fields of an IP header for incoming IP packets other than the source (SRC) or destination (DST) IP address fields.

As illustrated for the embodiment of FIG. 7A, matching rules 706 can include a rule for: determining that an incoming IP packet is an IP Interest packet based on the packet including an ICN semantic and a content semantic (e.g., a content name) in the destination IP address; determining that an incoming packet is an IP Data packet based on the packet including an ICN semantic and a data payload; determining that an incoming IP packet is a regular IP packet based on the packet not including an ICN semantic; or determining that an incoming packet is a malformed packet. A 'content semantic' and a 'locator semantic' are illustrated for matching rules 706. As referred to herein in this Specification, a 'content semantic' can refer to a name-prefix (e.g., a content name) contained in an IP Interest or IP Data packet and a 'locator semantic' can refer to an IP address used by a given hICN-enabled IP routing node to determine an adjacent hICN-enabled IP routing node(s) to which to forward an IP Data packet or duplicated IP data packets. A locator semantic carried in IP Interest packets can be the source address of the previous hICN-enabled IP routing node, which a receiving node can use to determine appropriate forwarding for a reverse path IP Data packet that satisfies a given content request. As noted previously, content names can be mapped or encoded into an address space (network layer and/or transport layer) that can be utilized to distinguish nameprefixes (e.g., content semantics) from other addresses that may be used to identify nodes within an IP network.

Based on a determination that the incoming IP packet is an IP Interest or IP Data packet, the detection function 702 can divert the incoming IP to the hICN VRF instance 720. Based on a determination that the incoming IP packet is a regular IP packet, the packet can be forwarded to the IP forwarding function 704 and an outgoing IP packet can be transmitted by the hICN-enabled IP routing node 700. Based on a determination that the incoming IP packet is a malformed packet, the packet can be dropped.

For incoming packets diverted to the hICN VRF instance 720, a lookup on the CS 722 can be performed for IP Interest packets or content contained in an IP Data packet can be cached in the CS 722 based on a determination that a PIT entry exists for the name-prefix contained in the IP Data Packet. For a received IP Data packet for which a PIT entry exists for the name-prefix contained in the packet, the destination address field can be overwritten with a source IP address associated with the PIT entry for the name-prefix contained in the IP Data packet and the IP Data packet can be forwarded downstream. If there are multiple PIT entries associated with the name-prefix, then the IP Data packet can be duplicated, the source address of each duplicated packet overwritten with a source IP address contained in the PIT entry, and each packet can be forwarded downstream. If there is no related PIT entry for the name-prefix contained a received IP Data packet, the packet can be discarded.

Consider an example in which incoming IP packet is formatted as an IP Interest packet and that a lookup is performed on the CS 722 using a content semantic (e.g., the content name) contained in the IP Interest packet. Based on a determination that the content is cached (Y) in the CS 722, an IP packet containing the content (e.g., an IP Data packet) is generated and transmitted by the hICN-enabled IP routing node via the IP forwarding function 704. Additionally, the source IP address contained in the IP Interest packet is written in the destination address of the IP Data packet, before triggering a destination packet transmission towards the same hICN face upon which the IP Interest packet was received.

Based on a determination that the content is not cached (N) in the CS 722, a lookup can be performed in the PIT using the content semantic (e.g., on the name-prefix/interest array) to determine whether a previous interest has been received for the content name included in the packet. Based on a determination that a previous interest has been received (Y) for the content name, the locator semantic contained in the IP Interest packet or any other identifier associated with the locator semantic can be aggregated (e.g., appended to) to the incoming face list array entry associated with the content name and the IP Interest packet can be dropped. Based on a determination that a previous interest has not been received (N) for the content name, a new entry is created in the PIT for the name-prefix, the locator semantic (or any other identifier associated with the locator semantic) is stored in association with the name-prefix and a lookup on the FIB 726 using a LPM of the name-prefix contained in the IP Interest packet is performed to determine outgoing face(s) associated with the name-prefix. Additional operations associated with the PIT 724 are discussed in further detail for the embodiment of FIG. 7B, below.

Based on a determination that the name-prefix is identified (Y) in the FIB 726, the IP Interest packet can be forwarded using the IP forwarding function 704. For the outgoing IP Interest packet, the SRC IP address field of the outgoing packet is overwritten with the IP address of the output interface returned by the LPM lookup (e.g., the IP address for the hICN face). Based on a determination that the name-prefix is not identified (N) in the FIB 726, the packet can be dropped.

Turning to FIG. 7B, example details illustrated for the embodiment of FIG. 7B can be associated with operations that can be performed to replace source or destination IP addresses during IP Interest or IP Data packet transmission, respectively, according to some embodiments of the present disclosure. In particular, FIG. 7B illustrates example details associated with PIT 724 for the hICN VRF instance 720 for the hICN-enabled IP routing node 700. Other elements of the hICN-enabled IP routing node 700 are not illustrated in order to illustrate other features according to some embodiments of the present disclosure. Example IP Interest packet processing is discussed with reference to I1 and I2 and example IP Data packet processing is discussed with reference to D1 and D2.

For the embodiment of FIG. 7B, consider that hICN-enabled IP routing node 700 has an hICN face with a SRC IP address of <R>; thus, the locator semantic for the hICN-enabled IP routing node is <R>. Further consider that an incoming IP Interest packet is received from a downstream node that includes a SRC IP address (e.g., locator semantic) set to 'loc(1)'. For a received IP Interest including a name-prefix for content that is not contained in the CS and that is not identified in the PIT, a new entry can be created at I1 that includes the content name (e.g., the name-prefix) linked to the locator semantic including in the IP Interest (e.g., content: loc(1)) for later sending back a corresponding IP Data packet. At I2, the source IP address is replaced with the IP address <R> of the hICN-enabled IP routing node 700 so as to receive the content response back at D2. This source address translation, which not to be assimilated to a Network Address Translation (NAT), provides for the ability to implement partial IP path symmetry where hICN traffic follows a reverse paths flowing through all hICN-enabled IP routing nodes traversed by corresponding IP Interests.

For an incoming IP Data packet received at D2, a lookup on the PIT 724 is performed and based on a hit on the content semantic contained in the packet, the destination IP address is stripped from the packet and replaced at D2 with the locator semantic loc(1) stored in the PIT for the content name and the IP Data packet is forwarded further downstream to the next node having an IP address loc(1). As discussed for various embodiments described herein IP Data packets can be transmitted by an hICN-enabled IP routing node upon forwarding a received IP Data packet or when an received IP Interest hits the CS. In the former case, the PIT is inspected for every pending interest that can be satisfied, generates an IP Data packet for each interest that is to be satisfied, and sets the destination IP address of each IP Data packet to the locator IP address of each requestor (either consumers or previous hICN-enabled IP routing nodes on path) for each IP Data packet that is transmitted downstream. In the latter case (e.g., a CS hit), the destination address for an outgoing IP Data packet is replaced with the source IP address of the received IP Interest packet. Source and/or destination address translation operations are crucial to benefit from all the ICN advantages on caching, congestion control, etc.

hICN Examples

Figure 8:
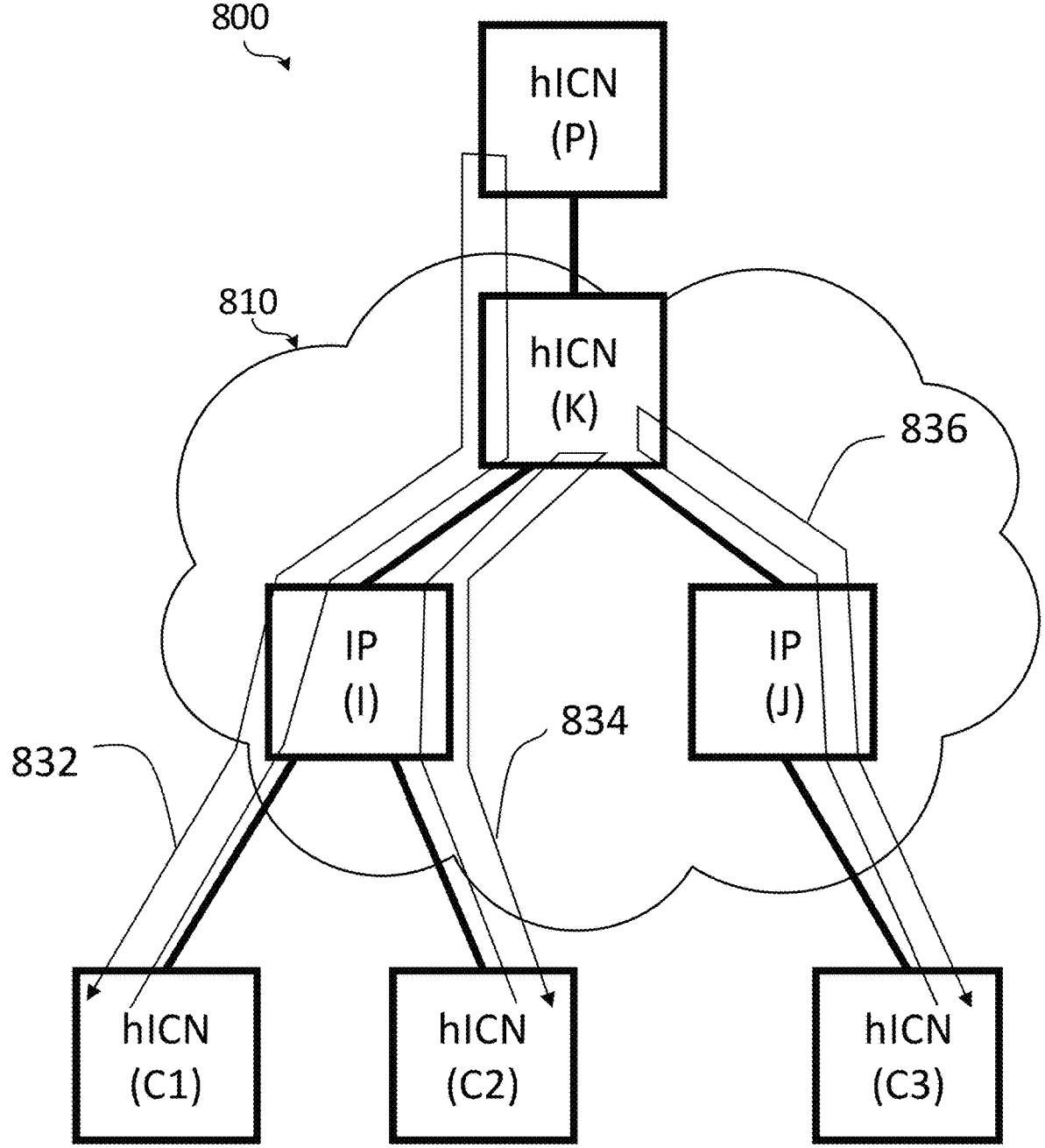
FIG. 8 is a simplified block diagram illustrating example details that can be associated with asynchronous multicast in an example hICN communication system according to some embodiments of the disclosure.

Referring to FIG. 8, FIG. 8 is a simplified block diagram illustrating example details that can be associated with asynchronous multicast in an example hICN communication system 800 according to some embodiments of the disclosure. In particular, the embodiment of FIG. 8 illustrates an example use case in which asynchronous multicast delivery of content can be provided via hICN communication system 800.

The example use case for the embodiment of FIG. 8, assumes a hICN node provisioned with a producer application (P) serving video chunks to three hICN nodes provisioned with consumer applications (C1), (C2), and (C3) to receive the video chunks. The infrastructure includes an IP network 810 which is illustrated in FIG. 8 in a significantly simplified form shown with three IP routing nodes, (I), (J) and (K)), where node (K) has been enhanced to be an hICN-enabled IP routing node (e.g., through a software upgrade, an appliance, by having an hICN VRF instance implemented thereon, etc.) to better serve content to users. The example use case for the embodiment of FIG. 8 further assumes that (P) serves a content chunk with IP address (a), and that the IP address (a) is properly routed within the IP network towards (P).

The following discussion can illustrate what happens when successive consumers are requesting a same content. Initially, consider that (C1) sends an IP Interest towards content (a), which is an IP Interest packet having ICN semantics, the IP address of (C1) in the SRC IP address field and (a) in DST IP address field.

Mapping of content name (a) to an IP address can be done in any manner as discussed for various embodiments described herein. This IP Interest, which can be denoted I<c1,a> traverses IP routing node (I) unmodified to reach the hICN-enabled IP routing node (K). hICN-enabled IP routing node (K) applies the different operations discussed for various embodiments described herein. Assuming the CS for the hICN-enabled IP routing node (K) is empty, the name-prefix contained in the IP Interest will be inserted into the PIT and associated to IP address of (C1), and the IP Interest packet will be rewritten on the output interface as I<k,a>, where k is the IP address of the hICN-enabled IP routing node (K). Assume in the meantime that (C2) also requests content (a). In the same way, I<c2,a> will reach (K) through IP routing node (I). The hICN-enabled IP routing node (K) can perform a lookup to locate an entry for (a) in the PIT, to which it will append the SRC IP (c2)—there is now IP (c1) associated with this PIT entry and IP (c2) associated with this PIT entry—and the IP Interest would I<c2,a> not be propagated further (e.g., it can be dropped).

Suppose now that the first IP Interest I<k,a> has continued its course and now reaches (P). It can be treated again according to an Interest forwarding pipeline for the hICN node, and answered locally and an IP Data packet will be generated, which can be denoted as D<a,k> following the same convention. The IP Data packet D<a,k> will be received by the hICN-enabled IP routing node (K), cached locally, and then forwarded back toward the C1 according to the forwarding pipeline for the hICN-enabled IP routing node. Because of the PIT entry in (K), (K) will issue two IP Data packets on the hICN face, an IP Data packet D<a,c1> that will be routed to (C1) via (I), and an IP Data packet D<a,c2> that will be routed to (C2) via (I), both due to the IP forwarding information contained in the PIT. Looking at IP traffic, traffic 832 can represent a path from (C1), which traverses the IP network 810 to (P), then down back to (C1) as would have been the case in a regular IP network. Traffic 834 can represent path initiated by (C2) that will have been terminated at the first ICN junction point (e.g., hICN-enabled IP routing node (K)) and answered back from there, thereby saving upstream resources. Thus, a form of multicast can be implemented in an hICN communication system based, at least in part, on interest aggregation on top of a regular IP network in accordance with various embodiments described herein.

Assume (C3) now requests the same content (a). According to a similar process, an IP Interest packet I<c3, a> will reach (K) through (J) and hit the CS. An IP Data packet D<a,c3> will be routed back through (J) and reach (C3). The traffic 836 also terminates at (K), and based on caching at (K), asynchronous multicast can be implemented again on top of a regular IP network.

hICN: Socket

Figure 9:
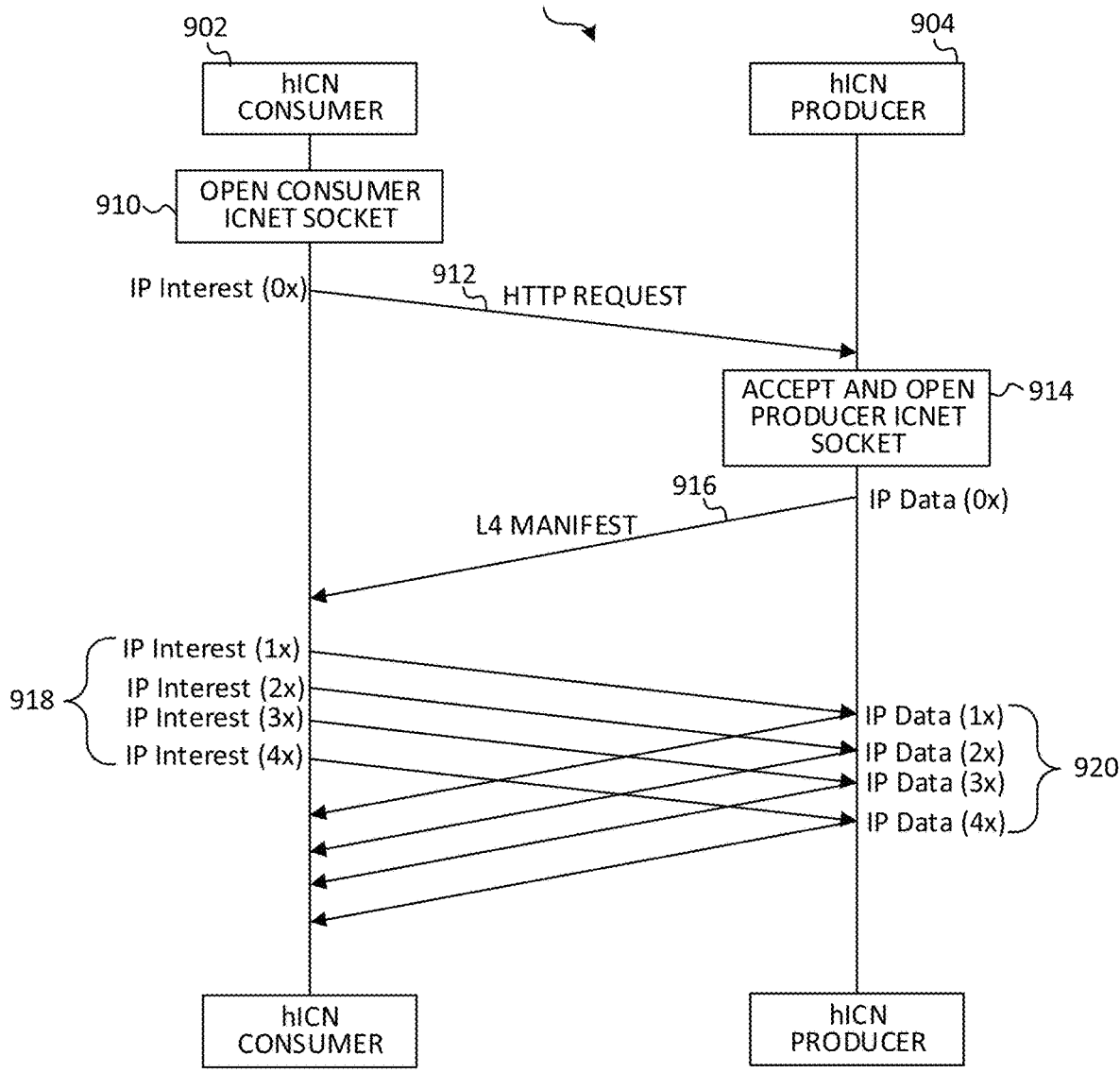
FIG. 9 is a simplified schematic diagram illustrating example details that can be associated with sockets that can be used in a hICN communication system according to some embodiments of the present disclosure.

Referring to FIG. 9, FIG. 9 is a simplified schematic diagram 900 illustrating example details that can be associated with sockets that can be used in an hICN communication system according to some embodiments of the present disclosure. FIG. 9 includes a hICN consumer 902 and a hICN producer 904.

For a hICN consumer requesting content, the hICN consumer can create a socket to facilitate the receipt of data to the consumer in accordance with at least one embodiment of the present disclosure. In various embodiments, a socket for a hICN communication system can have single or multiple consumers, and single or multiple producers, thereby providing for a multiple-endpoint communication model. Unlike traditional data pipes, the socket for hICN can support a synchronous multi-point to multi-point communication system, where an 'hICN network' (e.g., an IP network provisioned with one or more hICN-enabled IP routing nodes), which can represent a shared memory, enables consumers to get IP Data replies to IP Interest requests. Consumers do not need to establish a stable communication channel with the producer. Rather, consumers can connect to the network and can issue a request to a content name for a piece of content that can secured by a signature. Thus, the hICN network can be responsible for sending the replies to the consumer.

As referred to herein in this Specification, hICN socket can be referred to as an 'ICNET socket'. An ICNET socket application programming interface (API) can be based on a consumer and producer API. In various embodiments, an ICNET socket can deliver different kinds of services to the applications such as, for example, datagram (DGRAM), streaming (STREAM), or the like. The ICNET socket can employ a consumer-producer computing model from multi-process synchronization associated with distributed computing systems. The model can be based on several consumers and producers reading and writing one or multiple memories that are shared in a computing system (e.g., an hICN network). The ICNET socket can generalize this model to a global network offering shared distributed memories and communication services to several remote consumers and producers.

In various embodiments, the ICNET socket API can be implemented using several techniques by either using system calls from the operating systems like socket( ) bind( ) connect( ) listen( ) recv( ) etc. or by using a user space implementation providing the ICNET socket API as a shared library. While both implementations are possible, the latter approach can support fast evolutionary deployment in software in a large number of end points.

In the following discussion, without lack of generality, an example associated with HTTP is described, with a focus on the 'GET Request Method' which is the basis for adaptive bit rate (ABR) video distribution. However, the ICNET socket can also be used to support the HTTP 'POST Request Method' in accordance with embodiments described herein. The protocol stack can serve all applications currently transported using Transmission Control Protocol/Internet Protocol (TCP/IP), exploiting the opportunities given by a location independent network substrate as may be provided by an hICN communication system.

During operation, for example, the HTTP GET method can instantiate an ICNET consumer socket for a hICN consumer while a hICN producer can make use of an ICNET producer socket. A HTTP request message containing a GET method can make use of ICNET socket. Despite being optional, domain name system (DNS) is used in the exemplary use case to keep the current interface to the end points. TABLE 1, below illustrates example details for the example HTTP GET method.

TABLE 1

GET /video.mpd HTTP/1.1
Host: www.video.com
Accept-Language: en-us

An HTTP client for the hICN consumer can issue a request that triggers opening an ICNET socket for reliable transport service. This can also triggers a DNS query that is either locally or remotely resolved. The DNS resolution may use an A (e.g., as defined in IETF RFC 1035 for IPv4) or AAAA (e.g., as defined in IETF RFC 3569 for IPv6) record that translates a Uniform Resource Identifier (URI) into an IPv4 or IPv6 address for a given name-prefix associated with the request. In case the HTTP client is given an IP address instead of a URI, the DNS query would not be needed. TABLE 2, below, illustrates example details for an example DNS resolution.

TABLE 2

If not resolved at the browser/OS cache
    DNS Query
        video.mpd.www.video.com: type AAAA, class IN
            Name: video.mpd.www.video.com
            Type: AAAA (Host address)
            Class: IN (0x0001)
    Answers
        video.mpd.www.video.com: type AAAA, class IN, addr 2001:420:44f0:1302:c9da:2c04:b285:5528
            Name: video.mpd.www.video.com
            Type: AAAA (Host address)
            Class: IN (0x0001)
            Time to live: 3 days, 21 hours, 52 minutes, 57 seconds
            addr: 2001:420:44f0:1302:c9da:2c04:b285:5528

FIG. 9 illustrates message flows for an ICNET socket according to some embodiments of the present disclosure between hICN consumer 902 and hICN producer 904. At 910, an HTTP client for the hICN consumer opens a consumer ICNET socket using the IP identifying the resource (e.g., such as the address returned from the DNS query). If the HTTP request method is GET the ICNET socket issues (912) an IP Interest message having a sequence number 0x (e.g., IP Interest(seqno=0x)) carrying in the data payload the HTTP request and the hICN consumer transmits the IP Interest to an IP network that is provisioned with at least one hICN-enabled IP routing node. At 914, the hICN producer accepts the request and opens a producer ICNET socket. At 916, the hICN producer sends an IP Data message or response to IP Interest(0x) having a L4 manifest. The L4 manifest can include content names for downloading the HTTP response, for example IP address seqno=1x, 2x, 3x, 4x. The consumer triggers (918) transmissions of IP Interest (1x, 2x, 3x, 4x) flow controlled by the ICNET reliable socket. The IP Interest packets do not carry a data payload other than IP Interest(0x) carrying the HTTP request GET. If an in-network buffer intercepts and replies on behalf of the server end point, the transaction may never reach the server. For some applications, it may be useful to let IP Interest(0x) (e.g., the Interest message having the HTTP request in its payload) reach the server end-point (e.g., for accountability) while leaving network buffers reply (920) with the bulk of data Data(0x, 1x, 2x, 3x, 4x). TABLE 3, below, illustrates example details that can be associated with the exchanged between the hICN consumer and the hICN producer as shown in FIG. 9.

TABLE 3

ICNET consumer socket open
    Name Prefix: 2001:420:44f0:1302:c9da:2c04:b285:5528
    Data identifier: 0x (L4 manifest)
Interest (Name Prefix, Data Identifier = 0x)
                                ICNET producer socket accept
                                Interest (Name Prefix, Data Identifier)
                                ICNET producer socket send msg
              Data (Name Prefix, Data Identifier, Data = L4 manifest)

The HTTP request POST method can be performed in an hICN communication system as shown below in TABLE 4.

TABLE 4

HTTP/1.1 200 OK
Payload (video.mpd)

For HTTP adaptive streaming, successive HTTP requests can be used to retrieve video Media Presentation Description (MPD) and video segments as shown in TABLE 5, below.

TABLE 5

GET /quality4K/init.mp4 HTTP/1.1
Host: www.video.com
Accept-Language: en-us
    Consumer(s)  <-------------------> Producer(s) (or network buffer(s))
Data Transfer: Interest (mp4.init.quality4K.www.video.com, 0x)
                Interest (mp4.init.quality4K.www.video.com, 1x)
                Interest (mp4.init.quality4K.www.video.com, 2x)
                Data (mp4.init.quality4K.www.video.com, 0x)
                Data (mp4.init.quality4K.www.video.com, 1x)
                Data (mp4.init.quality4K.www.video.com, 2x)
[snip]
                                HTTP/1.1 200 OK
                                Payload (init.mp4)
GET /quality4K/seg-1.m4s HTTP/1.1
Host: www.video.com
Accept-Language: en-us
    Consumer(s)  <-------------------> Producer(s) (or network buffer(s))
Data Transfer: Interest (m4s.seg-1.quality4K.www.video.com, 0x)
                Interest (m4s.seg-1.quality4K.www.video.com, 0x)
[snip]
                                  HTTP/1.1 200 OK
                                Payload (seg-1.m4s)

Traditional sockets are not appropriate for ICN and hICN networks. For example, traditional sockets are generally location dependent, have single-endpoints, and bind a single IP address. Various advantages can be realized through the ICNET socket in accordance with various embodiments described herein. In at least one embodiment, one advantage can include that the ICNET socket is different than traditional sockets because the ICNET socket is location and endpoint-independent, can have multiple-endpoints, and binds on content name. In at least one other embodiment, another advantage can include that the ICNET socket is also free from the C10k problem (e.g., the problem of optimizing network sockets to handle a large number of clients at the same time, or inability of a server to scale beyond 10,000 connections or clients due to resource exhaustion). In still another embodiment, another advantage can include that the ICNET socket extends the consumer-producer model from multi-process synchronization to a network of shared memories to which multiple endpoints (consumers and producers) can read and write; thus, the producer in the ICNET socket is stateless and receipt of data from a producer may not require the consumer to maintain session or state information about the producer. Accordingly, through use of the ICNET socket, ICN and hICN communication systems can provide for the ability to route and deliver data to consumer(s) without having to maintain information about producer(s).

hICN: Fast In-network Authentication

Figure 10:
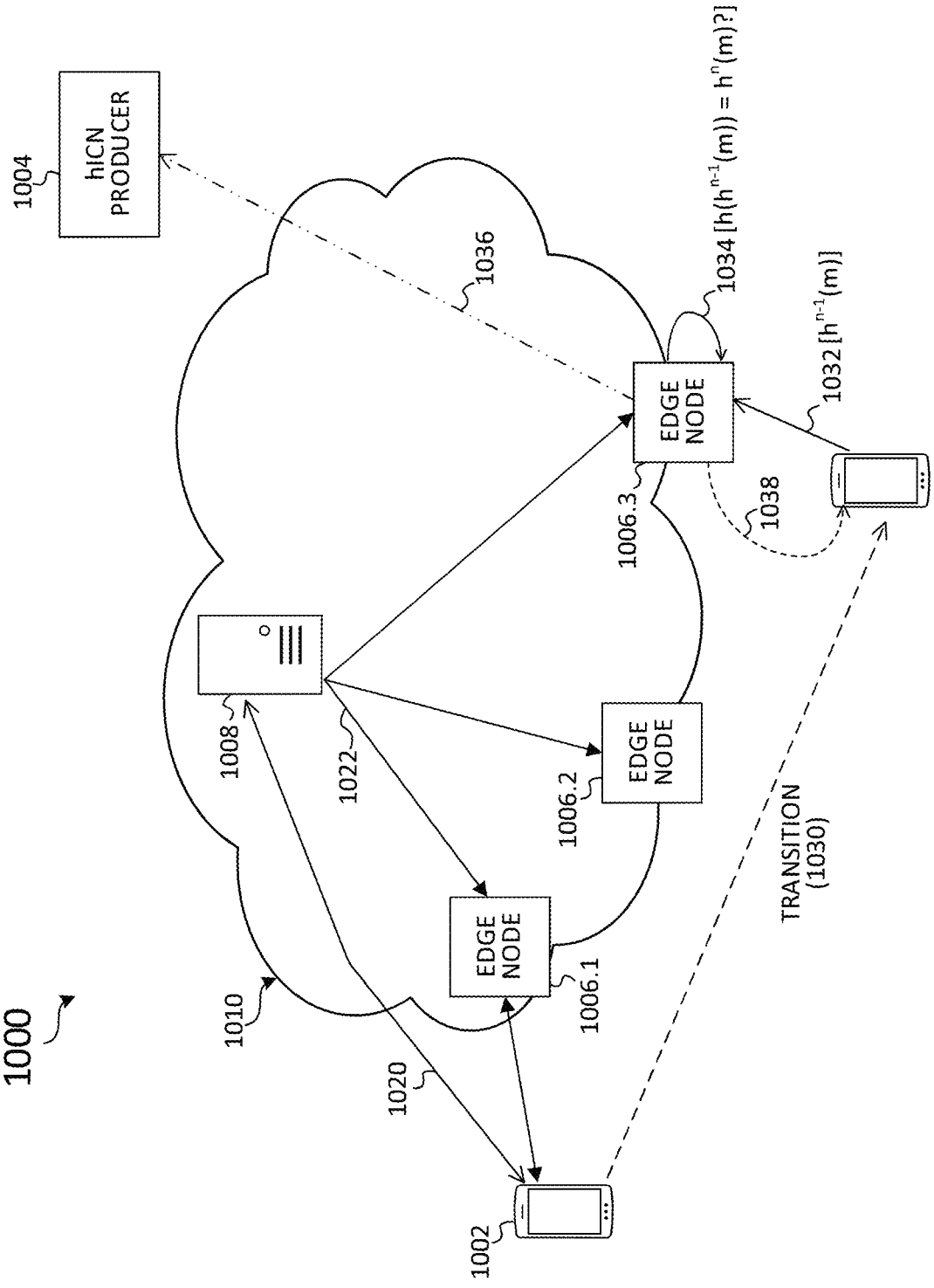
FIG. 10 is a simplified block diagram illustrating example details that can be associated with fast in-network authentication in a hICN communication system in accordance with some embodiments of the present disclosure.

Referring to FIG. 10, FIG. 10 is a simplified block diagram illustrating example details that can be associated with fast in-network authentication in a hICN communication system 1000 in accordance with some embodiments of the present disclosure. FIG. 10 includes a hICN-enabled user equipment (UE) 1002, an hICN producer 1004, and an IP network 1010 including a number of hICN-enabled edge nodes 1006.1-1006.3, and a registration server 1008. As referred to herein, hICN-enabled UE 1002 can also be referred to as a mobile user.

As discussed previously, an hICN communication system and the ICNET socket follow a consumer-producer model. Producers publish content in the form of named IP Data packets and consumers directly request these named IP Data packets by issuing IP Interest packets that carry the content name of the desired content. Due to its content-based communication, hICN communication systems can be an attractive candidate to support in-network access control for ICN content.

A fundamental step for implementing access control is user authentication. In particular, access control mechanisms require user authentication to verify the identity claimed by a user when it request access to a resource. The verification of the user identity allows the access control system to apply the proper access control policy to an access request issued by the user. Current access control systems use a centralized approach in which an Authentication, Authorization and Accounting (AAA) server implements all the different steps to allow or deny users to access a content. The drawback of such a centralized approach is that it increases the communication delay requesting for every request to a content a communication with the central server. This problem is more serious in a mobile network, in which a user might incur a notable degradation of its communication due to the increased delay.

To address this issue, a distributed approach as illustrated for the embodiment of FIG. 10 can provide for in-network authentication for a given user directly on the router to which the user is connecting, thus reducing authentication delay in accordance with one potential embodiment. The distributed approach can, in turn, provide for the design and implementation of distributed access control mechanism that exploits hICN routers to regulate user access to ICN content. The application of fast user and service authentication in the network is important, because the authentication scheme paves the way for secure network and service access in the 5G space where a user and a service would be delivered using very heterogeneous accesses: WiFi, Millimeter Wave Wireless communication (mm.Wave), Long Term Evolution (LTE), LTE-U, etc.

Some systems focus on network access only for providing access at L2: like WiFi and Ethernet as well as 3rd Generation Partnership Project (3GPP) networks. However, such L2 approaches do not allow roaming and are often tied to a specific Radio Access Network (RAN). Further, service access and authorization are not part of such systems.

Leveraging ICN network principles can provide content security and user identity management in a more flexible way. As illustrated in the embodiment of FIG. 10, a fast and distributed authentication mechanism can be implemented for mobile users (e.g., UE 1002) that desire access to content or services while moving in the network. In at least one embodiment, the mechanism exploits the ICN content based communications to verify a user's claimed user identity and bind it with user requests for accessing content or services. Thus, this mechanism can implement per-content request access control by applying access policies on the verified user identity. The mechanism can be facilitated through the use of the hash-chains to implement a fast and computationally lightweight user authentication that allows a distributed user authentication among the access point of a network. More specifically, hash-chains can be applied to authenticate consumers transmitting IP Interests to access content (e.g., via the ICNET socket).

A hash-chain is a sequence of 'n' values (called steps) generated by applying n times a non-invertible hash function H to a randomly selected value 'm'. Every step in the chain is generated by applying H to the previous step of the hash chain. The typical use of hash chains is issuing the steps of the hash chain in reverse (e.g., the first value to be used is the last step in the chain). Given a step j in the chain, namely $H^j(m)$, it is possible to verify the authenticity of a step $H^i(m)$, where i<j, by calculating $H^{j-i}H^i(m)$).

The fast in-network authentication mechanism illustrated for the embodiment of FIG. 10 assumes that central registration server 1008 is a network element that authenticates (1020) the mobile user 1002 (e.g., the hICN consumer) the first time the user issues a request for a content (e.g., via the ICNET socket). Such an authentication mechanism can be used to verify the authenticity of the identity expressed by the user. In at least one embodiment, the user can express its identity in the payload portion of an IP Interest packet. The result of this authentication phase can produce a user security context containing specific information for regulating the access of the user to the required content.

During operation, a user security context can be associated with a hash-chain that is generated by the mobile user 1002 and the registration server 1008 during the authentication phase. The association between the user security context and the hash-chain is implemented by including the anchor of the chain (e.g., the last calculated hash value $H^n(m)$ can represent the anchor of the chain) in the user security context. No assumptions are made on the authentication mechanism involved in this phase, besides that the registration server 1008 has the ability to distribute (1022) the resultant user security context among the edge nodes 1006.1-1006.3 in the IP network 1010.

Consider an operational example in which the fast in-network authentication mechanism can exploit the hash chain verification mechanism. Consider, for example, that after the mobile user authenticates (1020) to the registration server 1008 via edge node 1006.1 and every edge node 1006.1-1006.3 in the IP network 1010 receives (1022) the user security context from the registration server 1008. Consider that the mobile user 1002 transitions (1030) to another geographic location and connects for the first time to a different access point say, for example, edge node 1006.3, The mobile user 1002 can issue (1032) an authentication interest that includes the value for the step of the chain preceding the chain anchor, namely $H^{n-1}(m)$. An authentication interest can be an IP Interest that includes the chain anchor in the data payload portion of the packet. On receiving of the authentication interest, the edge node 1006.3 can apply the hash function to $H^{n-1}(m)$ and can determine (1034) whether the resulting value matches with the anchor of the chain (e.g., $H^n(m)$) contained in the security user context. Based on a determination that the two values match, the edge node 1006.3 can forward (1036) the IP Interest toward the requested resource or service and the requested resource can be sent (not shown) to the mobile user according to embodiments discussed herein. In some embodiments, an authorization can be performed in which an edge node grants access to a mobile user by communicating (1038) an explicit grant to the mobile user. Subsequent user movements would be repeated as described above. Each time a mobile user moves from one access point to another, the user would authenticate to the target access point by releasing the step in the chain that precedes the step used in the last fast authentication step (e.g., that precedes the anchor of the chain).

Accordingly, the fast in-network authentication illustrated for the embodiment of FIG. 10 provides for the ability to implement fast user authentication in the network edge without going through a new authentication process each time a user moves the requires different parties to interact to verify the level of authorization that one user is allowed to obtain by the network and/or content provider, depending on implementations and uses.

In accordance with various embodiments several advantages, depending on the specific applications, can be obtained by the fast and secure in-network authentication process. In at least one embodiment, one advantage can include that in the presence of network mobility a mobile user might attach to one or multiple points of attachment using one or multiple radio or fixed accesses. In such an embodiment, the point of attachment can be an example of a network edge routing node that can verify authentication, which can occur without causing a service disruption for an authorized user. In at least one embodiment, another advantage can include that the process can be fast and scalable to function properly when several users are attached to one or multiple points of attachment. In still another embodiment, another advantage can include that the protocol can also be used to verify service authorization for a given user (e.g., a user can get access to a set of services but not others services), which might be used also for Digital Rights Management (DRM) AAA type of services.

In still another embodiment, another advantage can include that the fast in-network authentication mechanism can be applied to different nodes in an hICN communication system. For instance, in one embodiment, the mechanism can be applied to consumers issuing IP Interest messages for content, which can be useful for DRM or other AAA type of services since an authenticated user can be checked whether the authenticated user is authorized to access content identified by the content name in an IP Interest message. In still some embodiments, the authentication mechanism can be applied to producers or hICN-enabled IP routing nodes transmitting IP Data messages, which can provide for the ability for an hICN network to verify that the content being transmitted on the network is authentic. In at least one embodiment, the authentication mechanism can be applied in addition to verifying the signature provided in the data message. In at least one embodiment, as nodes move from different access points of the network to another, an access point (e.g., edge routing node) can apply the fast authentication mechanism to authenticate the moving node.

ICN and hICN Robust Load Balancing

Figure 11:
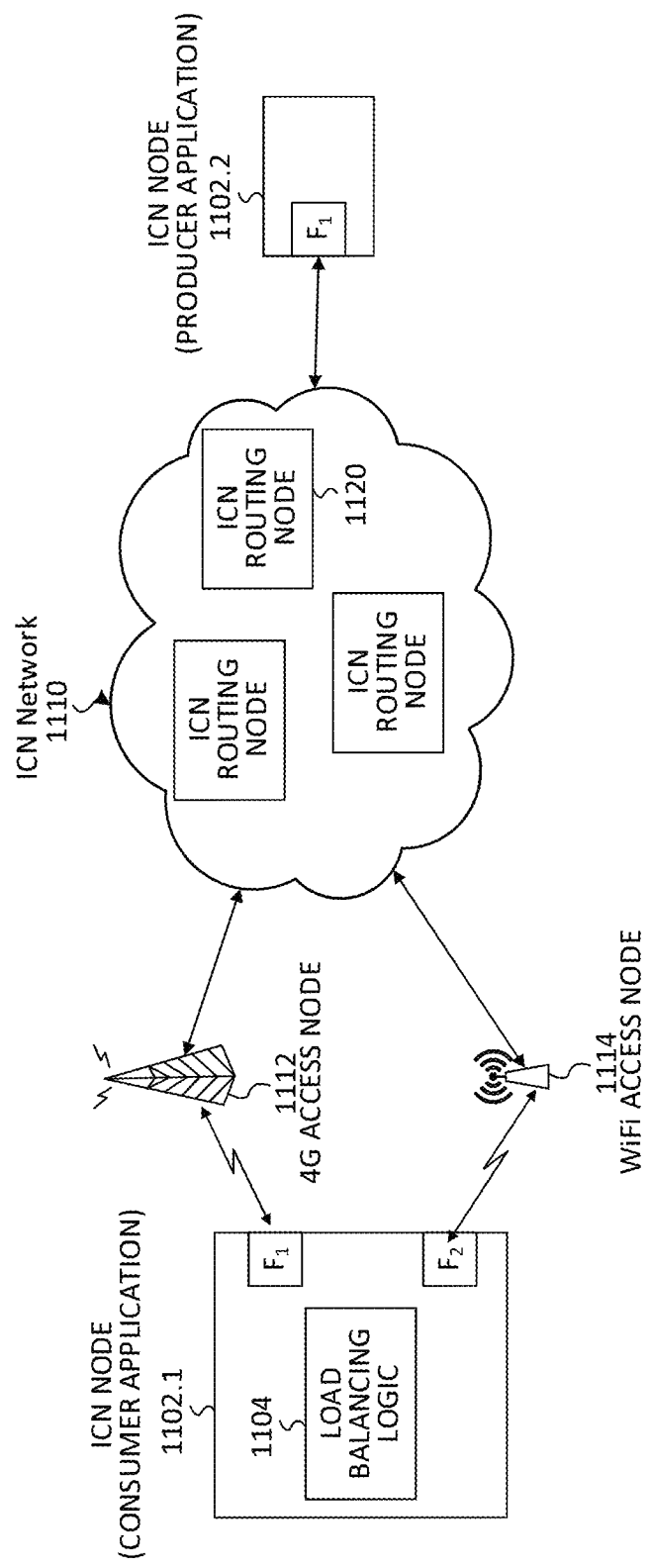
FIG. 11 is a simplified block diagram illustrating example details that can be associated with load balancing in accordance with some embodiments of the present disclosure.

Referring to FIG. 11, FIG. 11 is a simplified block diagram 1100 illustrating example details that can be associated with request load balancing in accordance with some embodiments of the present disclosure. FIG. 11 is described with reference to ICN faces for a ICN architecture; however, it should be understood that example features discussed for the embodiment of FIG. 11 can be realized in an hICN communication system in which ICN faces are provisioned for hICN-enabled IP routing nodes via hICN VRF instances instantiated for each routing node. FIG. 11 includes a ICN nodes 1102.1 having a consumer application provisioned therefor (e.g., a ICN consumer) and an ICN network 1110. Also illustrated for FIG. 11 are a number of radio access nodes including a 4G access node 1112 and a WiFi access node 1114. It should be understood that the ICN network 1110 can including a number of ICN routing nodes 1120 and can further connect to a number of ICN producers, such as ICN node 1102.2. ICN node 1102.1 can be provisioned with a number of ICN faces identified using a '$F_X$' labeling (e.g., $F_1$-$F_2$) and load balancing logic 1104. ICN node 1102.1 can be provisioned with 4G and WiFi radios enabling the node to connect to ICN network 1110 via 4G access node 1112 and WiFi access node 1114.

ICN and hICN communication networks are natively multipath. To ensure maximum network resource utilization, each node should be able to split the traffic at each hop in an optimal way. Herein, a solution is described for a client node (e.g., an ICN consumer an ICN architecture or hICN consumer for an hICN architecture), where a load-balance forwarding strategy splits the traffic in an optimal way over multiple paths, even if the client is connected to the network using different RATs with very different characteristics. Not all protocols work properly in cases where the available paths have different propagation delays. Typical protocols tend to prefer the path with a small propagation delay, even in cases in which the smallest propagation delay path may have less bandwidth than others. This can lead to a suboptimal usage of network resources. In addition, some load balancers offer suboptimal behavior when multiple paths with different propagation delays are used. In particular, some load balancers are biased toward the path with the smallest propagation delay.

In accordance with at least one embodiment, nodes (e.g., consumers and/or routing nodes) can be enhanced with load balancing logic that provides for the ability to account for the propagation delay of all paths in a network to provide optimal load balancing. This is particularity important at the consumer side, where a consumer (e.g., ICN node 1102.1) may be connected to the network using multiple technologies with different characteristics (e.g., different propagation delays, different loss rates), such as WiFi and 4G/LTE. In such embodiments, the load balancer can consider propagation delay that is intrinsic to each technology in order to avoid bias towards paths with small propagation delay.

In accordance with at least one embodiment, the load balancing logic 1104 described herein can provide for the ability to equalize the differences between paths to forward interests in an optimal manner. In particular, the load balancing logic 1104 can estimate propagation delay of different paths using a propagation delay estimation protocol in order to provide load balancing over multiple paths.

The propagation delay estimation protocol can be executed at the ICN face level to perform delay measurements at the face level in order to exclude the forwarding delay from the measurements. In at least one embodiment, the delay introduced by in-network retransmission algorithms may not be taken into account since the messages sent by the estimation protocol can be processed at a lower level. To minimize the impact of the transmission delay on the measurements, the propagation delay estimation protocol provides for generating small messages, such as interest packets, which can be used to determine the propagation delay at one hop distance.

During operation, to estimate the propagation delay associated with each face of a given node, the node, via load balancing logic provisioned therefor, can send probe messages or, more generally, probes, across each face at regular intervals and measure the round trip time (RTT) of these messages based on the time at which data messages are received for the probe messages. Per face delay estimations can be stored by the node in order to perform load balancing operations. The minimum value measured is used as an estimation of the propagation delay on the path behind the face. In at least one embodiment, probes can be sent in large intervals (e.g., 1 second or more) in order to minimize the traffic generated on the network.

In at least one embodiment, the propagation delay estimation protocol can be used estimate the propagation delay as follows. To begin, a given node can generate a probe message with a special name such as, for example, '/prop_delay/probe' and can transmit the probe message across each face. There is no need for synchronization between the faces. When probe messages are sent, the node can register a respective time stamp for each respective face. A neighboring node can receive the probe message at a corresponding face and can recognize probe message /prop_delay/probe as a special type of message associated with the propagation delay estimation protocol and can respond with a reply data message such as, for example, '/prop_delay/reply'. Further, based on the determination that the probe message is associated with the propagation delay estimation protocol, the probe can be discarded by the responding node and not passed to the forwarding engine of the node. In various embodiments, 4G access node 1112 and WiFi access node 1114 can be enhanced with logic and/or other functionality that can enables the access nodes to perform ICN and/or hICN-based operations as discussed herein.

The node that sent the probe can receive the reply message and can compute the RTT for each face. If the RTT is smaller than the estimated propagation delay that is currently saved for a given face, the propagation delay for the given face can be updated. The reply message can be discarded.

For each face and for each name-prefix the load balancing logic 1104 keeps track of a pending interests (PI) count, which can represent a number of Interests sent on a certain face but not yet satisfied. For example, load balancing logic 1104 can provide for maintaining a PI counter for a given face that can be incremented each time that an interest with a certain name-prefix is transmitted on a given face and that can be decremented when a corresponding data packet (or a timeout) is received for each pending Interest. In at least one embodiment, a moving average of the PI counter for each face can be calculated to smooth outliers. The load balancing logic can also be used to determine the minimum propagation delay among all available output faces using the collected the propagation delays for each face (e.g., based on estimations calculated using the propagation delay estimation protocol, as discussed previously).

Each time an Interest is to be transmitted, the ICN node 1102.1, via load balancing logic 1104, can select an output upon which to send the Interest based on a probability proportional to:

$$\frac{1}{\text{avg}(PI) * \frac{\text{minimum propgation delay}}{\text{face propagation delay}}}$$

In words, the probability of selecting a particular output face is based on 1 divided by a product of a moving average of a pending interests count (PI) for the particular face and a minimum propagation delay among all the output faces divided by the propagation delay of the particular face. Using the above proportionality, load balancing logic provisioned for consumers can, it at least one embodiment, provide for the ability to better utilize network resources, thereby increasing the bandwidth available at each consumer. Thus, in at least one embodiment, the solution provided via the load balancing logic can provide for the ability to take into account the propagation delay that is intrinsic to multiple access technologies to avoid biasing Interests towards paths having only the smallest propagation delay.

Figure 12:
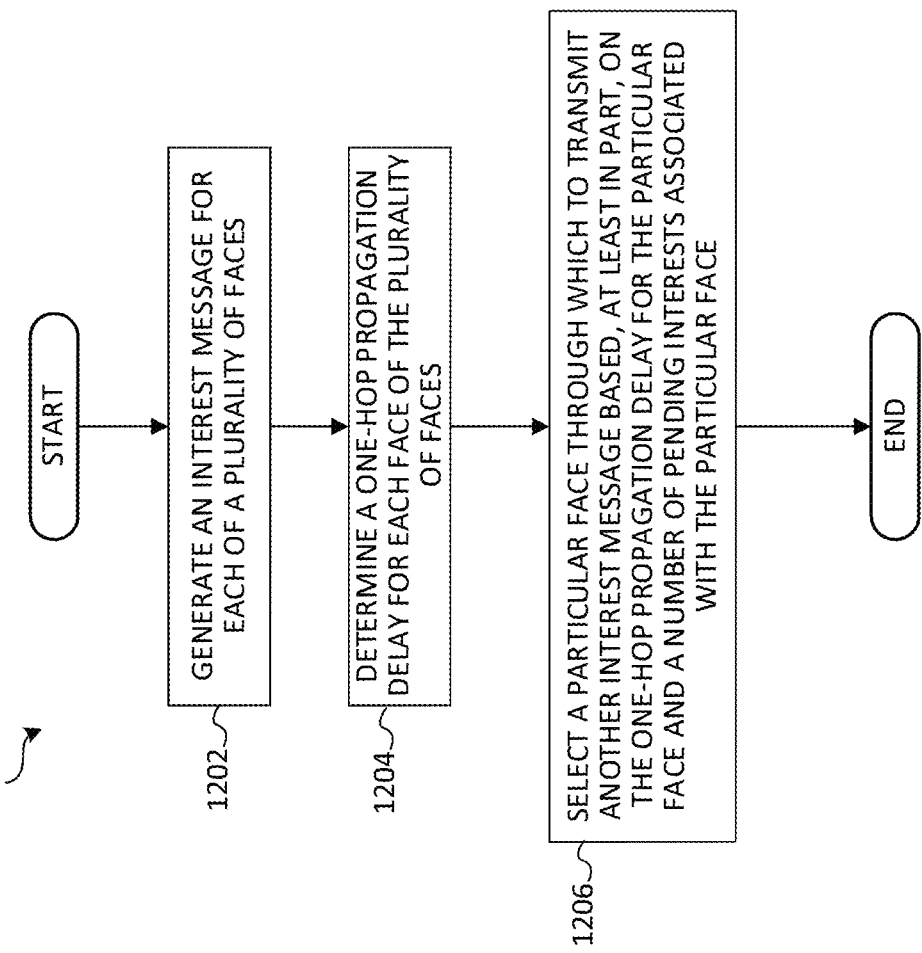
FIG. 12 is a simplified flow diagram illustrating example details that can be associated with load balancing operations that can be performed in accordance with some embodiments of the present disclosure.

Referring to FIG. 12, FIG. 12 is a simplified flow diagram 1200 illustrating example details that can be associated with load balancing operations that can be performed in accordance with some embodiments described herein. At 1202, the operations can include generating an Interest message for each of a plurality of faces of a given node. The Interest message can be a probe message having a unique name that is to be recognized by neighboring node(s) as being used to estimate propagation delay such that the neighboring node(s) can discard the probe message upon receiving it rather than forwarding the probe message.

At 1204, the operations can include determining a one-hop propagation delay associated with each of the plurality of faces. In at least one embodiment, the operations at 1204 can include determining a RTT for each face that corresponds to the difference between a time at which the probe message was sent and a time at which a response for the probe message was received.

At 1206, the operations can include the node selecting a particular face through which to transmit another Interest message (e.g., an Interest message associated with a particular name-prefix) based, at least in part on the one-hop propagation delay for the particular face and a number of pending Interests associated with the particular face. In at least one embodiment, the selecting can be performed based on a probability proportional to an inverse of the average number of pending interests for the particular face multiplied by a quantity comprising the minimum propagation delay associated with the plurality of faces divided by the one-hop propagation delay associated with the particular face.

ICN and hICN: Remote Adaptive Active Queue Management

Figure 13:
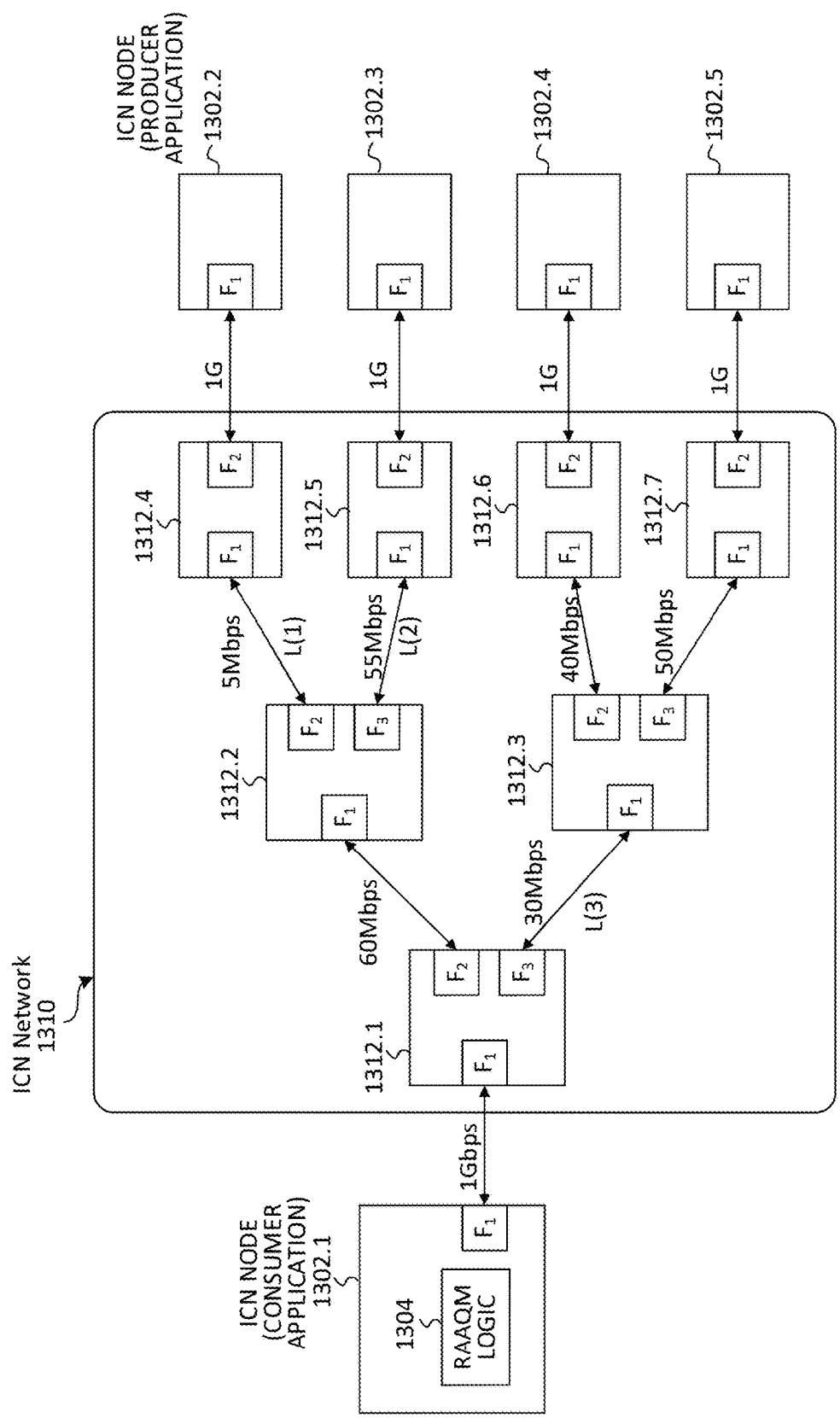
FIG. 13 is a simplified block diagram illustrating example details that can be associated with a remote adaptive active queue management (RAAQM) transport protocol in accordance with some embodiments of the present disclosure.

Referring to FIG. 13, FIG. 13 is a simplified block diagram 1300 illustrating example details that can be associated with a remote adaptive active queue management (RAAQM) transport protocol in accordance with some embodiments of the present disclosure. FIG. 13 includes a ICN node 1302.1 having a consumer application provisioned therefor (e.g., a ICN consumer), ICN nodes 1302.2-1304.5, each having a producer application provisioned therefor (e.g., ICN producers) and an ICN network 1310 including a number of ICN routing nodes 1312.1-1312.7. Each ICN node 1302.1 and 1302.2-1302.4 and each ICN routing node 1312.1-1312.7 can be provisioned with a number of ICN faces identified using a '$F_X$' labeling.

In general, a transport protocols can implement segmentation and reassembly as a basic function. It applies then a flow control mechanism to manage network throughput as well as a congestion control mechanism to manage network losses. For both mechanisms to optimally work in different network settings, a specific parameterization can be implemented. The protocol considered herein, referred to as Remote Adaptive Active Queue Management (RAAQM) can provide a flow and/or congestion control for ICN and hICN architectures. ICN node 1302.1 can be provisioned with RAAQM logic 1304 to facilitate RAAQM operations discussed herein.

A receiver (e.g., ICN node 1302.1) may be interested in congestion control and, more specifically, determining which path to use to send Interest messages and how often to send Interest messages (e.g., at a given rate). Consider, for example, that a receiver may have a congestion window of Interests, which defines the maximum number of outstanding Interests the receiver is allowed to send. The window can be defined based on propagation delay of a path. In some cases, the window size and rate can be adapted based on bottlenecks in the network.

In at least one embodiment, the protocol can make use of several parameters that can be optimized for different kind of network accesses such as, for example, WiFi, LTE, or the like which are very different than Ethernet. Optimal parameterization utilizes a tuning algorithm to select the best or optimal set of parameters for a given network setting. Moreover, tuning is preferably done for applications with heterogeneous access where a mobile terminal can simultaneously connect to one or multiple networks with very different characteristics in terms of loss rate, delay and variability. It is desirable to automatically tune RAAQM transport protocol parameters in ICN and hICN architectures whose performance has been extensively tested by experimentation. Auto tuning for transport protocols exists for TCP and is implemented in different ways in the different operating systems: Windows®, MAC OS®, Linux, etc.

In order to allow the RAAQM transport protocol to determine a proper window size and utilize the bandwidth available on all the paths, two RAAQM parameters 'Pmax' and 'Beta' can be tuned. In at least one embodiment, P can be considered to be a monotonically increasing function of round trip time ranging from a minimum value Pmin to a maximum value Pmax. Pmax can used to modify a probability function 'P' that triggers the reduction of the window size and Beta can represent a decrease factor value, always smaller than 1. In at least one embodiment, the probability function P can be represented as 'P=Pmin+(Pmax−Pmin)* (RTT−RTTmin)/(RTTmax−RTTmin)' where RTTmin and RTTmax respectively represent a minimum and a minimum round trip time across a window of RTT samples (e.g., 30 samples).

During operation, each time RAAQM logic 1304 decides to reduce the window size (based on Pmax), the window size is multiplied by Beta to cause the reduction. According to the bandwidth and the propagation delay of each path, these parameters can be adjusted so that control logic for the receiver uses the correct window size at a given time for a particular path or channel. A tuning mechanism is of particular importance when a client uses multiple access technologies.

For example, LTE generally has a large propagation delay, so RAAQM logic 1304 can be provisioned to push more data on the channel to fully use the bandwidth. In contrast, Ethernet has a small propagation delay and requires a more aggressive management of the window size.

In order to dynamically adjust RAAQM parameters according to the paths that are in use at a given time, different 'profiles' having different sets of RAAQM parameters can be defined off-line for different access technologies and different ranges of propagation delays. For example, a profile associated with a particular range of propagation delays can include a particular Pmax and Beta that can be used to adjust the window size for a set of paths (e.g., for a particular access technology). In at least one embodiment, an estimated propagation delay for an end-to-end path can estimated using the RTT computed by RAAQM logic 1304 for each packet. From the different RTTs, the minimum RTT measured on the path can be used as the estimated propagation delay for that path.

In at least one embodiment, a path can be labeled by encoding in a Data packet a 1 byte value that can include face identifiers (IDs) for each output face traversed by the Data packet on its path back towards a given consumer. The encoding can be initiated from the first hitting cache in the path of the corresponding Interest or the producer. The series of output face IDs from a source to a consumer is a unique number even if face IDs are labeled locally at each hop along the path. Thus, the series can be encoded along the path and hashed in 1 byte.

During operation, the selection of a profile can be performed by first estimating the propagation delay of each path associated using RTTs. RAAQM logic 1304 can select the maximum propagation delay estimated among all the paths in use. Using these values, RAAQM 1304 can select a profile for use until a next profile selection. In at least one embodiment, the profile can be selected according to the path with the highest propagation delay (e.g., a worst-case scenario); thereby providing for aggressive management of the window size for the particular access technology.

Several cases can trigger a profile selection. In one embodiment, a profile selection can be triggered in response to discovering a new path. For instance, when a new path is discovered, ICN node 1302.1, via RAAQM logic 1304, can determine whether the new path has a higher propagation delay with respect to the paths that are already in use. If this is the case, a new profile selection is executed. In another embodiment, a startup procedure can trigger a profile selection. In still another embodiment, a profile selection is triggered when an Interest timeout occurs. An Interest timeout is usually symptom of network congestion, which may be caused by a misconfiguration of RAAQM parameters for a particular profile. In case of timeout, a new profile selection is executed to check if the current profile is correct. In still another embodiment, profile selection can be triggered when a path becomes stale. For example, based on a determination that messages have not been received from a certain path for a certain amount of time, the path can be considered stale and marked as "stale". A path that is marked as stale is not taken into account in the profile selection. Note that a stale path may become active in the future. In this case a new propagation delay would be estimated and the stale mark would be removed.

Accordingly, the RAAQM transport protocol provides for the ability to automatically select the best parameters to provide flow and/or congestion control at the receiver endpoint in an ICN or hICN architecture.

The RAAQM transport protocol can be highly efficient in cases where an end receiver is accessing an ICN or hICN network using different access technologies such as, for example, LTE, WiFi, mm.wave, or the like that have very different characteristics in terms of loss rate, delay and fluctuations. The auto tuning mechanism is useful to provide a transport protocol for ICN and hICN architectures, in which receivers can automatically set the best set of RAAQM parameters for any kind of network access used to access an ICN or hICN network. Auto tuning provides optimal usage of the access channel.

With respect to auto tuning that can be provided by the RAAQM transport protocol, the mechanism is applied at the receiver only and not at the sender which is stateless in ICN and hICN. In at least one embodiment, an advantage of RAAQM transport protocol can be realized when a receiver can exploit multiple paths such that the transport protocol can enable the receiver to fully use the available bandwidth over multiple paths, without any a-priori knowledge of the network.

Consider the ICN network 1310 illustrated for the embodiment of FIG. 13 in which the available bandwidth (e.g., in gigabits per second (Gbps) or megabits per second (Mbps)) associated with links between ICN nodes is illustrated with respect to each link.

Figure 14:
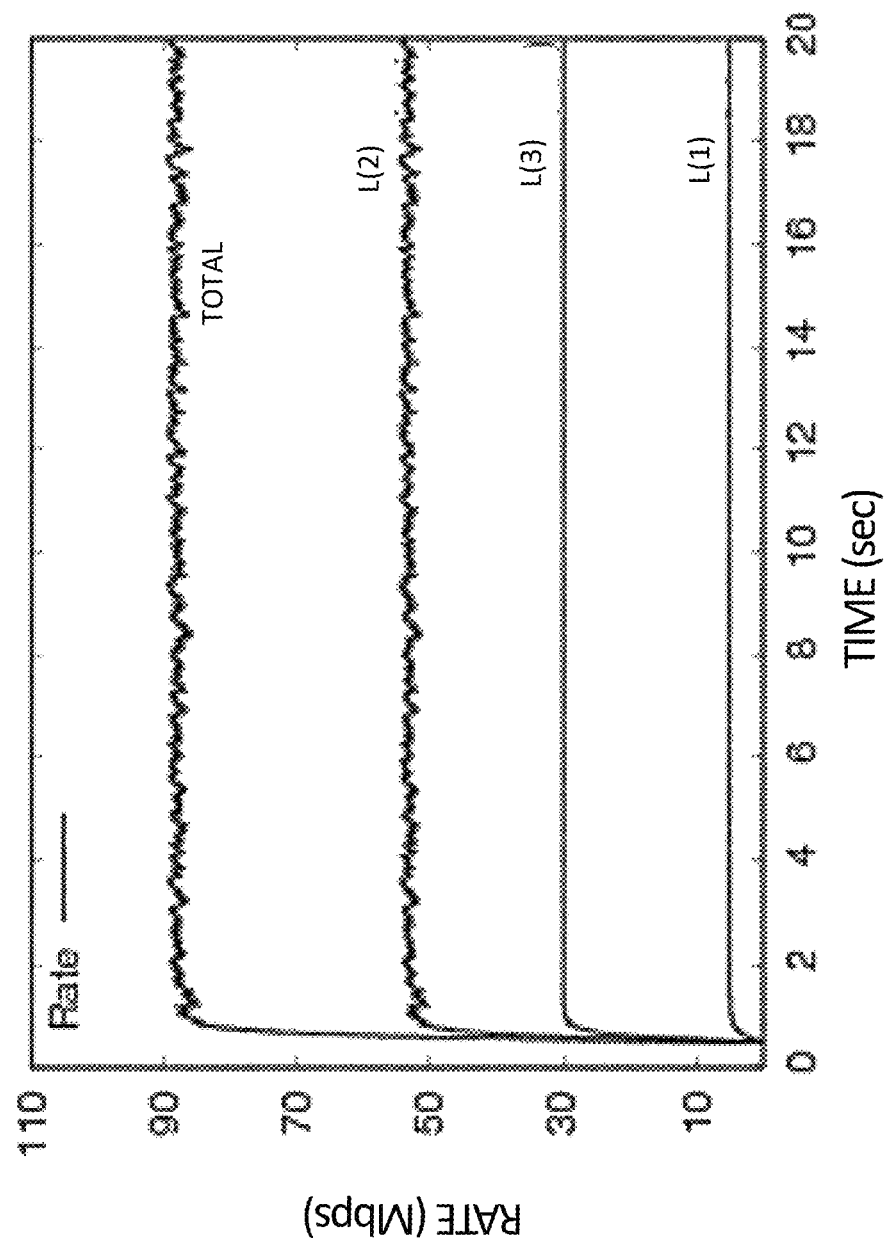
FIG. 14 is a simplified graph illustrating example throughput rates across time that might be measured between various nodes of FIG. 13.

Referring to FIG. 14, FIG. 14 is a simplified graph 1400 illustrating example rates across time that might be measured for links between various nodes of FIG. 13 that might be considered bottle necks for ICN network 1310 (e.g., link L(1) at 5 Mbps between 1312.2 and 1312.4, link L(2) at 55 Mbps between 1312.2 and 1312.5, and link L(3) at 30 Mbps between 1312.1 and 1312.3). FIG. 14 also illustrates a total rate measured at the consumer of approximately 90 Mbps, which is the maximum available throughput for the consumer (e.g., the maximum throughput available between any two nodes in the ICN network 1310).

The auto-tuning features that can be provided the RAAQM transport protocol can provide particular advantages when a client uses different access technologies. For example, in a typical TCP scenario, when a client switches from WiFi to LTE a new connection is established and the client has to wait for the window to converge to the right size from the sender side.

The RAAQM transport protocol, in contrast, can enable a client to use both the connections for some time and, thanks to the auto tuning, the protocol can provide for the ability to select a corresponding set of RAAQM parameters and uses the maximum available bandwidth upon connection establishment. The RAAQM transport protocol can provide auto tuning from the receiver side in which traffic can continue to be sent traffic on the available resources for both connections. The auto tuning ensures that RAAQM is well set in order to exploit the available bandwidth in all the conditions. TCP requires some parameters setting as well. However, for TCP, the parameter tuning is done off line (e.g. in Linux systems by editing the files in /proc/sys/net/core and /proc/sys/net/ipv4) before a TCP connection is established. In contrast for RAAQM auto tuning, the RAAQM parameters can be adjusted on the fly while a client is downloading content.

As discussed previously, RAAQM auto tuning can adapt RAAQM parameters in several cases such as, for example, when a new path is discovered, when a path is not used anymore, etc. When a new path is discovered, RAAQM logic can be used to determine and estimate of the path delay after one RTT, so the algorithm can adapt very fast. When a path is not used anymore, more time may be conclude that the path is not used anymore. In some embodiments, a path may be considered based on a determination that the client does not receives any message from that path for at least 1 second (or some other suitable amount of time). In cases of short lived connections, the RAAQM transport protocol can be used advantageously since the adaptation for new path discovery can utilize only one RTT (or few of them, for cases in which the first RTT estimation might be an outlier). In cases of long lived connections (where it is possible to observe path variation), the RAAQM transport protocol has enough time to converge to an appropriate profile selection.

Figure 15:
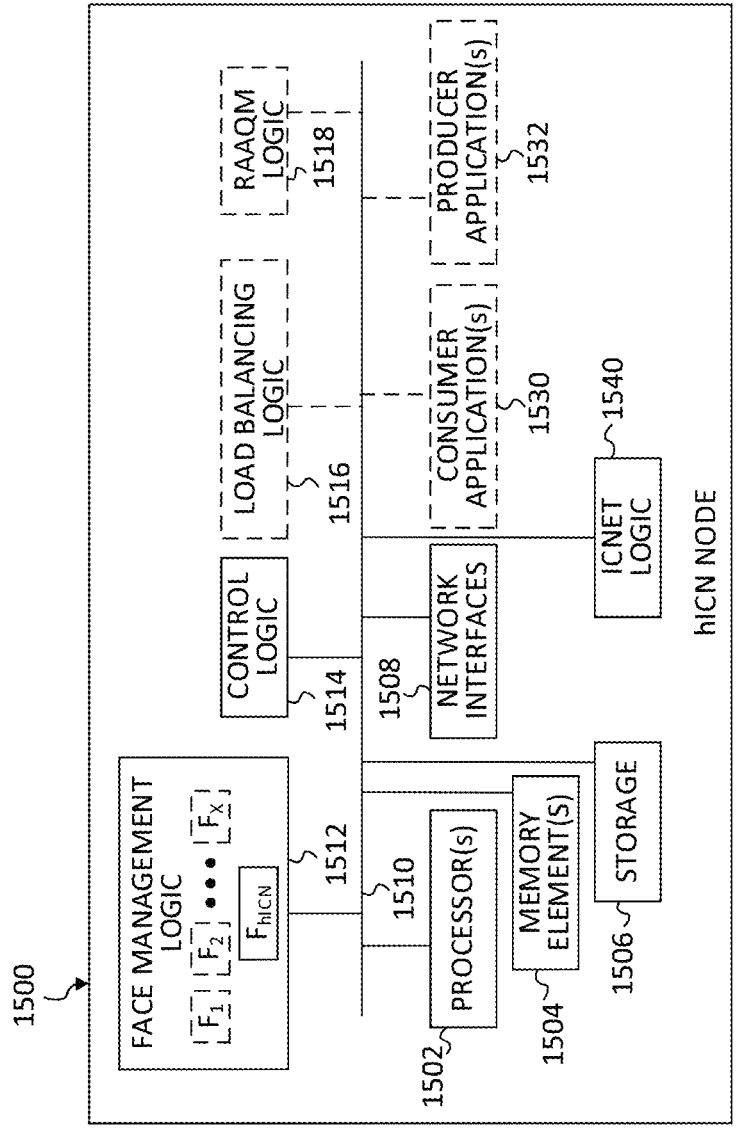
FIG. 15 is a simplified block diagram illustrating example details that can be associated with an example hICN node in accordance with some embodiments of the present disclosure.

Referring to FIG. 15, FIG. 15 is a simplified block diagram illustrating example details that can be associated with an example hICN node 1500 according to some embodiments of the present disclosure. The hICN node 1500 can represent any hICN node such as, for example, hICN node 202.1 or hICN node 202.2 as shown for the embodiment of FIG. 2, hICN nodes shown for the embodiment of FIG. 8, hICN consumer 902 or hICN producer 904 shown for the embodiment of FIG. 9, UE 1002 shown for the embodiment of FIG. 10 or any hICN node that may be deployed, depending on variations and implementations, to facilitate integration of ICN into an IP network in accordance with various embodiments described herein. In some embodiments an ICN node can be configured similar to hICN node 1500 with the exception that an ICN node may not support provisions for a hICN face in a conventional ICN architecture.

In at least one embodiment, hICN node 1500 can include can include one or more processor(s) 1502, one or more memory element(s) 1504, storage 1506, network interfaces 1508, a bus 1510, face management logic 1512, control logic 1514, and ICNET logic 1540.

In still some embodiments, hICN node 1500 can be provisioned with load balancing logic 1516 and/or RAAQM logic 1518. In still some embodiments, hICN node 1500 can be provisioned with one or more consumer application(s) 1530 and/or producer application(s) 1532. In some instance, for example, an hICN node can be a consumer of content and in other instances the hICN can be a producer of content.

In at least one embodiment, processor(s) 1502 is/are at least one hardware processor configured to execute various tasks, operations and/or functions for hICN node 1500 as described herein according to software, instructions, or other program code configured for the node. In at least one embodiment, memory element(s) 1504 and/or storage 1506 is/are configured to store data, information, software, instructions and/or logic associated with hICN node 1500 (e.g., data structures, logic, etc. can, in various embodiments, be stored using any combination of memory element(s) 1504 and/or storage 1506). In various embodiments memory element(s) 1504 may include one or more physical memory devices such as, for example, local memory and/or one or more bulk storage devices. A local memory may refer to random access memory or other non-persistent memory device(s) generally used during actual execution of the program code. A bulk storage device may be implemented as a hard drive or other persistent data storage device. In some embodiments, hICN node 1500 may also include one or more cache memories (not shown) that provide temporary storage of at least some program code in order to reduce the number of times program code must be retrieved from a bulk storage device during execution.

In various embodiments, network interfaces 1508 can enable communication between hICN node 1500 and other network elements that may be present in an hICN communication system to facilitate operations as discussed for various embodiments described herein. In various embodiments, network interfaces 1508 can be provisioned to support one or more communication protocols, routing protocols, etc., one or more Ethernet driver(s) and/or controller(s), Fibre Channel driver(s) and/or controller(s), Institute of Electrical and Electronics Engineers (IEEE) Standard 802.11 (e.g., WiFi), or other similar protocols, network interface driver(s), and/or controller(s) to enable communications for hICN node 1500 within an hICN communication system. In some embodiments, the network interfaces can include a RF receiver for receiving RF transmissions that may be transmitted OTA by other network elements to the hICN node 1500, a RF transmitter for RF transmissions from the hICN node 1500 to other network elements, and one or more antenna(s). Modems, cable modems, Ethernet cards, WiFi radios, 3GPP radios, or the like are examples of different types of network interfaces that may be used with the hICN node 1500.

In at least one embodiment, bus 1510 can be configured as an interface that enables one or more elements of hICN node 1500 (e.g., processor(s) 1502, memory element(s) 1504, logic, faces, interfaces, etc.) to communicate in order to exchange information and/or data. In at least one embodiment, bus 1510 may be implemented as a fast kernel-hosted interconnect, potentially using shared memory between processes (e.g., logic, etc.), which can enable efficient communication paths between the processes.

In some embodiments, Input/output (I/O) devices (not shown) can optionally be coupled to the hICN node. Examples of input devices may include, but are not limited to, a keyboard, a pointing device such as a mouse, or the like. Examples of output devices may include, but are not limited to, a monitor or a display, speakers, or the like. Input and/or output devices may be coupled to the node either directly or through intervening I/O controllers.

In an embodiment, input and the output devices may be implemented as a combined input/output device. An example of such a combined device is a touch sensitive display, also sometimes referred to as a "touch screen display" or simply "touch screen". In such an embodiment, input to the device may be provided by a movement of a physical object, such as, for example, a stylus or a finger of a user, on or near the touch screen display.

In at least one embodiment, face management logic 1512 can include instructions that, when executed (e.g., by one or more processor(s) 1502), enables communications between hICN node 1500 and other network elements via at least one hICN face. In some embodiments, face management logic 1512 can include instructions that, when executed, enables communications between hICN node 1500 and other network elements via an 'X' number of faces $F_1$-$F_X$ provisioned for the hICN node 1500 to facilitate operations discussed for various ICN-based embodiments described herein.

In various embodiments, ICNET logic 1540 can include instructions that, when executed, enables hICN node 1500 to perform ICNET socket operations as discussed for various embodiments described herein. In some embodiments, ICNET logic 1540 can be implemented as an ICNET API as part of a hICN protocol stack that can be provisioned via user space and/or kernel space for hICN node 1500. In various embodiments, a hICN protocol stack can provide network layer functionality for PIT/CS/FIB and face functionality and transport layer functionality for consumer and producer operations such as, for example, segmentation, naming, signing, etc. for a producer and request, reassembly, etc. for a consumer.

In various embodiments, load balancing logic 1516 can include instructions that, when executed, cause hICN node 1500 to perform load balancing operations as discussed for various embodiments described herein. In various embodiments, RAAQM logic 1518 can include instructions that, when executed, cause hICN node 1500 to perform RAAQM operations as discussed for various embodiments described herein.

In various embodiments, consumer application(s) 1530 that may be provisioned for hICN node 1500 can be provisioned to request content via one or more IP Interest packets or, in some instances, via one or more Interest packets. Consumer application(s) can perform other operations in accordance with various embodiments described herein. In various embodiments, producer application(s) 1532 can be provisioned to send content via one or more IP Data packets (or Data packets, if conventional ICN support is provided) in response to one or more received IP Interest packets (or Interest packets, if conventional ICN support is provided) requesting content that may be stored at hICN node 1500. Producer application(s) 1532 can perform other operations in accordance with various embodiments described herein.

In various embodiments, control logic 1514 can include instructions that, when executed (e.g., by one or more processor(s) 1502), cause hICN node 1500 to perform operations, which can include, but not be limited to: providing overall control operations of hICN node 1500; cooperating with other logic, applications, etc. provisioned for hICN node 1500; maintaining and/or interacting with stored data, information, parameters, etc. (e.g., memory element(s), storage, data structures, databases, tables, etc.); combinations thereof; and/or the like to facilitate various operations as discussed for various embodiments described herein.

hICN Video over WiFi

Figure 16:
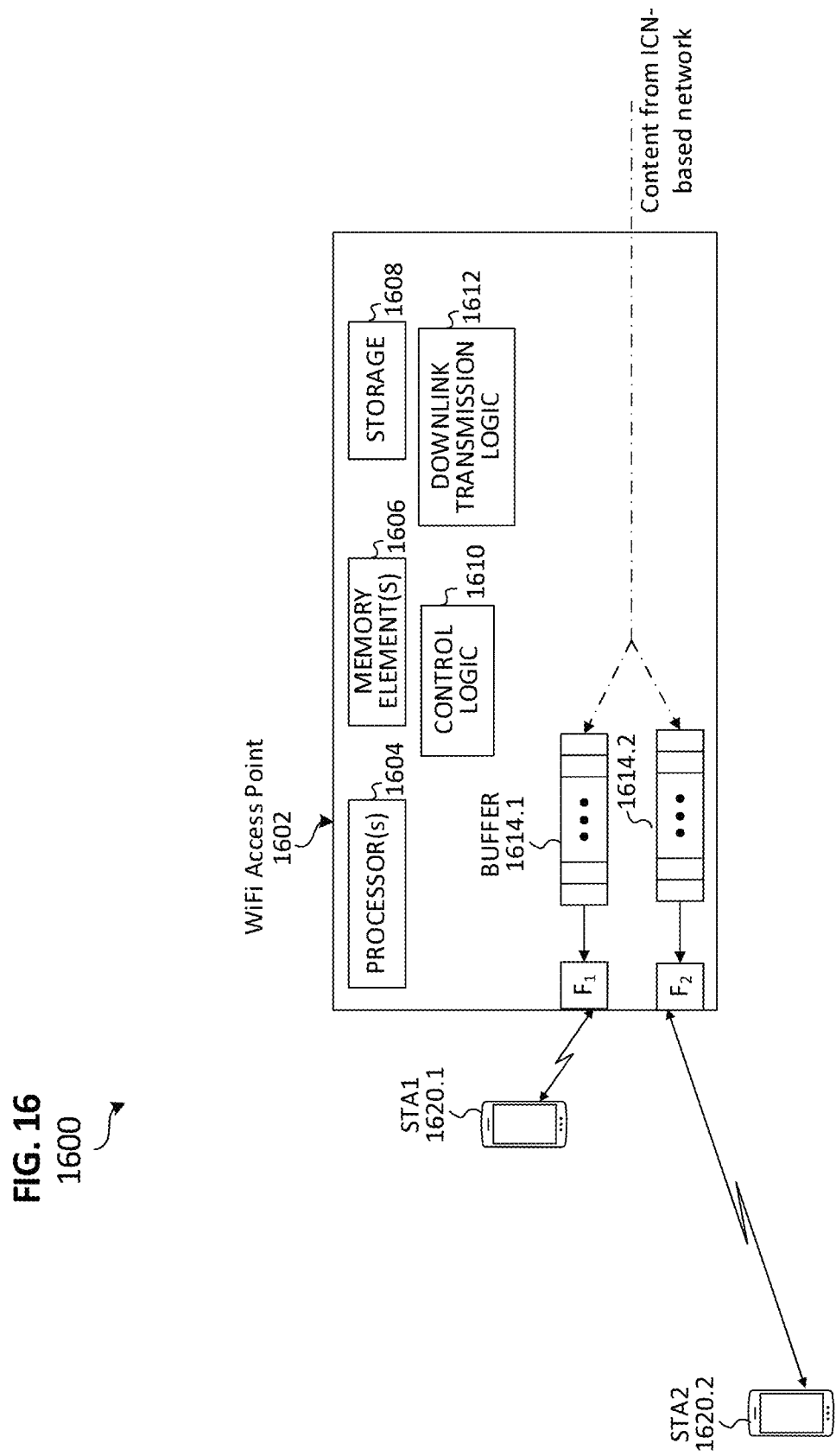
FIG. 16 is a simplified block diagram illustrating example details that can be associated with transmitting video over WiFi in an hICN architecture in accordance with some embodiments of the present disclosure.

Referring to FIG. 16, FIG. 16 is a simplified block diagram 1600 illustrating example details that can be associated with transmitting video over WiFi in an hICN architecture in accordance with some embodiments of the present disclosure. FIG. 16 illustrates a WiFi access point (AP) 1602 that can connect to a number of WiFi station/devices (STA) STA1 1620.1 and STA2 1620.2. In at least one embodiment, WiFi AP 1602 can include one or more processor(s), one or more memory element(s) 1606, storage 1608, control logic 1610, and downlink transmission logic 1612. A downlink transmission buffer can be provisioned for each station such that a first downlink transmission buffer 1614.1 can be provisioned for STA1 1620.1 and a second downlink transmission buffer 1614.2 can be provisioned for STA2 1620.2. During operation, downlink transmission buffers can be added or removed depending for various stations served by the WiFi AP 1602. It should be understood that WiFi AP 1602 can include other logic, network interfaces (e.g., RF transmitters(s), receiver(s), antenna(s), etc.), bus(es), etc., however, these are not shown in order to illustrate other features for the embodiment of FIG. 16.

WiFi (e.g., IEEE 802.11a/b/g/n/ac/ad) is an access technology that is cost effective and widely deployed. ABR video technologies (e.g., HTTP Dynamic Streaming (HDS), HTTP Live Streaming (HLS), Microsoft Smooth Streaming (MSS), DASH, etc.) are meant to provide the best possible video quality to the user while guaranteeing a certain level of fairness among users sharing network resources. In general, network resources can refer to network capacity. ABR video typically relies on TCP to obtain fair network resource sharing and high utilization.

However, there are multiple issues in relying on TCP to deliver ABR video and such issues are exacerbated while using WiFi access. WiFi is a multi-rate access technology in which access is provided on a shared medium, which is the radio channel over which stations communicate with a WiFi AP, using a listen-before-talk medium access control (MAC) protocol. The physical transmission rate is obtained through a combination of channel coding schemes and modulations (e.g., Modulation and Coding Scheme (MCS)). Such combination is obtained using heuristics that try to estimate the MCS that maximizes long-term throughput at the MAC layer (e.g., Minstrel). TCP tries to maximize throughput at the transport Layer realizing a certain level of fair rate sharing. The ABR adaptation logic in a client's application player tries to maximize the video quality which is proportional to the video resolution and video segment size. A certain level of fairness is also possible. ABR video over WiFi goes through three different rate adaptation logics at L7, L4 and L2 which are designed to optimize different objectives. Although the different logics interact among the layers they do not provide optimizations for the overall objective which is to deliver the highest possible video quality to the largest set of users sharing the same WiFi channel.

The following example illustrates how mismatched objectives among the layers can create issues that may poorly exploit available network resources. Consider for example that STA1 is close to the WiFi AP, STA2 is far from the WiFi AP and data flows from the AP to STA1 and STA2. During operation, TCP attempts to keep a full data backlog in the downlink queue at the AP; however, ABR adaptation at STA1 and STA2 try to provide the highest (e.g., best) video quality by downloading the largest video segment, if possible. For such a scenario, all protocols at L7, L4, and L2 tend to create network congestion (e.g., large queues and high packet drop rates) and channel losses (e.g., MCS changes tend to be less robust to Signal to Noise Ratio (SNR) fluctuations) for the following reasons: 1) STA1 and STA2 will keep the channel busy as TCP is elastic; 2) STA1 and STA2 Physical Layer (PHY) rate selection would tend to use the highest possible MCS that carries more data but also suffers from highest channel packet loss rate; and 3) L2 MAC does not provide air time fairness and, as a result, STA2 will slow down STA1 as both stations will have the same long term channel access probability. Thus, STA2 can, for instance, have a frame transmission time as much as ten times larger than STA1 in 802.11n. In this scenario, STA1 and STA2 video players will experience significant video quality fluctuations and, further, STA1 will be highly penalized by STA2 and will have difficulties to obtain a high video quality even though it is closer to the AP than STA2.

Video delivery over lossy channels, such as WiFi, is a problem that has been tackled poorly. One attempted solution to providing video delivery over lossy channels includes providing channel coding at the sender applications based on rateless codes (e.g., Raptor codes, etc. that do not exhibit a fixed rate) and digital fountains. The problem mentioned herein has been sub-optimally addressed in WiFi through attempted solutions by disabling physical rate selection for multicast transmissions in the shared medium. Instead, the physical rate is heuristically chosen, however, this can increases channel losses up to extreme levels of 60%. Further, transport protocols based on rateless codes do not take care of network flow control which also augments congestion and packet loss in the network. Other coding schemes based on network coding can cope with extreme levels of loss but increase latency significantly and do not work with latency sensitive applications or ABR video where multiple stations might need to select a different video rate depending on different radio conditions.

To address one or more of the shortcomings mentioned herein, a solution as illustrated for the embodiment of FIG. 16 provides for the ability to optimize air time usage via WiFi access point 1602 to deliver ABR video to STA1 1620.1-1620.2. In at least one embodiment, the solution is based on a cross-layer approach that involves three different layers (L3, L4, and L7) for delivering ABR video. In particular, the solution provides a method to use packet scheduling that emulates generalized weighted processor sharing, where weights are determined by video rates and physical rates for a given channel. The result of the method can provide full usage of the channel with coordinated rate adaptation and fairness among stations served by a given WiFi AP.

As previously discussed herein, ICN and hICN architectures covers transport (L4) and network (L3) layers. Further, ICN and hICN, through use of the ICNET socket, is stateful only at the receiver (e.g., consumer) and not at the sender (e.g., producer). This also includes the management of the congestion window that determines how much data is being transferred in the network. The congestion window at the receiver plays an analogous role of the TCP congestion window at the sender. The control of the window used by an ABR application can be used determine how much share of bandwidth is used to retrieve HTTP video segments (e.g., HLS, DASH, etc.). The choice of the physical transmission rate towards and from the WiFi access point can also be controlled at the receiver.

Figure 17:
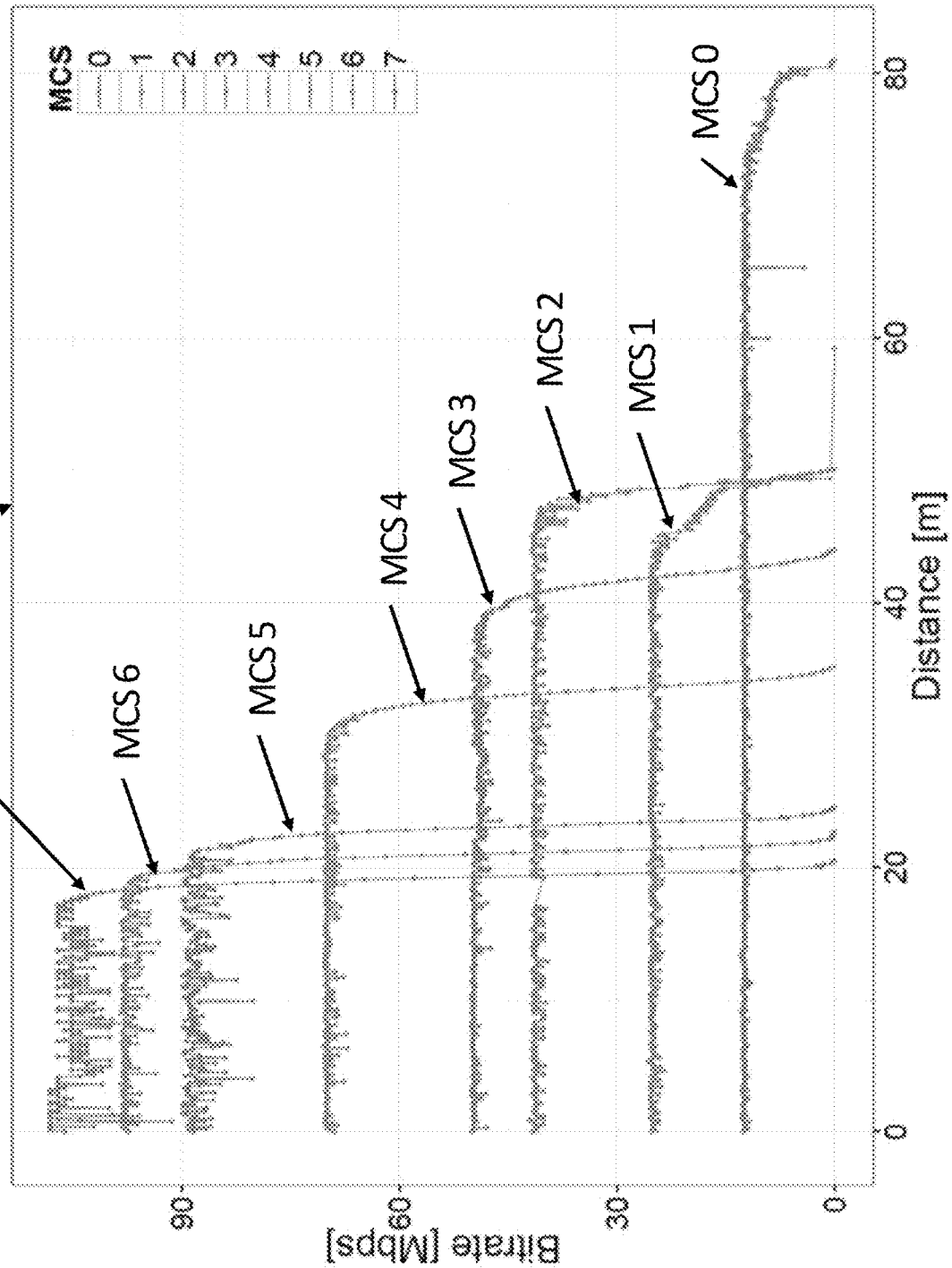
FIG. 17 is a simplified graph illustrating example throughput of a single station at different distances to a given WiFi access point.

Current physical data rate (PHY_RATE or PHY rate) selection algorithms implemented in WiFi take into account the following throughput function that was measured in an experiment for 802.11n. Referring to FIG. 17, FIG. 17 is a simplified graph 1700 illustrating example throughput rates for a single station using UDP at different distances to a given access point. For the example throughput rates illustrated in FIG. 17, rate selection was disabled and all available high throughput (HT) rates in 802.11n (shown as MCS=0-7) were tested. A generic throughput optimal algorithm would try to generate the throughput function in which, at every distance, the best rate would be a combination of channel coding and modulation that maximizes the throughput at a given distance. This would means that at distance d, the possible PHY_RATE(d) would be less than or equal to R_MAX(MCS). On the other hand, from an application point of view, channel transmission rate, the network throughput, and the video rate are associated. In HTTP adaptive video streaming (HLS, HSS, DASH), video has a given frame per second rate (fps) and variable video segment sizes that are retrieved by the client. The segment size S depends on the video frame encoding quality (e.g., Standard Definition (SD), Low Definition (LD), High Definition (HD), Full High Definition (FHD), Ultra High Definition (UHD), Quarter High Definition (QHD), etc.) and by the video scene that might carry more data (e.g., type of frame such as I-frames, B-frames, or P-frames). The video rate selection algorithm determines the size of the video segment which corresponds to the size of the data flow that will access the channel.

The bandwidth sharing that happens in IEEE 802.11 using the enhanced distributed coordination function (EDCF) access protocol gives the same per packet access probability to each station. As a result, a station with poor radio conditions can occupy the channel air time for longer than stations with good radio conditions.

Returning to FIG. 16, WiFi AP 1602 can have one established adjacency (e.g., ICN face association) with each WiFi STA1 1620.1 and STA2 1620.2 and can provide an optimal bandwidth allocation to the stations based, at least in part on physical data rates, which can depend on MCS assignment for transmissions, and video rates (e.g., bit rates). In various embodiments, video rates, typically expressed in bits per second, can vary based on video formats, which can include, but not be limited to: Low Definition (LD), Standard Definition (SD), High Definition (HD), Full High Definition (FHD), Quad FHD (QFHD), Ultra HD (UHD), or the like.

Consider an example in which STA1 1620.1 can be associated with a connection via face $F_1$ for which downlink packets can be enqueued via buffer 1614.1 for transmission to STA1 and STA2 1620.2 can be associated with a connection via face $F_2$ for which downlink packets can be enqueued via buffer 1614.2 for transmission to STA2. Downlink packets scheduled for transmission via downlink transmission logic 1612 can be based on content received from an ICN-based (e.g., ICN or hICN) network and transmissions performed according to a best (e.g., optimized) video rate determined for each station that satisfies a constraint that air time is utilized fairly across active stations. For embodiments described herein an 'active' station can be considered a station that for which one or more requests for video content have been received by a given WiFi AP.

For a STA for which the PHY rate is much lower than the video rate for a very long time, it is assumed that the STA will stop attempting to download the video. For stations that continue to download the video, video rate is likely to be lower than the PHY rate. For active stations, packet scheduling for each station is applied via downlink transmission logic 1612 on the downlink channel from the AP to the STAs to simulate a weighted processor sharing queue between the STAs. In at least one embodiment, a weighted processor sharing queue can represent an ideal scheduler where each queue (e.g., each downlink transmission buffer) is served proportionally to some weight that can be determined according to some objective.

For embodiments discussed herein, weights can be computed one per queue (e.g., one per STA) for a plurality of stations served by the WiFi AP 1602 by using the video rate as shaping rate in order to provide a best possible video delivery to each station that maximize usage of the communication channel shared by the plurality of stations while providing a fair utilization of air time of the communication channel across the plurality of stations.

For example, consider a given transmission time in which downlink video packets of a certain size (e.g., 1500 bytes) can be transmitted to a number of active stations (e.g., STA1 and STA2) in a manner that provides a best possible video delivery to each station while also providing fair utilization of air time for each station. Say, for example, that STA1 1620.1 is closer in geographic proximity to WiFi AP 1602 than STA2 1620.2, both stations are active, and that STA1 1620.1 is assigned an MCS that provides for transmitting twice the number of downlink video packets to the station than can be transmitted to STA2 1620.2 for a same time frame (e.g., 10 msec). In this example, WiFi AP 1602 via downlink transmission logic 1612 can enqueue packets to be transmitted to each station in their corresponding downlink transmission buffers and can identify an optimized video rate for each station based on the MCS assigned to each station that provides for a fair usage of air time for the channel shared by the stations. Based on the identified optimized video rate downlink packets can be scheduled for each station such that air time is utilized fairly between the stations. In this example, twice the number packets could be scheduled for transmission to STA1 1620.1 for a same transmission time as would be needed to transmit one packet to STA2 1620.2.

In various embodiments, downlink scheduling can be performed on a round robin basis for a number of active stations under the constraint of providing fair utilization of air time for the active stations. Thus, a maximum and minimum scheduling can be determined based on a number of active stations that are to receive downlink video transmissions.

By controlling the downlink transmission queue (e.g., buffer 1610.1 and 1610.2) on a per station basis the AP can effectively control the playout buffer of each station and can determine the video quality at which the client displays the video. As a result, the method described herein provides for the ability to deliver optimal ABR video over WiFi without impacting other applications sharing the same channel. In various embodiments, the method described herein can be used for any end-point (e.g., STA) using WiFi to receive ABR video, such as, for example, set-top boxes, media boxes, mobile devices, combinations thereof, or the like.

In at least one embodiment, processor(s) 1604 is/are at least one hardware processor configured to execute various tasks, operations and/or functions for WiFi AP 1602 as described herein according to software, instructions, or other program code configured for the node. In at least one embodiment, memory element(s) 1606 and/or storage 1608 is/are configured to store data, information, software, instructions and/or logic associated with WiFi AP 1602 (e.g., data structures, logic, etc. can, in various embodiments, be stored using any combination of memory element(s) 1606 and/or storage 1608). In various embodiments memory element(s) 1606 may include one or more physical memory devices such as, for example, local memory and/or one or more bulk storage devices. A local memory may refer to random access memory or other non-persistent memory device(s) generally used during actual execution of the program code. A bulk storage device may be implemented as a hard drive or other persistent data storage device. In some embodiments, WiFi AP 1602 may also include one or more cache memories (not shown) that provide temporary storage of at least some program code in order to reduce the number of times program code must be retrieved from a bulk storage device during execution.

In various embodiments, control logic 1610 can include instructions that, when executed (e.g., by one or more processor(s) 1604), cause WiFi AP 1602 to perform operations, which can include, but not be limited to: providing overall control operations of WiFi AP 1602; cooperating with other logic, applications, etc. provisioned for WiFi AP 1602; maintaining and/or interacting with stored data, information, parameters, etc. (e.g., memory element(s), storage, data structures, databases, tables, etc.); combinations thereof; and/or the like to facilitate various operations as discussed for various embodiments described herein. In various embodiments, downlink transmission logic 1612 can include instructions that, when executed, cause WiFi AP 1602 to perform operations associated with downlink video transmissions as discussed herein.

Figure 18:
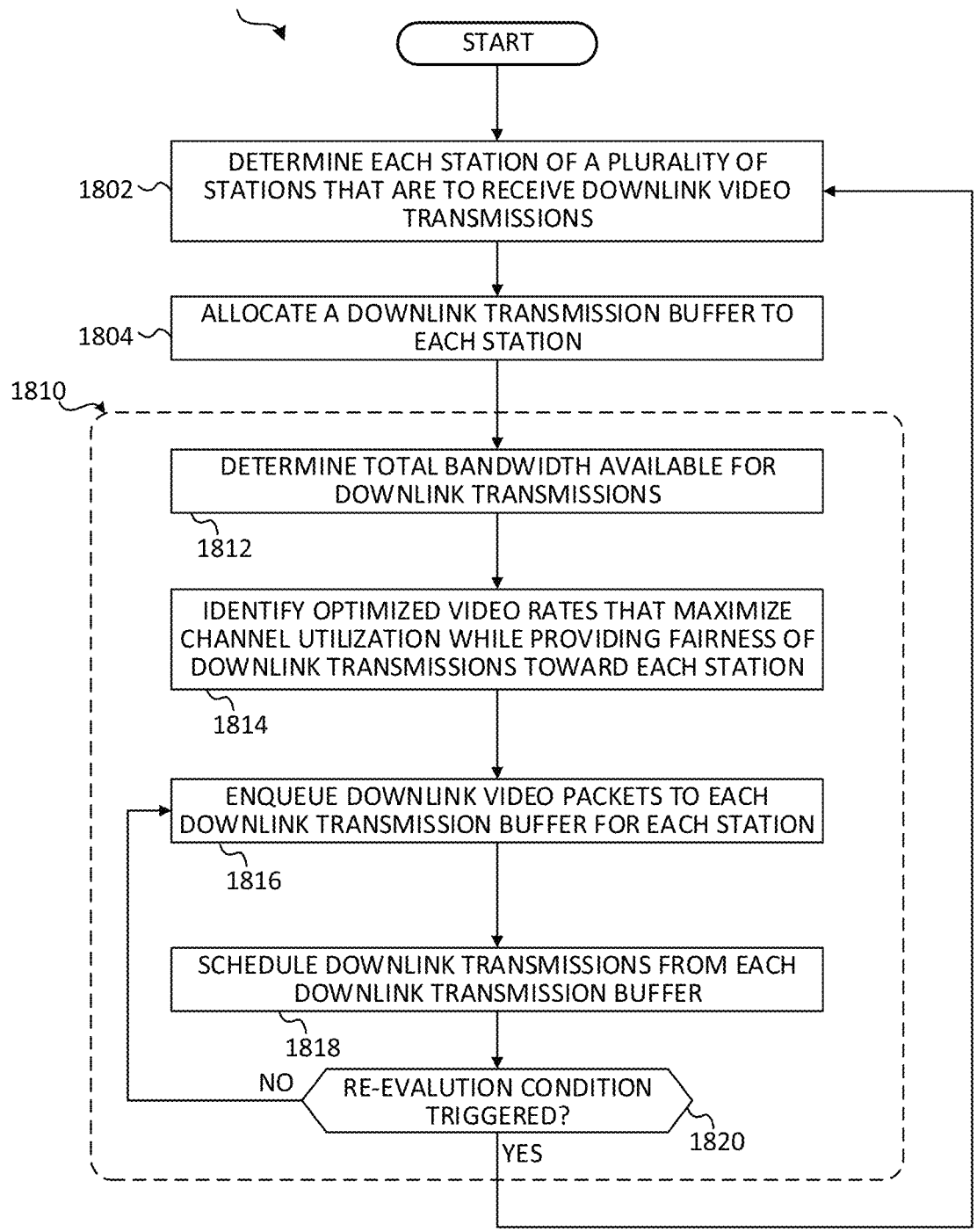
FIG. 18 is a simplified flow diagram illustrating example operations that can be associated with providing downlink video transmissions according to some embodiments of the present disclosure.

Referring to FIG. 18, FIG. 18 is a simplified flow diagram illustrating example operations 1800 that can be associated with providing downlink video transmissions according to some embodiments of the present disclosure. In at least one embodiment, operations 1800 can be performed by WiFi AP 1602 via downlink transmission logic 1612, control logic 1610, one or more processor(s) 1604, etc. provisioned for the WiFi AP.

At 1802 the operations can include determining each station (STA) of a plurality of stations connected to the WiFi AP that are to receive downlink video transmissions, wherein each station is associated with a particular ICN face provisioned for the WiFi AP. At 1804, the operations can include allocating a downlink buffer for each station such that each downlink buffer can be used to enqueue packets for downlink transmission to each station. The WiFi AP can manage (1810) downlink video transmissions to the stations operations using various operations as discussed below.

At 1812, the WiFi AP can determine a total bandwidth available for downlink video transmissions to the plurality of stations for a given WiFi channel. Typical WiFi channel bandwidths consist of 20 megahertz (MHz) and 40 MHz bandwidths. At 1814, the operations can include identifying an optimized video rate for each station of the plurality of stations that maximizes channel utilization while providing fairness of downlink transmissions toward each station. The optimized video rate identified for a station will be less than or equal to a maximum physical data rate associated with the lowest CS assigned to downlink transmissions for the station provided that the video rate maximized channel utilization while providing a fair utilization of air time of the channel among the plurality of stations.

In at least one embodiment, fair utilization of air time can be determined based on identifying a number of active stations (e.g., stations actively requesting video content) and a transmission time needed to transmit at least one packet of a given size to each station. In various embodiments, the choice of physical data rate can depend on several factors including, but not limited to long term throughput, interference, station limitations (e.g., 802.11 version(s) supported by the station), combinations thereof or the like. Minstrel is an example of one algorithm that can be used in the Linux kernel to provide rate control, however, other many other heuristic algorithms exist that can be used to provide throughput optimal rate control.

At 1816, the operations can include enqueuing downlink video packets to each downlink transmission buffer for each of the plurality of stations. At 1818, the operations can include scheduling downlink transmissions from each downlink transmission buffer for each of the plurality of stations. In at least one embodiment, the downlink transmissions can be scheduled based on the optimized video rate identified for each station that maximizes utilization of the communication channel shared by the plurality of stations while providing for fair utilization of air time for the communication channel shared by the plurality of stations.

At 1820, the operations can include determining a status of one or more re-evaluation conditions to determine whether to trigger performing the operations again for a set of UEs for a given channel. In various embodiments, determining the status of a re-evaluation condition can include, but not be limited to, determining whether a periodic re-evaluation is needed based on expiry of a periodic re-evaluation timer; determining whether an Interest has not been received from a particular station within a threshold period of time; combinations thereof; or the like. Based on a determination that re-evaluation is needed, the operations can return to 1802 and the operations can be repeated as described above. Based on a determination that re-evaluation is not needed, the operations can return to 1816 and 1818 to continue to allocate and schedule downlink transmissions for the stations.

hICN Heterogeneous Access Gateway

Figure 19:
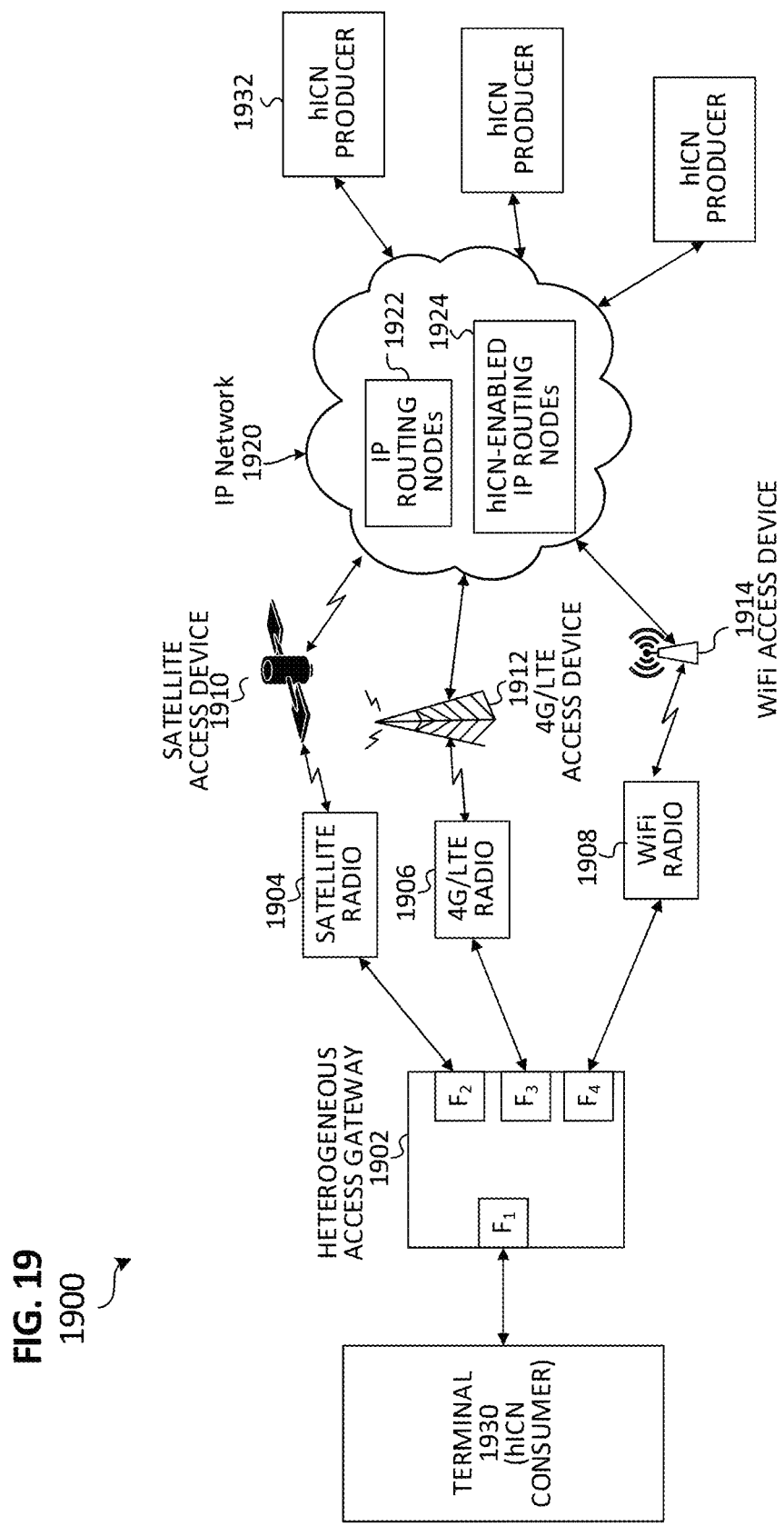
FIG. 19 is a simplified block diagram illustrating example details that can be associated with a heterogeneous access gateway that can be used in a hICN communication system in accordance with some embodiments of the present disclosure.

Referring to FIG. 19, FIG. 19 is a simplified block diagram illustrating example details that can be associated with a heterogeneous access gateway 1902 that can be used in a communication system 1900 in accordance with some embodiments of the present disclosure. In at least one embodiment, communication system 1900 can include heterogeneous access gateway 1902; a number of RF radios such as, for example, a satellite radio 1904, a 4G/LTE radio 1906, and a WiFi radio 1908; a number of RF access devices such as, for example, a satellite access device 1910, a 4G/LTE access device 1912, and a WiFi access device 1914; an IP network 1920, which can include one or more IP routing nodes 1922 and/or one or more hICN-enabled IP routing nodes 1924. FIG. 19 further illustrates a terminal 1930, which can represent a consumer, and number of hICN producers 1932. Terminal 1930 can be referred to herein as a client.

In some instances, a terminal (e.g. terminal 1930) can be connected to several radio accesses at the same time; however, it is difficult to use all the radios at the same time as the network layer on top of the radio access is not able to maintain active connectivity and reliable services. Multipath TCP is one protocol that tries to use multiple radios accesses. However, Multipath TCP is inefficient as radios cannot be used with a fine granularity as is needed in TCP to achieve packet delivery and the network layer cannot make channel selections based on various policies like congestion, costs, latency, etc.

Leveraging the architecture of ICN and hICN, a heterogeneous access gateway, (e.g., heterogeneous access gateway 1902), can be deployed in a communication system (e.g., communication system 1900) in order to determine optimum radio accesses through which a given terminal (e.g., terminal 1930) can receive content from one or more producer(s) (e.g., producer(s) 1932). In at least one embodiment, a FIB for the gateway 1902 can be enhanced to store information or values related to various network conditions such as, for example congestion, latency, loss rate, etc., policy information for the terminal, access network ranking information, combinations thereof or the like to enable access network selection operations as discussed herein.

In at least one embodiment, network conditions can be determined by the gateway 1902 by observing local traffic and performing calculations based on PIT entries. For example, network congestion for a given access can be calculated based on a number of outstanding interests associated with the given access. In another example, latency can be calculated based on an end-to-end RTT associated with a given access based on time stamps for interest and data messages. In still another example, packet loss rates can be calculated based on pending interests that have been timed-out or for which a NACK has been received. Other network conditions can be calculated or determined using similar means and methods. In at least one embodiment, the radio accesses can be ranked based on network conditions determined for each access by the gateway 1902 and the ranking for each access can be stored in the FIB. In at least one embodiment, radio accesses can be ranked and their rankings averaged over time in order to determine a weighted rank for each access, which can be stored in the FIB. In some embodiments, an access can be selected to handle traffic (e.g., packets) for a given service class based, at least in part on a rank or weighted rank of the access. In still some embodiments, an access can be selected to handle traffic for a given service class based on a random selection of accesses while ensuring that certain service class policy or policies are satisfied. These example embodiments are just a few of the many possible options by which accesses may be selected for one or more service classes and are not meant to limit the broad scope of the present disclosure. Virtually any other options for selecting accesses for one or more service classes can be provided using similar means and methods as those described herein and, thus, are clearly within the scope of the present disclosure.

In at least one embodiment, policy information can be access specific and can be determined by the gateway 1902 according to a per service class profile that may be determined by charging strategies. Different service classes can be based on different services and/or QoS levels (e.g., QoS Class Identifiers (QCIs)) for different services such as, for example, video, voice, real-time, Video on Demand (VoD), background, best effort, guaranteed, combinations thereof or the like. In at least one embodiment, one example charging strategy can include favoring certain access(es) over other access(es) due to charging associated with the different accesses such as for example, licensed spectrum (e.g., 3GPP) versus unlicensed spectrum (e.g., WiFi) for which different traffic caps, charging models, or the like may apply. In at least one embodiment, policy information can be service class specific and can include any combination of a minimum latency associated with a particular service class; a packet loss rate associated with a particular service class; a minimum bitrate associated with a particular service class; a guaranteed bitrate associated with a particular service class; combinations thereof; or the like.

In at least one embodiment, policy information (e.g., for the accesses and/or service classes) and/or ranking information based on network conditions can be stored in the FIB or other accessible data structure for the gateway 1902 that can be accessed during operation in order to select a particular access to handle traffic for a received interest.

During operation, heterogeneous access gateway 1902 can analyze the information to determine a best usage of all radio accesses based on a QoS level needed by different service classes associated with the terminal. In at least one embodiment, heterogeneous access gateway 1902 can be configured information, parameters, etc. for different service classes that may be accessed by a given terminal. When an incoming Interest is received by the gateway, the packet can be analyzed (e.g., a QCI carried in the packet) to determine a service class for traffic associated with the Interest.

Heterogeneous access gateway 1902 can maintain a per face level association with different radio accesses (e.g., $F_2$ associated with satellite access, $F_3$ associated with 4G/LTE access, and $F_4$ associated with WiFi access) in order to select a particular access to use for certain service classes based on various network conditions and policies associated with the different accesses as well as QoS required by different service classes. The receiver/driver nature of the transport in an hICN communication system (e.g., communication system 1900) provides for the ability to determine early selection of the channels or to change policy instantaneously.

One or more scenarios can be implemented in accordance with various embodiments. In one example embodiment, heterogeneous access gateway 1902 can manage the accesses to provide optimal throughput for an access where a client (e.g., terminal 1930) maximizes the available bandwidth. In another example embodiment, heterogeneous access gateway 1902 can manage the accesses to minimize latency for a service class/client.

In yet another example embodiment, the heterogeneous access gateway 1902 can manage the accesses to weigh latency and cost based on charging for the accesses. Consider an example in which a particular access costs X-dollars of data throughput (uplink and downlink) per month for a certain data cap and a client desires to attain a maximum throughput and a minimum latency for the access. In this example, a percentage of usage less than 100% (e.g., 80%, etc.) can be allocated to a service class that might need to maintain a maximum throughput and a minimum latency (e.g., a real-time service) with a remainder of the usage capable of being allocated to a lower service class (e.g., best effort) without exceeding the X-dollars of data throughput per month for the access. In this example, long term usage can be correlated to tradeoffs that the client desires to enforce in order to meet the weighted latency and cost metrics for the access. Other weighted latency, weighted cost, or any other weighted metric can be envisioned as a service class policy for one or more accesses.

Broadly, heterogeneous access gateway 1902 can provide for the ability to build a middleware device that can exploit heterogeneous accesses and optimize services based on channel quality (e.g., signal strength), network conditions, costs, policies, service class QoS, combinations thereof, or the like. As a result, the heterogeneous access gateway 1902 can enable heterogeneous accesses in end terminals. In some embodiments, an end terminal (terminal 1930) can be a smartphone or other mobile device equipped with multiples radios. In still some embodiments, an end terminal can be an automobile or the like that is equipped with satellite, WiFi, LTE and other radios to provide connectivity to a local network installed in the automobile. TV broadcasters typically use this automobile to make use of the different radios based on the quality of the channel but also on the cost of using a channel. For example, satellite can be very expensive, more than LTE, while LTE can be more expensive than WiFi. More complex combinations can occur depending on the availability of different accesses such as, for example, MulteFire, LTE-Unlicensed, mm.wave, etc.

Figure 20:
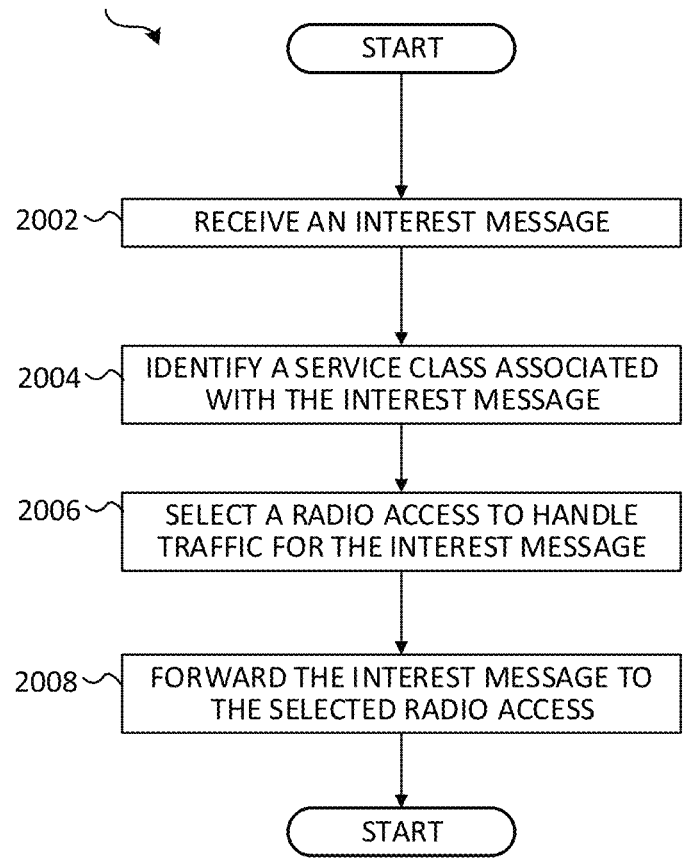
FIG. 20 is a simplified flow diagram illustrating example operations that can be performed by a heterogeneous access gateway in accordance with some embodiments of the present disclosure.

Referring to FIG. 20, FIG. 20 is a simplified flow diagram illustrating example operations 2000 that can be associated with a heterogeneous access gateway (e.g., heterogeneous access gateway 1902) according to some embodiments of the present disclosure. At 2002, the operations can include the gateway receiving an IP Interest message from a terminal. At 2004, the operations can include the gateway identifying a service class associated with the interest message. At 2006, the operations can include the gateway selecting a particular radio access to handle traffic for the interest message. In various embodiments, the selection can be based on one or more policies associated with the service class, one or more policies associated with the plurality of radio accesses, and/or network conditions associated with the plurality of radio accesses. At 2008, the operations can include forwarding the interest message to the selected radio access.

Figure 21:
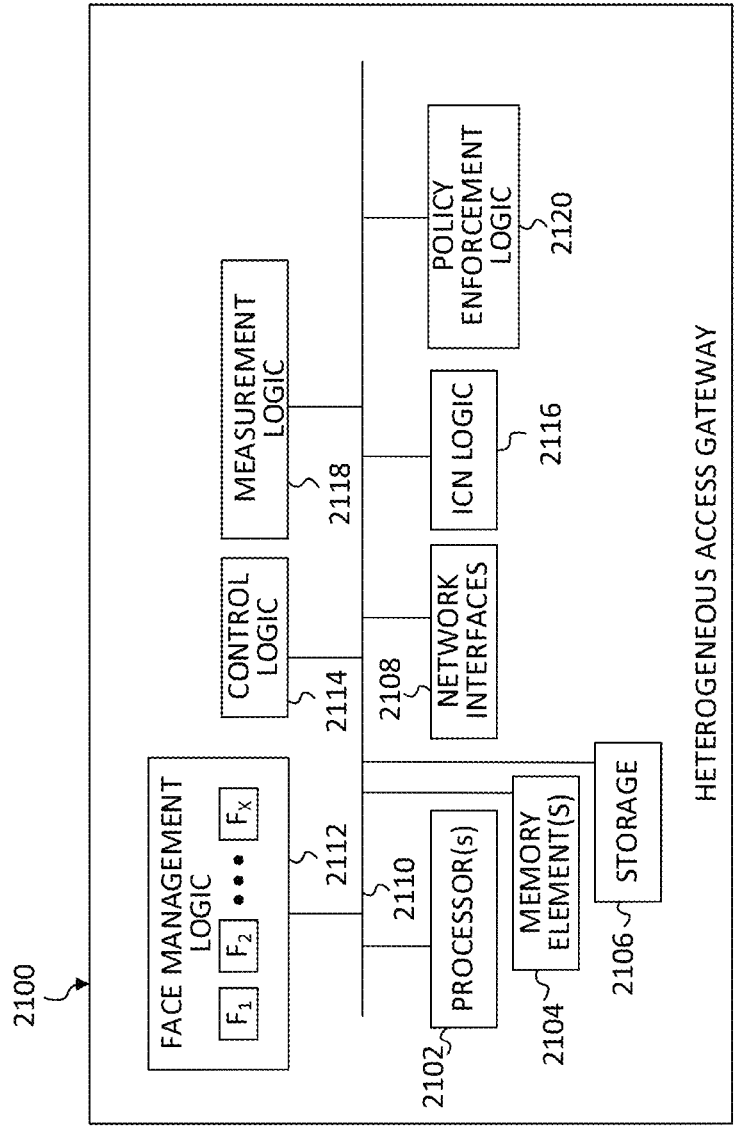
FIG. 21 is a simplified block diagram illustrating example details that can be associated with a heterogeneous access gateway in accordance with some embodiments of the present disclosure.

Referring to FIG. 21, FIG. 21 is a simplified block diagram illustrating example details that can be associated with a heterogeneous access gateway 2100 according to some embodiments of the present disclosure. The heterogeneous access gateway 2100 can represent any heterogeneous access gateway such as, for example, heterogeneous access gateway 1902 as shown for the embodiment of FIG. 19 or any other heterogeneous access gateway that may be deployed, depending on variations and implementations, to facilitate integration access network selection in accordance with various embodiments described herein.

In at least one embodiment, heterogeneous access gateway 2100 can include can include one or more processor(s) 2102, one or more memory element(s) 2104, storage 2106, network interfaces 2108, a bus 2110, face management logic 2112, control logic 2114, ICN logic 2116, measurement logic 2118, and policy enforcement logic 2120.

In at least one embodiment, processor(s) 2102 is/are at least one hardware processor configured to execute various tasks, operations and/or functions for heterogeneous access gateway 2100 as described herein according to software, instructions, or other program code configured for the gateway. In at least one embodiment, memory element(s) 2104 and/or storage 2106 is/are configured to store data, information, software, instructions and/or logic associated with heterogeneous access gateway 2100 (e.g., data structures, logic, etc. can, in various embodiments, be stored using any combination of memory element(s) 2104 and/or storage 2106). Data structures provisioned for heterogeneous access gateway 2100 can include a FIB, a PIT, and a CS to enable various ICN-based operations. The FIB, PIT and CS are not shown for heterogeneous access gateway 2100 in order to illustrate other features of the gateway, however, it should be understood that the FIB can be enhanced to store information associated with network conditions, rankings, policy information, etc. in order to enable access network selection operations as discussed for various embodiments described herein.

In various embodiments memory element(s) 2104 may include one or more physical memory devices such as, for example, local memory and/or one or more bulk storage devices. A local memory may refer to random access memory or other non-persistent memory device(s) generally used during actual execution of the program code. A bulk storage device may be implemented as a hard drive or other persistent data storage device. In some embodiments, heterogeneous access gateway 2100 may also include one or more cache memories (not shown) that provide temporary storage of at least some program code in order to reduce the number of times program code must be retrieved from a bulk storage device during execution.

In various embodiments, network interfaces 2108 can enable communication between heterogeneous access gateway 2100 and other network elements that may be present in a communication system to facilitate operations as discussed for various embodiments described herein. In various embodiments, network interfaces 2108 can be provisioned to support one or more communication protocols, routing protocols, etc., one or more Ethernet driver(s) and/or controller(s), Fibre Channel driver(s) and/or controller(s), Institute of Electrical and Electronics Engineers (IEEE) Standard 802.11 (e.g., WiFi), or other similar protocols, network interface driver(s), and/or controller(s) to enable communications for heterogeneous access gateway 2100 within a communication system. In some embodiments, the network interfaces can include one or more RF receiver(s) for receiving RF transmissions that may be transmitted OTA by other network elements to the heterogeneous access gateway 2100, one or more RF transmitter(s) for RF transmissions from the heterogeneous access gateway 2100 to other network elements, and one or more antenna(s). Modems, cable modems, Ethernet cards, WiFi radios, 3GPP radios, or the like are examples of different types of network interfaces that may be used with the heterogeneous access gateway 2100.

In at least one embodiment, bus 2110 can be configured as an interface that enables one or more elements of heterogeneous access gateway 2100 (e.g., processor(s) 2102, memory element(s) 2104, logic, faces, interfaces, etc.) to communicate in order to exchange information and/or data. In at least one embodiment, bus 2110 may be implemented as a fast kernel-hosted interconnect, potentially using shared memory between processes (e.g., logic, etc.), which can enable efficient communication paths between the processes.

In some embodiments, Input/output (I/O) devices (not shown) can optionally be coupled to the hICN node. Examples of input devices may include, but are not limited to, a keyboard, a pointing device such as a mouse, or the like. Examples of output devices may include, but are not limited to, a monitor or a display, speakers, or the like. Input and/or output devices may be coupled to the node either directly or through intervening I/O controllers.

In an embodiment, input and the output devices may be implemented as a combined input/output device. An example of such a combined device is a touch sensitive display, also sometimes referred to as a "touch screen display" or simply "touch screen". In such an embodiment, input to the device may be provided by a movement of a physical object, such as, for example, a stylus or a finger of a user, on or near the touch screen display.

In at least one embodiment, face management logic 2112 can include instructions that, when executed, enables communications between heterogeneous access gateway 2100 and other network elements via an 'X' number of faces $F_1$-$F_X$ provisioned for the heterogeneous access gateway 2100 to facilitate operations discussed for various embodiments described herein.

In various embodiments, ICN logic 2116 can include instructions that, when executed, enables heterogeneous access gateway 2100 to perform ICN operations as discussed for various embodiments described herein including providing network layer functionality for the FIB, PIT, CS and any faces provisioned for the gateway.

In various embodiments, measurement logic 2118 can include instructions that, when executed (e.g., via one or more processor(s) 2102), cause heterogeneous access gateway 2100 to perform measurement operations for various access networks for which heterogeneous access gateway 2100 provides connectivity based, at least in part, on network information (e.g., latency, packet drops, congestion, etc.) that can be inferred from information stored in the PIT provisioned for heterogeneous access gateway 2100. In various embodiments, policy enforcement logic 2120 can include instructions that, when executed, cause heterogeneous access gateway 2100 to determine policy information for a particular service class identified for particular traffic to ensure that one or more policies provisioned for the particular service class are satisfied for an access network selected to handle traffic for the particular service class.

Figure 22:
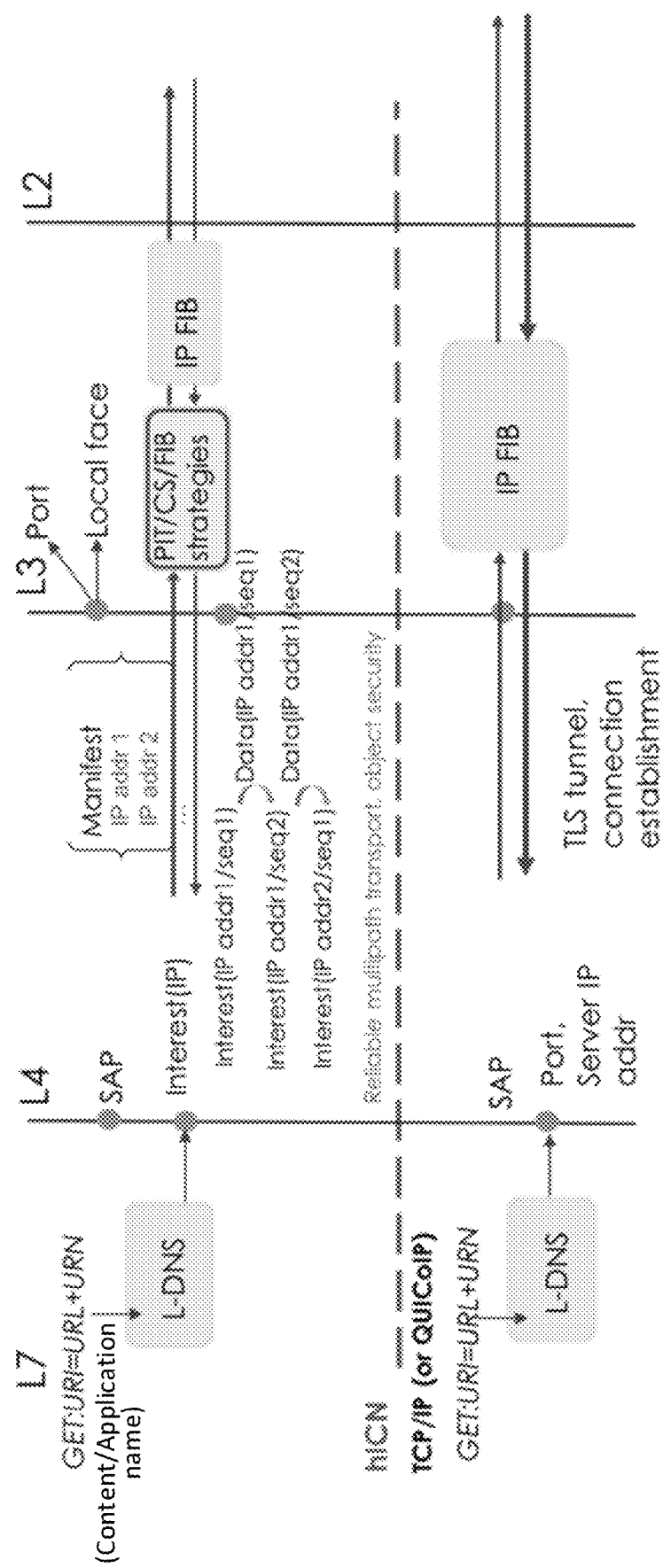
FIG. 22 is a simplified schematic diagram illustrating example comparisons between hICN communications and TCP communications according to some embodiments of the disclosure.

In various embodiments, control logic 2114 can include instructions that, when executed (e.g., by one or more processor(s) 2102), cause heterogeneous access gateway 2100 to perform operations, which can include, but not be limited to: providing overall control operations of heterogeneous access gateway 2100; identifying a service class associated with a received interest; selecting an access network to which to forward a received interest; cooperating with other logic, applications, etc. provisioned for heterogeneous access gateway 2100 to select an access network to which to forward a received interest; maintaining and/or interacting with stored data, information, parameters, etc. (e.g., memory element(s), storage, data structures, databases, tables, etc.); combinations thereof; and/or the like to facilitate various operations as discussed for various embodiments described herein.

hICN Comparison to TCP/IP hICN is a L3 and L4 network architecture and, like TCP/IP, comes with interfaces and service access points (SAPs) to provide different kind of transport services to the applications. The SAPs that can be used by applications in a hICN communication system can be based on the ICNET socket API to provide L4 SAPs. ICNET can provide for a L3 SAP based on the concept of a local face, which can performs multiplexing/de-multiplexing like a local port in TCP/IP. As referred to herein, a 'local face' can refer to a face whose identity is known only locally to a given node, as opposed to a regular ICN face, which can be known to neighboring nodes and used to define adjacencies as described herein. Referring to FIG. 22, FIG. 22 is a simplified schematic diagram 2200 illustrating HTTP request/reply transactions using hICN communications according to some embodiments of the present disclosure in comparison to TCP/IP communications. Specifically, FIG. 22 illustrates HTTP request/reply transactions (for the Request GET Method only) and how this is carried via a hICN communication system (top diagram) and TCP/IP (bottom diagram). In the top diagram, the local DNS can be used by an application to resolve an application or content name to network layer and/or transport layer address.

hICN Protocol Stack Implementation Strategy

Figure 23A:
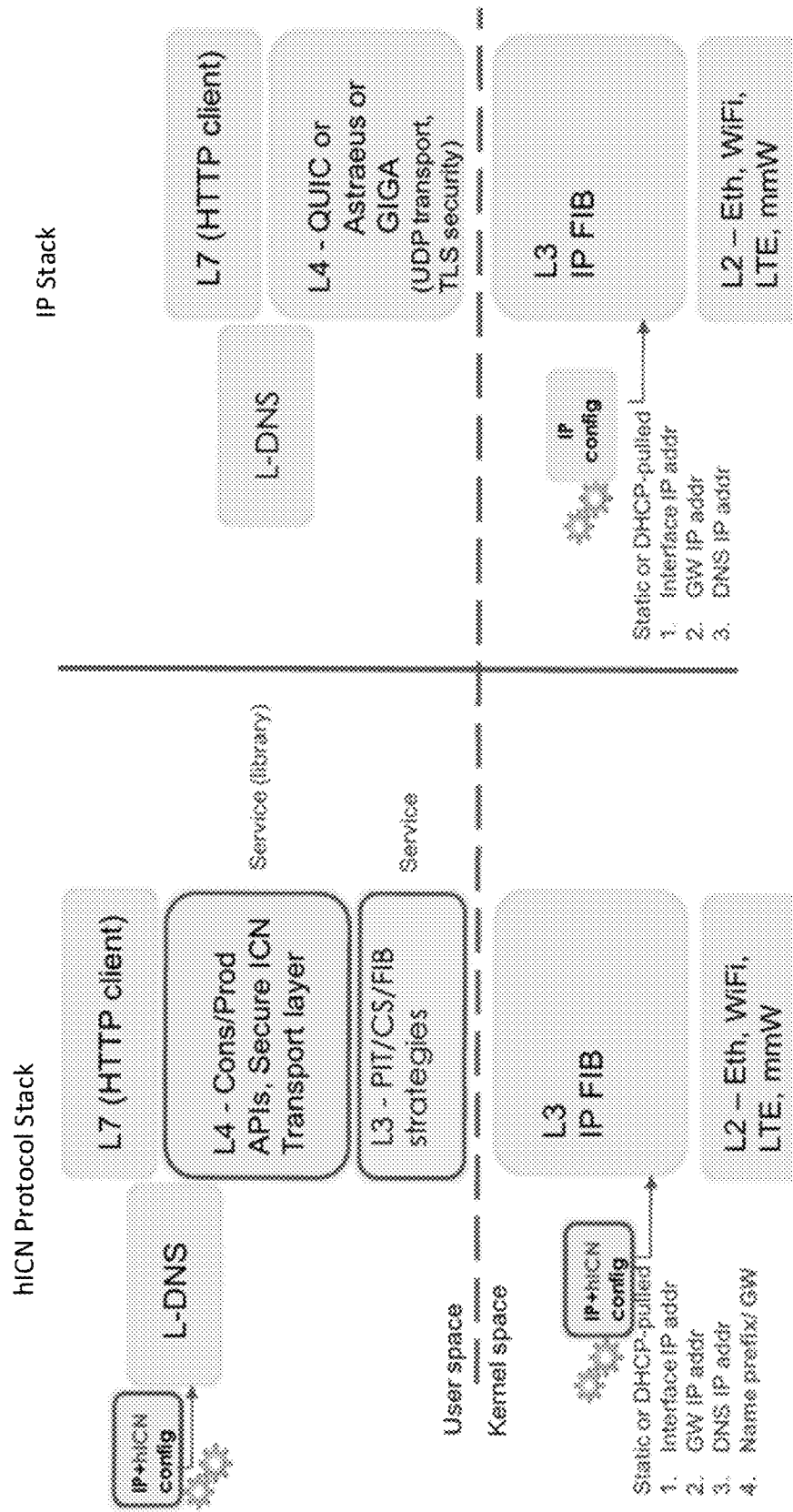
FIGS. 23A-23B are simplified schematic diagrams illustrating example comparisons between user space and kernel space implementations according to some embodiments of the present disclosure.
Figure 23B:
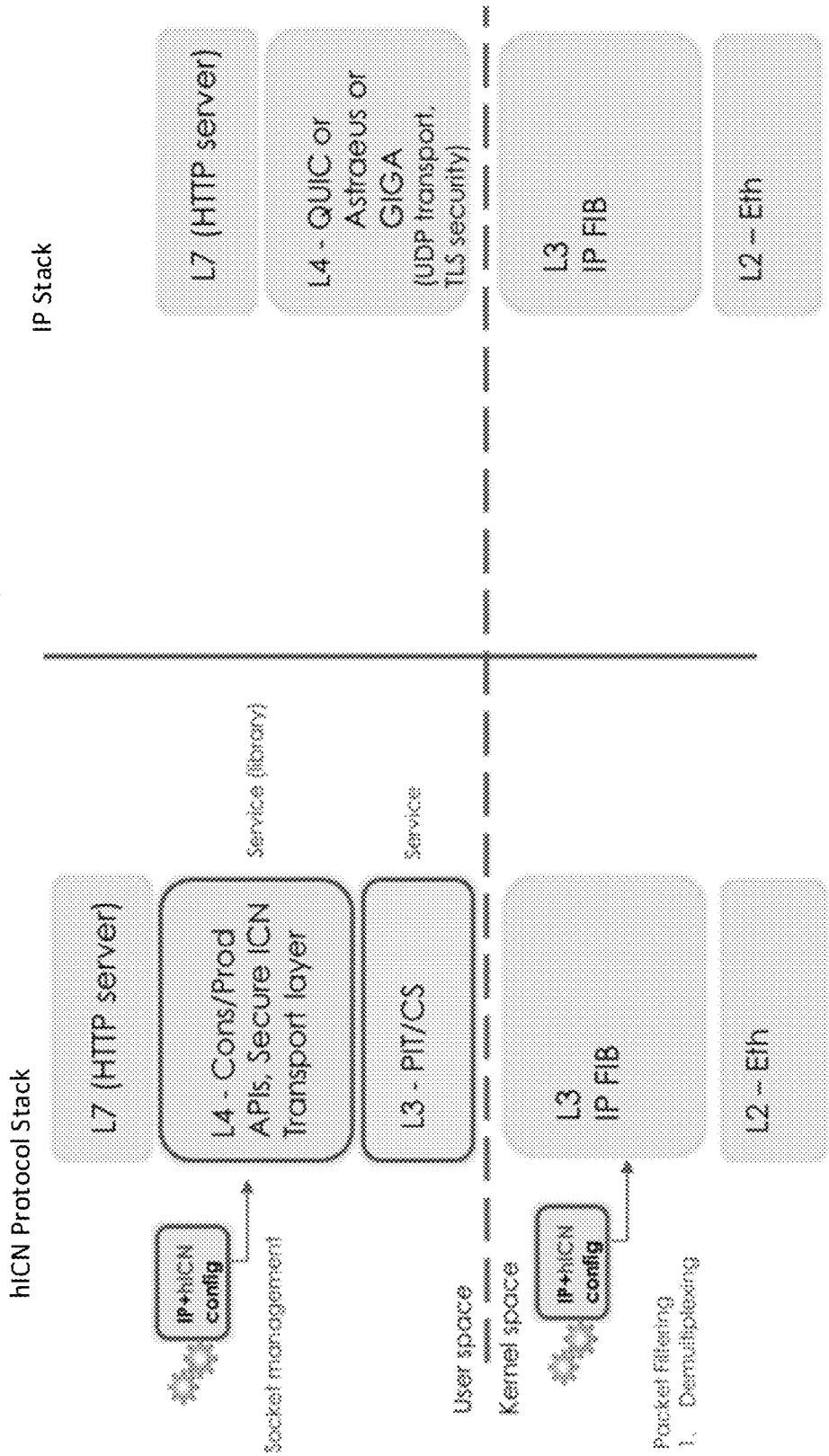

The strategy to implement the hICN protocol stack can depend on the insertion strategy of the technology for one or multiple use cases such as, for example, ABR video delivery, delivery over wired or wireless network, delivery with or without mobility support, real time video conferencing, Internet of Things, delay tolerant networking for military applications, etc. Network stack implementations in end points (e.g., consumers, producers) typically favor user space implementations. Still, other implementations favor kernel space implementations for performance and security reasons. As such, the user space approach is generally preferred for client implementations, while kernel implementations are currently still preferred by web companies. Referring to FIG. 23A, FIG. 23A is a simplified schematic diagram 2300A illustrating comparisons between user space implementations and kernel space implementations for the hICN protocol stack (on the left side of the diagram) and a TCP/IP protocol stack (on the right side of the diagram) for client (e.g., consumer) implementations. Referring to FIG. 23B, FIG. 23B is a simplified schematic diagram 2300B illustrating comparisons between user space implementations and kernel space implementations for the hICN protocol stack (on the left side of the diagram) and a TCP/IP protocol stack (on the right side of the diagram) for server (e.g., producer) implementations. In at least one embodiment, the hICN protocol stack implementation can be a user space implementation on hICN end points (e.g., L3, L4, and configuration modules) thereby providing a lightweight implementation for clients and can be a scalable implementation that can be based on vector packet processing (VPP) on the server side.

hICN Deployment

In various embodiments, hICN deployment may involve user space software modifications at end user devices and at servers to configure name-based local DNS and FIB entries, to introduce producer and consumer applications, and to introduce transport layer modifications. For IP routing nodes, hICN deployment can involve enhancing IP routing nodes with VRF instance(s) that can perform ICN-specific packet processing functions involving CS, PIT, and FIB operations as discussed for various embodiments described herein. In various embodiments, hICN insertion in IPv4/v6 networks can coexist with additional networking technologies such as Segment Routing. The embedding of ICN semantics into IP packets may vary as illustrated in the embodiments of FIGS. 3A-3B and 4A-4B. As illustrated in other embodiments, an hICN communication system does not require that all nodes to be hICN enabled or hICN capable.

For SR implementations, SR labels, which can be used over MPLS or over IPv6, can guide location-dependent IP routing that the hICN name-based routing builds upon. In at least one embodiment, the path followed by an IP Interest having a content name in the destination address field can be determined by SR label-switching (either using MPLS labels of IPv6 addresses) until the packet is intercepted by an hICN-enabled IP routing node. The hICN-enabled IP routing node can perform the additional hICN forwarding operations (e.g., CS/PIT/FIB) and can modify the source/destination address fields as discussed herein. Beyond coexistence with SR, a hICN communication system can, in some embodiments, leverage segment routing headers and functions to exploit the additional packet state to carry a larger name, content metadata, or to encode forwarding policies. Different options are possible. For instance, in at least one embodiment, it may be possible to encode a larger name using Destination address field plus SR segments. In another embodiment, it may be possible to encode ICN adjacencies using segments rather than Source/Destination address fields rewrite (in SR regions with fallback on SRC/DST rewrite outside SR regions).

Advantages, Variations, and Implementations

Embodiments described herein allow a seamless integration of hICN-enabled and regular IP routing nodes, thereby allowing fast deployment of ICN within existing network architectures. ICN features such as, for example, named content and name-based routing, connectionless transport, and content-based security may be integrated on top of conventional IP as discussed for various embodiments described herein.

Embodiments described herein present a mapping of ICN content names into IP addresses in a manner that allows coexistence of ICN content names and IP addresses, the ability to not require a source address to be communicated in the network, a mechanism to ensure ICN path symmetry among ICN nodes while keeping path asymmetry in IP routing, a proposal to enhance an IP router into a hICN-enabled IP router, the reuse of existing IPSec protocols to provide content-based security, and others as discussed for various embodiments described herein In various embodiments, some advantages of the mechanisms described herein can include integration of full ICN semantics into IETF RFC compliant IP packets, without the need for IP extensions, without standardization, and/or exploiting IP routing (v4 or v6) without compromising on ICN communication model. Other advantages also include fast, feasible, incremental, and transparent deployment.

Within the context of the disclosure, a network used herein can represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), Low Power Network (LPN), Low Power Wide Area Network (LPWAN), Machine to Machine (M2M) network, IoT network, any other appropriate architecture or system that facilitates communications in a network environment, combinations thereof, or any suitable combination thereof. A network can comprise any number of hardware or software elements coupled to (and in communication with) each other through a communications medium. In one particular instance, the architectures of the disclosure can be associated with a service provider deployment. In other examples, the architectures of the disclosure would be equally applicable to other communication environments. The architectures of the disclosure may include a configuration capable of transmission control protocol/internet protocol (TCP/IP) communications and/or user datagram protocol/Internet Protocol (UDP/IP) communications for the transmission and/or reception of packets in a network.

As used herein, the terms 'network element' or 'node' are meant to encompass any of the aforementioned elements, as well as servers (physical or virtually implemented on physical hardware), machines (physical or virtually implemented on physical hardware), end user devices, routers, switches, network appliances, cable boxes, gateways, bridges, load-balancers, firewalls, inline service nodes, proxies, processors, modules, or any other suitable device, component, element, proprietary appliance, or object operable to exchange, receive, and/or transmit information in a network environment. These network elements may include any suitable hardware, software, components, modules, interfaces, or objects that facilitate hICN operations thereof. This may be inclusive of appropriate algorithms and communication protocols that allow for the effective exchange of data or information.

As used herein, the term 'packet' (which may be used interchangeably with the term 'message') refers to packets of all types or any other units of information or data, including, but not limited to, fixed length cells and variable length packets, each of which may or may not be divisible into smaller packets or cells. The term 'packet' as used herein can also refer to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (e.g., the packet header in this example), the entire packet is forwarded or dropped, etc. Additionally, these packets may contain one or more types of information, including, but not limited to, voice, data, video, and audio information. The phrases 'processing a packet' and 'packet processing' typically refer to performing some steps or actions based on the packet contents (e.g., packet header or other fields), and such steps or action may or may not include modifying, storing, dropping, and/or forwarding the packet and/or associated data.

The term 'system' is used generically herein to describe any number of components, elements, sub-systems, devices, packet switch elements, packet switches, routers, networks, computer and/or communication devices or mechanisms, or combinations of components thereof. The terms 'computer', 'compute node', and variations thereof can be used generically herein to describe any number of computers, including, but not limited to personal computers, embedded processing elements and systems, control logic, application specific integrated circuits (ASICs), chips, workstations, mainframes, etc.

The terms 'processing element' or 'processor' can be used generically herein to describe any type of processing mechanism or device, such as a hardware processor, ASIC, field programmable gate array (FPGA), computer, etc. The term 'device' can be used generically herein to describe any type of mechanism, including a computer or system or component thereof. The terms 'task', 'process', 'operation', and variations thereof can be used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, operations, connections, and/or processing of signals and information illustrated in the FIGURES, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the terms 'identify', 'determine', and variations thereof can be used generically herein to describe any manner or mechanism for directly or indirectly ascertaining something, which may include, but is not limited to receiving, retrieving from memory, defining, calculating, generating, etc.

Moreover, the terms 'network', 'communications', and variations thereof can be used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, inter-process communications, shared memory, etc.

In one implementation, network elements facilitating the integration of ICN into IP networks and/or other features as described herein may include software to achieve (or to foster) the functions discussed herein, where the software can be executed by one or more hardware processors to carry out the functions. Additionally, each of these elements can have an internal structure (e.g., a processor, a memory element, etc.) to facilitate some of the operations described herein. In other embodiments, functions facilitating the integration ICN into existing IP networks and/or other features may be executed externally to these elements, or included in some other network element to achieve the intended functionality. Alternatively, network elements implementing the functionality for facilitating the integration ICN into existing IP networks and/or other features as described herein may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, functions related to facilitating the integration of ICN into existing IP networks and/or other features outlined herein may be implemented by logic encoded in one or more non-transitory, tangible media (e.g., embedded logic provided in an ASIC, digital signal processor (DSP) instructions, software [potentially inclusive of object code and source code] to be executed by one or more processors, or other similar machine, etc.). In some of these instances, one or more memory elements can store data used for the operations described herein. This includes memory elements being able to store instructions (e.g., software, code, logic, etc.) that are executed to carry out the activities described in this Specification. One or more processors described herein can execute any type of instructions associated with the data to achieve operations detailed herein in this Specification. In one example, a processor can transform an element or an article (e.g., data) from one state or thing to another state or thing. In another example, operations outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)), or an ASIC that includes digital logic, software, code, electronic instructions, logic, engine, or any suitable combination thereof.

Any of the elements, devices, etc. (e.g., the network elements, nodes, etc.) described herein can include memory elements for storing information to be used to facilitate the integration of ICN into existing IP networks and/or other features, as outlined herein. Additionally, any of these elements, devices, etc. may include a processor that can execute software or an algorithm to perform the operations as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad teachings of the present disclosure as potentially applied to a myriad of other architectures.

It is also important to note that the steps of methods/algorithms described herein illustrate only some of the possible scenarios that may be executed by, or within, communication systems and/or architectures described herein. Some of these steps may be deleted or removed where appropriate, or these steps may be modified or changed considerably without departing from the scope of the disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the disclosure.

It should also be noted that many of the previous discussions may imply a single client-server relationship. In reality, however, there can be a multitude of servers in the delivery tier in certain implementations of the disclosure. Moreover, the disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

One or more advantages mentioned herein do not in any way suggest that any one of the embodiments described herein necessarily provides all the described advantages or that all the embodiments of the present disclosure necessarily provide any one of the described advantages. Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces, and/or protocols, communication systems and/or architectures described herein may be applicable to other exchanges or routing protocols, interfaces, and/or communications standards, proprietary and/or non-proprietary. Moreover, although communication systems and/or architectures have been illustrated herein with reference to particular elements and operations that facilitate the communication process, these elements, and operations may be replaced by any suitable architecture or process that achieves the intended functionality of the communication systems and/or architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining each station of a plurality of stations connected to a WiFi access point that are to receive downlink video transmissions from the WiFi access point, wherein the WiFi access point is connected to an Information-Centric Networking-based (ICN-based) network;
   associating each station of the plurality of stations to each of a corresponding ICN face of a plurality of ICN faces maintained by the WiFi access point, wherein each corresponding ICN face identifies an adjacency for a connection between each station and the WiFi access point; and
   managing each of a downlink transmission buffer for each station of the plurality of stations based, at least in part, on a modulation and coding scheme (MCS) associated with downlink video transmissions for each station of the plurality of stations, wherein each downlink transmission buffer is associated with each corresponding ICN face associated with each station.

2. The method of claim 1, wherein the managing further comprises:
   (a) determining a total available bandwidth of a channel to provide downlink video transmissions to the plurality of stations;
   (b) identifying an optimized video rate for each station that maximizes utilization of the channel for the plurality of stations while providing fairness of downlink transmissions toward each station;
   (c) enqueuing downlink video packets to each downlink transmission buffer for each station of the plurality of stations; and (d) scheduling downlink transmissions from each downlink transmission buffer for each station of the plurality of stations based on the identified optimized video rate for each station.

3. The method of claim 2, wherein the optimized video rate identified for each station is less than or equal to a maximum physical data rate associated with a lowest MCS assigned to downlink transmissions for the station that maximizes utilization of the channel for the plurality of stations while providing a fair utilization of air time of the channel for the plurality of stations.

4. The method of claim 2, further comprising at least one of:
evaluating the MCS associated with downlink transmissions for each station of the plurality of stations at periodic intervals; and
determining that an interest message for a particular video content has not been received from a particular station within a threshold time period.

5. The method of claim 4, further comprising:
repeating (a), (b), and (c) at a period interval or upon determining that an interest message for a particular video content has not been received from a particular station within a threshold time period.

6. The method of claim 1, wherein the ICN-based network is one of:
a content-centric network;
a named data network; and
an Internet Protocol (IP) network provisioned with at least one hybrid ICN-enabled routing node.

7. The method of claim 6, wherein the at least one hybrid ICN-enabled routing node is capable of performing packet forwarding using both IP networking constructs and ICN constructs.

8. One or more non-transitory tangible media encoding logic that includes instructions for execution by a processor, wherein the execution causes the processor to perform operations comprising:
determining each station of a plurality of stations connected to a WiFi access point that are to receive downlink video transmissions from the WiFi access point, wherein the WiFi access point is connected to an Information-Centric Networking-based (ICN-based) network;
associating each station of the plurality of stations to each of a corresponding ICN face of a plurality of ICN faces maintained by the WiFi access point, wherein each corresponding ICN face identifies an adjacency for a connection between each station and the WiFi access point; and
managing each of a downlink transmission buffer for each station of the plurality of stations based, at least in part, on a modulation and coding scheme (MCS) associated with downlink video transmissions for each station of the plurality of stations, wherein each downlink transmission buffer is associated with each corresponding ICN face associated with each station.

9. The media of claim 8, wherein the managing further comprises:
(a) determining a total available bandwidth of a channel to provide downlink video transmissions to the plurality of stations;
(b) identifying an optimized video rate for each station that maximizes utilization of the channel for the plurality of stations while providing fairness of downlink transmissions toward each station;
(c) enqueuing downlink video packets to each downlink transmission buffer for each station of the plurality of stations; and
(d) scheduling downlink transmissions from each downlink transmission buffer for each station of the plurality of stations based on the identified optimized video rate for each station.

10. The media of claim 9, wherein the optimized video rate identified for each station is less than or equal to a maximum physical data rate associated with a lowest MCS assigned to downlink transmissions for the station that maximizes utilization of the channel for the plurality of stations while providing a fair utilization of air time of the channel for the plurality of stations.

11. The media of claim 9, wherein the execution causes the processor to perform further operations comprising:
evaluating the MCS associated with downlink transmissions for each station of the plurality of stations at periodic intervals; and
determining that an interest message for a particular video content has not been received from a particular station within a threshold time period.

12. The media of claim 11, wherein the execution causes the processor to perform operations comprising:
repeating (a), (b), and (c) at a periodic interval or upon determining that an interest message for a particular video content has not been received from a particular station within the threshold time period.

13. The media of claim 8, wherein the ICN-based network is one of:
a content-centric network;
a named data network; and
an Internet Protocol (IP) network provisioned with at least one hybrid ICN-enabled routing node.

14. A system comprising:
at least one memory element for storing data; and
at least one processor for executing instructions associated with the data, wherein the executing causes the system to perform operations comprising:
determining each station of a plurality of stations connected to a WiFi access point that are to receive downlink video transmissions from the WiFi access point, wherein the WiFi access point is connected to an Information-Centric Networking-based (ICN-based) network;
associating each station of the plurality of stations to each of a corresponding ICN face of a plurality of ICN faces maintained by the WiFi access point, wherein each corresponding ICN face identifies an adjacency for a connection between each station and the WiFi access point; and
managing each of a downlink transmission buffer for each station of the plurality of stations based, at least in part, on a modulation and coding scheme (MCS) associated with downlink video transmissions for each station of the plurality of stations, wherein each downlink transmission buffer is associated with each corresponding ICN face associated with each station.

15. The system of claim 14, wherein the managing further comprises:
(a) determining a total available bandwidth of a channel to provide downlink video transmissions to the plurality of stations;
(b) identifying an optimized video rate for each station that maximizes utilization of the channel for the plurality of stations while providing fairness of downlink transmissions toward each station;

(c) enqueuing downlink video packets to each downlink transmission buffer for each station of the plurality of stations; and (d) scheduling downlink transmissions from each downlink transmission buffer for each station of the plurality of stations based on the identified optimized video rate for each station.

16. The system of claim 15, wherein the optimized video rate identified for each station is less than or equal to a maximum physical data rate associated with a lowest MCS assigned to downlink transmissions for the station that maximizes utilization of the channel for the plurality of stations while providing a fair utilization of air time of the channel for the plurality of stations.

17. The system of claim 15, wherein the executing causes the system to perform further operations comprising at least one of:

evaluating the MCS associated with downlink transmissions for each station of the plurality of stations at periodic intervals; and determining that an interest message for a particular video content has not been received from a particular station within a threshold time period.

18. The system of claim 17, wherein the executing causes the system to perform further operations comprising:

repeating (a), (b), and (c) at a periodic interval or upon determining that an interest message for a particular video content has not been received from a particular station within the threshold time period.

19. The system of claim 14, wherein the ICN-based network is one of:

a content-centric network;

a named data network; and an Internet Protocol (IP) network provisioned with at least one hybrid ICN-enabled routing node.

20. The system of claim 19, wherein the at least one hybrid ICN-enabled routing node is capable of performing packet forwarding using both IP networking constructs and ICN constructs.

* * * * *